(12) United States Patent
Watanabe et al.

(10) Patent No.: US 8,547,639 B2
(45) Date of Patent: Oct. 1, 2013

(54) OPTICAL ELEMENT INCLUDING A PLURALITY OF STRUCTURES AND HARD COAT LAYER FORMED THEREON AND METHOD FOR MAKING THE SAME, MASTER AND METHOD FOR MAKING THE SAME, AND DISPLAY APPARATUS

(75) Inventors: Hitoshi Watanabe, Miyagi (JP); Atsushi Uchida, Tochigi (JP); Masayuki Ishiwata, Tochigi (JP); Mikihisa Mizuno, Miyagi (JP); Morio Tominaga, Kanagawa (JP); Eiki Ooyanagi, Miyagi (JP)

(73) Assignee: Sony Corporation, Tokyo (JP)

( * ) Notice: Subject to any disclaimer, the term of this patent is extended or adjusted under 35 U.S.C. 154(b) by 795 days.

(21) Appl. No.: 12/652,878

(22) Filed: Jan. 6, 2010

(65) Prior Publication Data
US 2010/0177398 A1 Jul. 15, 2010

(30) Foreign Application Priority Data

Jan. 9, 2009 (JP) .............................. P2009-004110
Nov. 10, 2009 (JP) .............................. P2009-257546

(51) Int. Cl.
*G02B 5/02* (2006.01)

(52) U.S. Cl.
USPC .......................................................... 359/599

(58) Field of Classification Search
None
See application file for complete search history.

(56) References Cited

U.S. PATENT DOCUMENTS

| 5,204,160 | A | * | 4/1993 | Rouser ........................ 428/167 |
| 2003/0011315 | A1 | | 1/2003 | Ito et al. |
| 2003/0234460 | A1 | | 12/2003 | Hayashi et al. |
| 2007/0141964 | A1 | * | 6/2007 | Zimmerman et al. .......... 451/49 |
| 2008/0043489 | A1 | | 2/2008 | Etori |
| 2010/0167019 | A1 | * | 7/2010 | Ohyanagi et al. ............ 428/172 |
| 2010/0238548 | A1 | * | 9/2010 | Watanabe et al. ............ 359/493 |
| 2011/0123774 | A1 | * | 5/2011 | Matsui et al. ................. 428/172 |

FOREIGN PATENT DOCUMENTS

| EP | 1411374 | 4/2004 |
| JP | 2005-084113 | 3/2005 |
| JP | 2005-266252 | 9/2005 |
| JP | 2008-090212 | 4/2008 |

OTHER PUBLICATIONS

European Search Report dated Jul. 22, 2010 corresponding to European Patent Appln. No. 10000004.1.
Partial European Search Report issued on Mar. 12, 2010, for corresponding EP10 00 0004.

* cited by examiner

*Primary Examiner* — Arnel C Lavarias
(74) *Attorney, Agent, or Firm* — K&L Gates LLP

(57) ABSTRACT

An optical element includes a substrate including protruding structures on the surface and a hard coat layer formed on the substrate. An irregular shape is formed by the structures. An irregular shape resembling the irregular shape of the substrate is formed on a surface of the hard coat layer and is smoother than the that of the substrate. The size of bottoms of the structures changes at random within the range of the minimum distance Rm to the maximum distance RM (Rm: minimum value of the shortest distance from the center of gravity of the bottom of the structure to the rim of the bottom, RM: maximum value of the longest distance from the center of gravity of the bottom of the structure to the rim of the bottom). Neighboring structures have bottoms in contact or substantially in contact with one another. Rm and RM satisfy Rm/RM≤0.9.

19 Claims, 41 Drawing Sheets

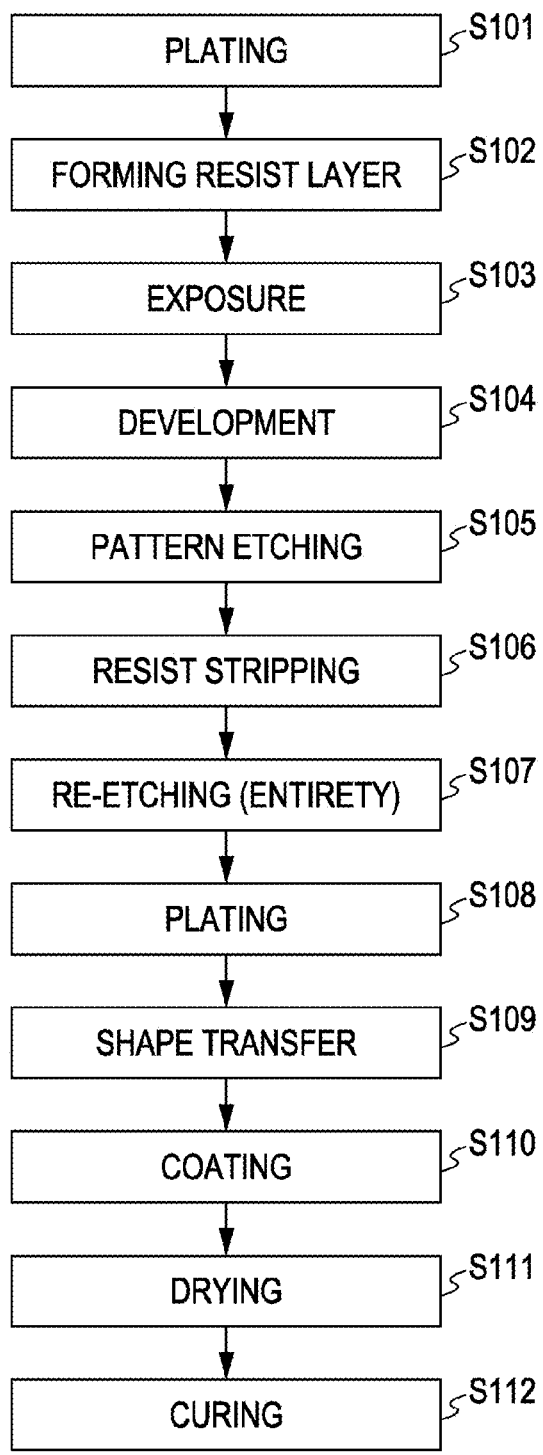

OPTICAL ELEMENT INCLUDING A PLURALITY OF STRUCTURES AND HARD COAT LAYER FORMED THEREON AND METHOD FOR MAKING THE SAME, MASTER AND METHOD FOR MAKING THE SAME, AND DISPLAY APPARATUS

CROSS REFERENCES TO RELATED APPLICATIONS

The present application contains priority to Japanese Priority Patent Application JP 2009-004110 filed in the Japan Patent Office on Jan. 9, 2009 and Japanese Priority Patent Application JP 2009-257546 filed in the Japan Patent Office on Nov. 10, 2009, the entire content of which is hereby incorporated by reference.

BACKGROUND

The present application relates to an optical element and a method for making the same, a master and a method for making the same, and a display apparatus. In particular, it relates to an optical element provided with a hard coat layer.

In recent years, various display apparatuses such as liquid crystal displays (LCDs) and plasma display panels (PDPs) have become increasingly popular. When outside light such as sun light or indoor illumination cast glares on screens of such display apparatuses, visibility in daylight is significantly obstructed; thus, optical films such as antiglare films that diffuse and reflect the outside light at screen surfaces are used extensively.

Heretofore, a technique of forming fine irregularities on surfaces of these optical films has been employed to diffusely reflect outside light at the screen surfaces. To be more specific, the mainstream practice for current liquid crystal display apparatuses is to form a diffusing layer on a transparent plastic substrate by application considering a scratch property, the diffusing layer being composed of a hard-coat coating and transparent fine particles dispersed in the coating.

However, improvements in image quality and resolution of the above-mentioned various display apparatuses represented by recent flat-screen televisions are rapidly progressing and pixels are increasingly becoming smaller in size. As a result, light transmitting through an optical film is distorted by refraction or diffusion by fine particles in an antiglare layer or surface irregularities, leading to problems such as unclear images, glares caused by varying luminance, whitening of surfaces, and significant deterioration of image quality caused thereby. Accordingly, current optical films in which surface irregularities are formed by using fine particles are not compatible to the above-described improvements in the image quality and resolution. Thus, an optical film that has surface irregularities without using fine particles is desired.

Heretofore, in order to diffusely reflect outside light at screen surfaces, a technique of forming fine irregularities by embossing (shape transfer) has been studied as a technique for forming fine irregularities on a surface, as shown in Japanese Examined Patent Application Publication No. 4-59605, Japanese Patent No. 3374299, Japanese Unexamined Patent Application Publication No. 2004-29240, and Japanese Unexamined Patent Application Publication No. 2005-156615.

Japanese Examined Patent Application Publication No. 4-59605 proposes a method for forming a high-definition, non-reflective polarizer, the method including forming fine irregular rough surface in a polarizer-protecting film surface of a cellulose-based plastic by embossing and then partly dissolving a surface layer of the fine irregular rough surface with an organic solvent.

Japanese Patent No. 3374299 proposes a method for producing an antiglare film, the method including forming a coarse irregular layer composed of an ionization radiation-curable resin and forming fine irregularities along the surface of the coarse irregular layer. According to this production method, coarse irregularities are formed by one of an embossing technique, a sand-blasting technique, and a resin-convection technique under drying, and fine irregularities are formed by using a thin-film coating layer or by utilizing a lifting effect.

Japanese Unexamined Patent Application Publication No. 2004-29240 proposes a method for producing an antireflection film, involving imparting irregularities to a film surface by embossing. According to this production method, the arithmetic mean roughness of the irregularities of a template used for embossing is set to 0.05 µm or more and 2.00 µm or less and the average period of the irregularities is set to 50 µm or less.

Japanese Unexamined Patent Application Publication No. 2005-156615 proposes a method for producing an antiglare film, the method including stretching a film with a tenter before or after irregularities are formed on the film surface by pressing the film surface of a template during the step of forming a thermoplastic resin film and forming a hard coat layer on the resulting irregular surface.

SUMMARY

As described above, in Japanese Examined Patent Application Publication No. 4-59605, a polarizer-protecting film is formed by forming a fine irregular coarse surface in a surface of a cellulose plastic by embossing and partially dissolving the fine irregular coarse surface with an organic solvent to make a smooth irregular surface and to thereby fabricate a high-definition, non-reflecting polarizer. However, since no hard coat layer is formed on its surface, the scratch resistance is poor and it is difficult to use this technique in liquid crystal display products such as liquid crystal televisions that demand durability. Moreover, Patent Literature 1 is silent as to the surface shape that exhibits an antiglare property.

In Japanese Patent No. 3374299 and Japanese Unexamined Patent Application Publication No. 2004-29240, the surface shape is defined by a surface roughness but the arithmetic mean roughness statistically includes complicated irregularities of various sizes. Thus, the diffuse reflection characteristics are completely left uncontrolled, the antiglare film appears whitish, and the image quality is very poor.

Japanese Unexamined Patent Application Publication No. 2005-156615 proposes an antiglare film formed by transferring an irregular shape on a film surface by pressing a template during a step of forming a thermoplastic resin film and then forming a hard coat layer on the film surface by a coating technique. However, as for the surface shape, the only limitation is that the centerline mean roughness Ra of the irregular surface of the thermoplastic resin falls in the range of 0.05 µm to 10 µm (e.g., refer to Claim 11), and no description is made regarding the surface shape that exhibits an antiglare property. Thus, the diffuse reflection characteristics are completely left uncontrolled, the antiglare film appears whitish, and image quality is very poor.

As mentioned above, according to optical films of related art to which an antiglare property is imparted by a surface shape without using fine particles, the surface shape is not clearly defined. In other words, the surface property has been described as having an irregular shape, the surface shape has been defined by surface roughness (arithmetic mean roughness), or the surface shape has been defined in terms of diffuse reflection characteristics (optical characteristics).

It is desirable to provide an optical element that achieves a high antiglare property and a high contrast without using fine particles and a method for making the same, a master and a method for making the same, and a display apparatus.

The present application has been made on the basis of extensive studies targeted to resolve the above-described problems of related art. The summary thereof is described below.

The inventors of the present application have conducted extensive studies on an optical element that includes a substrate having a three-dimensionally random irregular shape on its surface and a hard coat layer formed on the substrate. Such an optical element can be obtained by transferring an irregular shape onto a substrate surface using a blast master that has been prepared by a sand blasting technique or a bead blasting technique, and then forming a hard coat layer on the irregular surface. Since the hard coat layer of this optical element does not contain fine particles, the light-transmitting property can be improved and a high contrast can be achieved compared to related optical elements having an antiglare property imparted by fine particles protruding from the surface.

However, investigations conducted by the present inventors on such an optical device have revealed that this optical element has following drawbacks. That is, according to the above-described method, even when a blasting process is conducted using spherical glass beads with a uniform diameter, distributions will be formed in terms of the height and radius of the protrusions transferred onto the substrate surface and it will be difficult to control the optical characteristics after application of the hard coat. For example, when a master is formed by a blasting process using relatively coarse beads and used to transfer the irregular shape onto the substrate surface and when a hard coating is applied on the surface on which transfer has been conducted, the surface glares due to presence of large protrusions although an antiglare property is exhibited. In contrast, when a master is prepared by a blasting process using fine beads and used to transfer an irregular shape onto a substrate surface, shallow and small structures become buried under a hard coat layer, thereby possibly creating flat regions and causing loss of the antiglare property.

The present inventors have conducted extensive studies to overcome the problems described above. As a result, the inventors have conceived forming a hard coat layer having a continuous wavy surface that resembles the structures on the substrate surface and selecting a maximum amplitude A and a minimum wavelength $\lambda$ of the continuous wavy surface. In other words, it has been found that the maximum amplitude A and the minimum wavelength $\lambda$ of the continuous wavy surface should be substantially constant and the ratio of the maximum amplitude A to the wavelength $\lambda$ (A/$\lambda$) should be set in the range of more than 0.002 to 0.011 or less. However, experiments conducted by the present inventors on such an optical device have revealed that this optical element has following drawbacks. That is, since structures of the optical device are periodically arranged, interference occurs between the surface irregularities of the optical element and pixels of a display and moire patterns are easily generated. Thus, the angle at which the optical element is attached is desirably adjusted during fabrication of a polarizer.

The present inventors have conducted extensive studies to overcome the problems described above. As a result, it has been found that moire can be suppressed and an optical element having a good antiglare property and a good contrast can be obtained by forming, on a surface, structures that satisfy the relationships (1) to (3) below:

(1) The size of the bottoms of structures changes at random within the range of a minimum distance $R_m$ or more and a maximum distance $R_M$ or less (where the minimum distance $R_m$ is the minimum value of the shortest distance from the center of gravity of the bottom of the structure to the rim of the bottom and the maximum distance $R_M$ is the maximum value of the longest distance from the center of gravity of the bottom of the structure to the rim of the bottom).

(2) The bottoms of the structures are in contact or substantially in contact with one another.

(3) The minimum distance $R_m$ and the maximum distance $R_M$ of the bottoms of the structures satisfy the relationship $R_m/R_M \leq 0.9$. The present invention has been made on the basis of the findings described above.

One embodiment of the present application provides an optical element that includes a substrate including a plurality of structures on a surface thereof, the structures being protrusions and a hard coat layer formed on the substrate. An irregular shape is formed by the structures on the surface of the substrate. An irregular shape resembling the irregular shape of the substrate is formed on a surface of the hard coat layer. The irregular shape of the surface of the hard coat layer is smoother than the irregular shape of the surface of the substrate. The size of bottoms of the structures changes at random within the range of a minimum distance $R_m$ or more and a maximum distance $R_M$ or less (where the minimum distance $R_m$ is the minimum value of the shortest distance from the center of gravity of the bottom of the structure to the rim of the bottom and the maximum distance $R_M$ is the maximum value of the longest distance from the center of gravity of the bottom of the structure to the rim of the bottom). Of the plurality of structures, neighboring structures have bottoms in contact or substantially in contact with one another. The minimum distance $R_m$ and the maximum distance $R_M$ satisfy the relationship $R_m/R_M \leq 0.9$.

Another embodiment of the present invention provides a method for making an optical element. The method includes steps of forming a master having an irregular shape on a surface thereof by forming in the surface a plurality of structures for transfer that are recesses, forming a substrate having an irregular shape on a surface thereof by transferring the irregular shape of the master onto the surface of the substrate, and forming a hard coat layer on the irregular shape of the substrate. The size of bottoms of the structures for transfer changes at random within the range of a minimum distance $R_m$ or more and a maximum distance $R_M$ or less (where the minimum distance $R_m$ is the minimum value of the shortest distance from the center of gravity of the bottom of the structure for transfer to the rim of the bottom and the maximum distance $R_M$ is the maximum value of the longest distance from the center of gravity of the bottom of the structure for transfer to the rim of the bottom). Of the plurality of the structures for transfer, neighboring structures for transfer have bottoms in contact or substantially in contact with one another. The minimum distance $R_m$ and the maximum distance $R_M$ satisfy the relationship $R_m/R_M \leq 0.9$. An irregular shape resembling the irregular shape of the substrate is formed on a surface of the hard coat layer. The irregular shape of the surface of the hard coat layer is smoother than the irregular shape of the surface of the substrate.

Yet another embodiment of the present application provides a master that includes a plurality of structures for transfer that are recesses. An irregular shape is formed on a surface of the master by the structures for transfer. The size of bottoms of the structures for transfer changes at random within the range of a minimum distance $R_m$ or more and a maximum distance $R_M$ or less (where the minimum distance $R_m$ is the minimum value of the shortest distance from the center of gravity of the bottom of the structure for transfer to the rim of the bottom and the maximum distance $R_M$ is the maximum value of the longest distance from the center of gravity of the bottom of the structure for transfer to the rim of the bottom). Of the plurality of the structures for transfer, neighboring structures for transfer have bottoms in contact or substantially in contact with one another. The minimum distance $R_m$ and the maximum distance $R_M$ satisfy the relationship $R_m/R_M \leq 0.9$.

Still another embodiment of the present application provides a method for making a master. The method includes steps of forming a plurality of recesses in a surface of a master by laser processing or etching and etching the entire surface of the master in which the plurality of recesses are formed so as to form structures for transfer. The size of bottoms of the structures for transfer changes at random within the range of a minimum distance $R_m$ or more and a maximum distance $R_M$ or less (where the minimum distance $R_m$ is the minimum value of the shortest distance from the center of gravity of the bottom of the structure for transfer to the rim of the bottom and the maximum distance $R_M$ is the maximum value of the longest distance from the center of gravity of the bottom of the structure for transfer to the rim of the bottom). Of the plurality of the structures for transfer, neighboring structures for transfer have bottoms in contact or substantially in contact with one another. The minimum distance $R_m$ and the maximum distance $R_M$ satisfy the relationship $R_m/R_M \leq 0.9$.

In the claims and specification, ellipses include not only mathematically defined perfect ellipses but also those that are slightly distorted (such as elongated circles and egg shapes). Circles include not only mathematically defined perfect circles but also those that are slightly distorted. Polygons include not only mathematically defined perfect polygons but also those having distorted sides, those with rounded corners, and those with distorted sides and rounded corners. Here, "distorted" also includes "rounded".

In an embodiment, the hard coat layer is free of fine particles and achieves an improved light-transmitting property and high contrast compared to existing optical elements that exhibit antiglare properties by fine particles protruding from the surface. Since the size of the bottoms of the structures is changed at random in the range of the minimum distance $R_m$ or more and the maximum distance $R_M$ or less, generation of moire can be suppressed. Since the structures are arranged and filled so that the bottoms thereof contact of substantially contact each other, a preferable antiglare property can be obtained. Moreover, since the minimum distance $R_m$ and the maximum distance $R_M$ of the bottoms of the structures satisfy the relationship $R_m/R_M \leq 0.9$, the structures can be arranged at random and generation of moire can be suppressed.

According to an embodiment, a high antiglare property and a high contrast can be achieved without using fine particles. Moreover, generation of moire can be suppressed.

Additional features and advantages are described herein, and will be apparent from the following Detailed Description and the figures.

BRIEF DESCRIPTION OF THE DRAWINGS

FIG. 29 is a flowchart illustrating an example of a method for making an antiglare film according to a seventh embodiment;

DETAILED DESCRIPTION

Embodiments of the present application will now be described in the following order with reference to the drawings:

1. First Embodiment (Example of making an embossing roll by laser processing)
   1.1. Structure of liquid crystal display apparatus
   1.2. Structure of optical film
   1.3. Embossing transfer device
   1.4. Method of arranging bottoms of structures on transfer roll
   1.5. Regarding a random-dot-generating algorithm
      1.5.1. Method 1 for generating data on X axis
      1.5.2. Method 2 for generating data on X axis
      1.5.3. Method 1 for filling circles
      1.5.4. Method 2 for filling circles
      1.5.5. Tiling method
   1.6. Pattern generating device
   1.7. Method for producing optical film
2. Second Embodiment (Example of making an embossing roll by etching)
3. Third Embodiment (Example of additionally forming an antistatic layer)
4. Fourth Embodiment (Example of additionally forming an antireflection layer on the surface)
5. Fifth Embodiment (First example of ANR film)
6. Sixth Embodiment (Second example of ANR film)
7. Seventh Embodiment (Example of making an embossing roll by conducting etching twice)
8. Eighth Embodiment (Example of an optical film in which the irregular surface of a substrate is formed by two types of structures)
9. Ninth Embodiment (Example of an optical film in which fine structures are formed on an irregular surface of a substrate)
10. Tenth Embodiment (Example of an optical film in which steps are formed on side surfaces of structures)

1. First Embodiment 1.1. Structure of Liquid Crystal Display Apparatus

Figure 1:
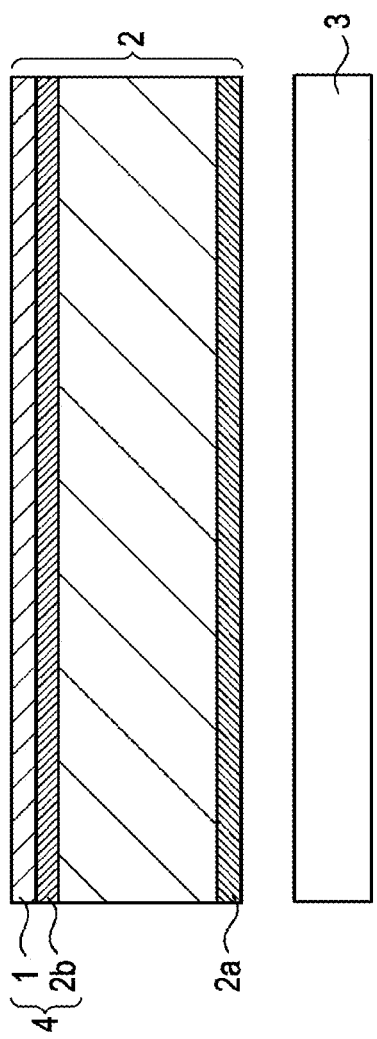
FIG. 1 is a cross-sectional view showing one example of a structure of a liquid crystal display apparatus according to a first embodiment.

FIG. 1 is a cross-sectional view showing one example of a structure of a liquid crystal display apparatus according to a first embodiment. As shown in FIG. 1, this liquid crystal display apparatus includes a backlight 3 that emits light and a liquid crystal panel 2 that performs space-time modification of light emitted from the backlight 3 and displays images. The two surfaces of the liquid crystal panel 2 are respectively provided with polarizers 2a and 2b. The polarizer 2b provided at the display-side-surface of the liquid crystal panel 2 is provided with an optical film (optical element) 1. Here, the definition of "film" includes not only those traditionally called films but also those called "sheets". The polarizer 2b having one main surface covered with the optical film 1 or a hard coat layer 12 is called an "antiglare polarizer 4".

As the backlight 3, for example, a bottom backlight, an edge backlight, or a flat light source backlight can be used. The backlight 3 includes, for example, a light source, a reflector, an optical film, etc. As the light source, for example, a cold cathode fluorescent lamp (CCFL), a hot cathode fluorescent lamp (HCFL), an organic electro luminescence (OEL), an inorganic electro luminescence (IEL), a light-emitting diode (LED), or the like is used.

As the liquid crystal panel 2, for example, those having display modes such as a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, a phase change guest host (PCGH) mode, and the like can be used.

The polarizers 2a and 2b provided on both surfaces of the liquid crystal panel 2 are arranged so that their transmission axes are orthogonal to each other, for example. The polarizers 2a and 2b allow only one of orthogonally polarized components of incident light to pass while blocking the other by absorption. The polarizers 2a and 2b may each be a polymer film uniaxially stretched after a dichromatic substance, such as iodine or dichromatic dye, is adsorbed thereto.

1.2. Structure of Optical Film

Figure 2:
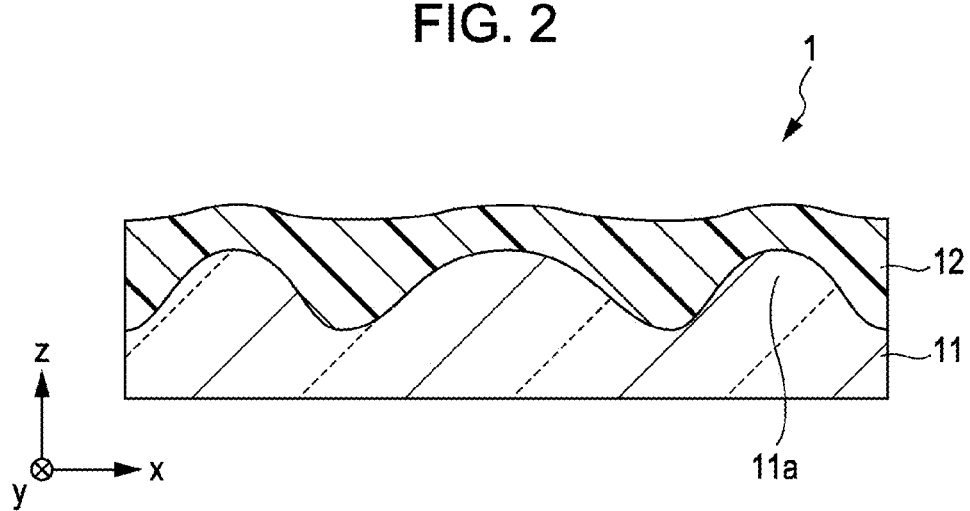
FIG. 2 is a cross-sectional view showing one example of a structure of an optical film according to the first embodiment.

FIG. 2 is a cross-sectional view showing one example of a structure of an optical film according to the first embodiment. As shown in FIG. 2, this optical film 1 includes a substrate 11 having a surface on which structures 11a, i.e., recesses or protrusions, are formed, and the hard coat layer 12 on the substrate 11. In FIG. 2, an example in which the structures 11a are protrusions is illustrated. This optical film is an antiglare film that has an irregular shape in its surface and that scatter reflected light with this irregular shape. An irregular shape resembling the irregular shape on the substrate 11 is formed on the surface of the hard coat layer 12. The irregular shape on the surface of the hard coat layer 12 is smoother than the irregular shape on the substrate 11.

The irregular shape of the surface of the substrate 11 is formed by structures 11a. The irregular shape is preferably a continuous irregular shape. A continuous waveform resembling the irregular shape on the substrate 11 is formed on the surface of the hard coat layer 12. The irregular shapes of the surface of the substrate 11 and the surface of the hard coat layer 12 are two- and/or three-dimensionally non-periodic (random) and thus can suppress generation of moire. Here, "two-dimensionally non-periodic" means that the irregular shape is non-periodic in in-plane directions of the optical film 1. Moreover, "three-dimensionally non-periodic" means that the irregular shape is non-periodic in the in-plane directions of the optical film 1 as well as in the thickness direction (height direction of the irregularities) of the optical film 1.

Figure 3:
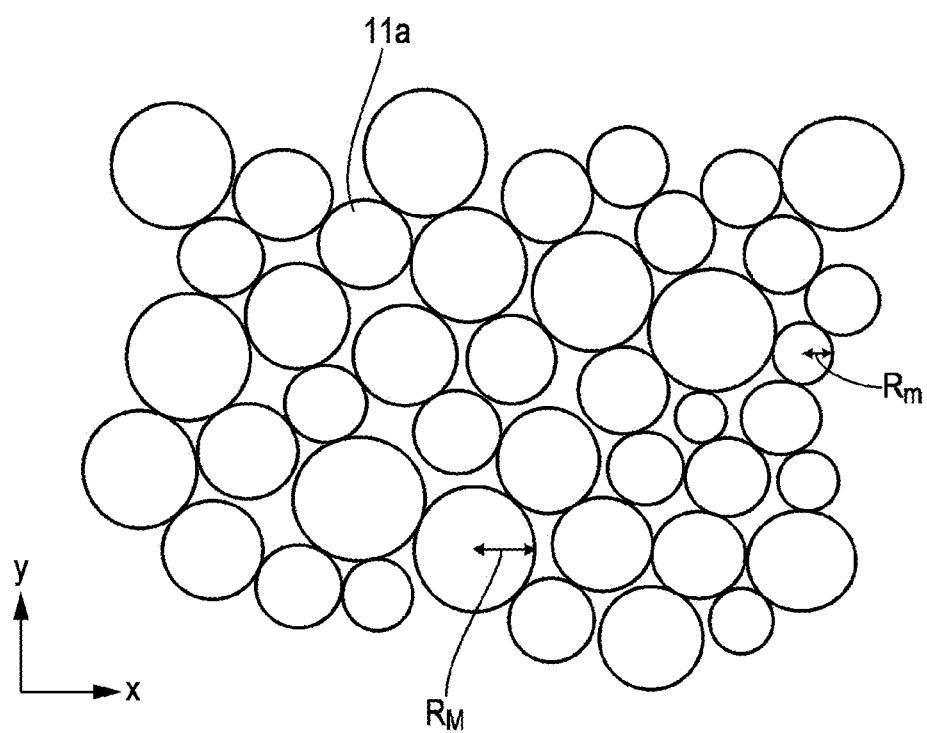
FIG. 3 is a plan view showing an example of the irregular surface of the substrate.

FIG. 3 is a plan view showing an example of the irregular shape of the substrate. When the structures 11a satisfy the following relationships (1) to (3), generation of moire can be suppressed and an optical film 1 having good antiglare property and contrast can be obtained.

(1) The size of the bottoms of structures 11a changes at random within the range of a minimum distance $R_m$ or more and a maximum distance $R_M$ or less (where the minimum distance $R_m$ is the minimum value of the shortest distance from the center of gravity of the bottom of the structure to the rim of the bottom and the maximum distance $R_M$ is the maximum value of the longest distance from the center of gravity of the bottom of the structure to the rim of the bottom).

(2) The bottoms of the structures 11a are in contact or substantially in contact with one another.

(3) The minimum distance $R_m$ and the maximum distance $R_M$ of the bottoms of the structures 11a satisfy the relationship $R_m/R_M \leq 0.9$.

If the relationship (1) is not satisfied and the size of the bottoms of the structures 11a does not change at random, moire occurs. If the relationship (2) is not satisfied and the bottoms of the structures 11a are not in contact or substantially in contact with each other, the filling ratio decreases and the antiglare property deteriorates. If the relationship (3) is not satisfied and the ratio exceeds 0.9, the arrangement becomes periodic and moire is easily generated. Here, "the bottoms of the structures 11a are substantially in contact with each other" means that the bottoms of the structures 11a are next to each other with a spacing in a range of 5 μm or more and 40 μm or less therebetween.

Figure 4A:
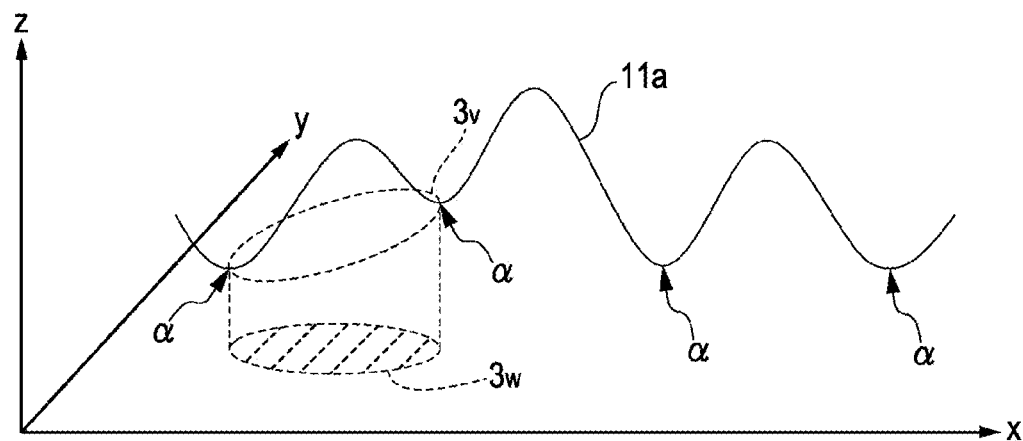
FIGS. 4A and 4B are diagrams for explaining the definition of the bottom of the structure.
Figure 4B:
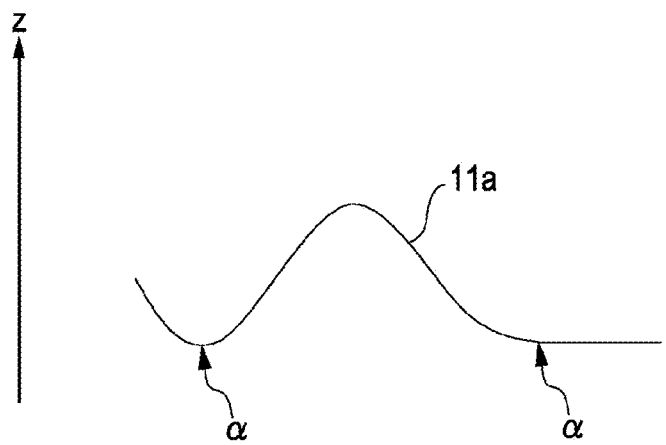

FIGS. 4A and 4B are diagrams for explaining the definition of the bottom of the structure. As shown in FIG. 4A, the bottom of the structure 11a is determined as follows. For a freely chosen structure 11a, its cross-sectional shape in a plane containing the z axis is analyzed. The positions of the local minima α first encountered by tracing down the structure 11a from its apex in its right and left directions are connected to each other at a desired cross-section to form a FIG. 3v, and the FIG. 3v is projected onto the xy plane. A FIG. 3w thus formed by projection is defined as the bottom of the structure.

As shown in FIG. 4B, when neighboring structures 11a are spaced from each other, this space is flat. In such a case, the position of the local minimum α is defined as follows. That is, border points that lie between the side surface of the structure 11a and the flat spaces and that are detected by tracing down the side surface of the structure 11a from its apex in its right and left directions are defined as the positions of the local minima α.

The height of the structure 11a is the maximum value of the distance between the local minimum and the apex in the z axis direction (the difference between positions in the z axis direction). Here, the z axis direction is the thickness direction of the substrate 11. The x axis direction and the y axis direction orthogonally intersect each other in the plane of the substrate 11 and orthogonally intersect the z axis.

The minimum distance $R_m$ and the maximum distance $R_M$ of the bottom of the structure 11a are measured as follows. First, a 209.8 μm×157.5 μm rectangular region is measured with a VertScan 2.0 (objective lens with X50 magnification) to obtain 3D data of the surface irregularities of the substrate 11 in this measurement region. Then for every structure 11a observed in the measurement region, the bottom is determined on the basis of the definition of the bottom of the structure 11a described above and then the radius of each structure 11a is determined. Of the radii of all structures 11a observed within the measurement region, the smallest radius is assumed to be $R_m$ and the largest radius is assumed to be $R_M$. This measurement is conducted at freely chosen 10 positions on the substrate surface and $R_m$ and $R_M$ determined at these positions are simply averaged to obtain average $R_m$ and $R_M$. The average $R_m$ and $R_M$ are assumed to be the minimum distance $R_m$ and the maximum distance $R_M$ of the structures 11a on the substrate surface.

Figure 5:
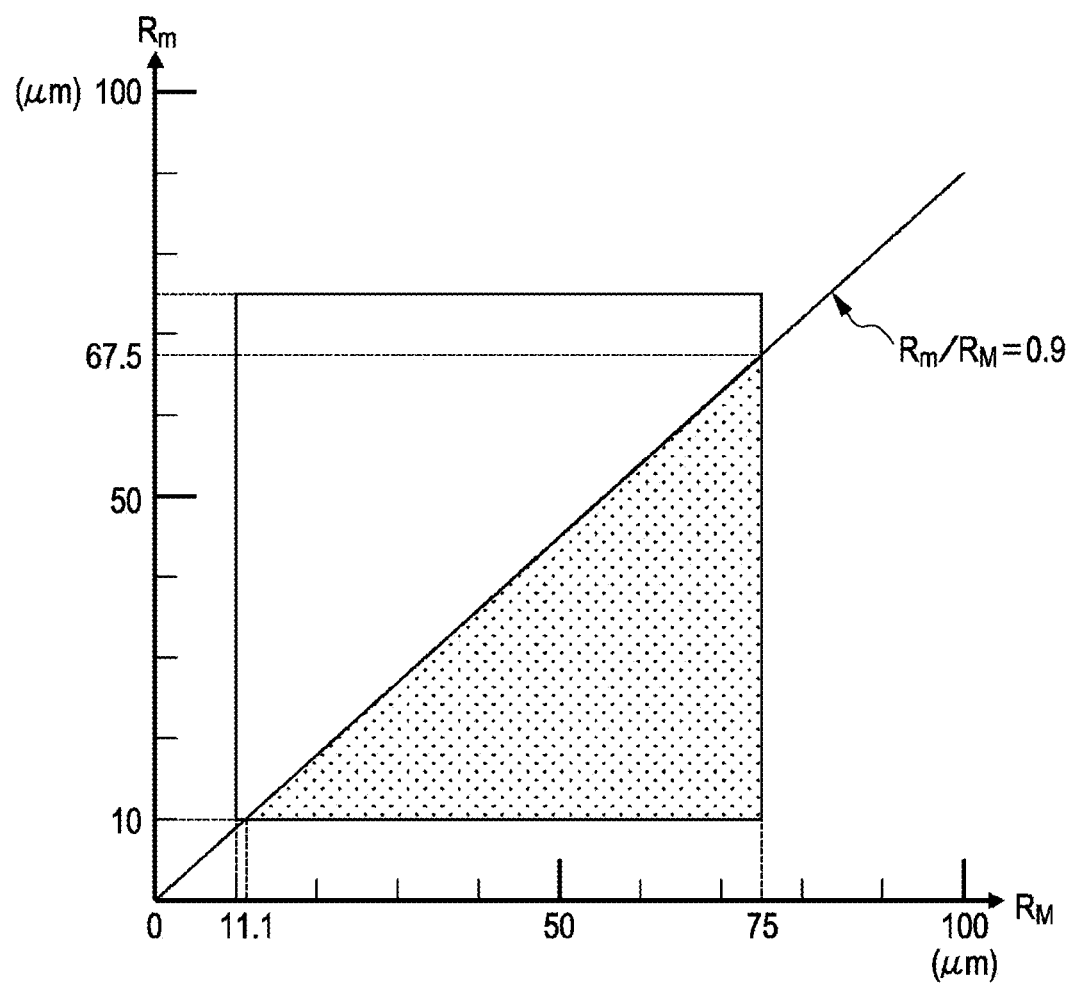
FIG. 5 is a graph showing a preferable range of the minimum distance $R_m$ and the maximum distance $R_M$ of the structures.

FIG. 5 shows a preferable range of the minimum distance $R_m$ and the maximum distance $R_M$ of the structures. As shown in FIGS. 5A and 5B, the minimum distance $R_m$ and the maximum distance $R_M$ of the structure 11a are preferably $R_m < R_M \leq 75$ μm and more preferably $10 \mu m \leq R_m < R_M \leq 75$ μm. When the minimum distance $R_m$ is less than 10 μm, the cloudiness increases if the antiglare property is to be obtained and the antiglare property is lost if the cloudiness is to be suppressed. In other words, it is difficult to achieve both the antiglare property and suppression of the cloudiness. When the maximum distance $R_M$ exceeds 75 μm, the surface coarsens and the screen appears glaring.

When the minimum distance $R_m$ and the maximum distance $R_M$ satisfy the relationships $R_m/R_M \leq 0.9$ and $10 \mu m \leq R_m < R_M \leq 75$ μm, the average irregularity height PV in the surface of the hard coat layer 12 is preferably in the range of $0.2 \mu m \leq PV \leq 1.6$ μm. When PV is less than 0.20 μm, the antiglare property tends to be lost. When PV exceeds 1.6 μm, the cloudiness increases and the cloudiness tends to exceed 0.7%. The cloudiness is preferably 0.7% or less. This is because at 0.7% or less, scattering of the backlight and scattering of the surface reflected light can be suppressed and black can be visually recognized as black. PV indicates the distance between the highest point of the protrusion (structure 11a) and the lowest point at the trough (which is formed between neighboring protrusions).

When the minimum distance $R_m$ and the maximum distance $R_M$ satisfy the relationships $R_m/R_M \leq 0.9$ and $10 \, \mu m \leq R_m < R_M \leq 75 \, \mu m$, the ten-point mean roughness Rz of the surface of the hard coat layer 12 is preferably in the range of $0.1 \, \mu m \leq Rz \leq 1.6 \, \mu m$. When Rz is less than $0.1 \, \mu m$, the antiglare property tends to be lost. When Rz exceeds $1.6 \, \mu m$, the cloudiness increases and the cloudiness tends to exceed 0.7%. This is because at a cloudiness of 0.7% or less, scattering of the backlight and scattering of the surface reflected light can be suppressed and black can be visually recognized as black.

When the bottoms of the structures 11a are circular, the minimum distance $R_m$ is the minimum radius $R_m$ and the maximum distance $R_M$ is the maximum radius $R_M$ in the above-described relationships. When the bottom of the structure 11a is elliptical, the minimum distance $R_m$ is the minimum value $R_m$ of the short axis length (minor axis) and the maximum distance $R_M$ is the maximum value $R_M$ of the long axis length (major axis).

The total light transmittance is preferably 92% or more. At 92% or more, the amount of light from the backlight can be maintained without deteriorating the transmitting property of the substrate 11. The haze is preferably 1.5% or less. This is because at 1.5% or less, scattering of the backlight and scattering of the surface reflected light can be suppressed and black can be visually recognized as black. The internal haze is preferably 0.5% or less. At 0.5% or less, scattering of the backlight can be suppressed and colors can be visually recognized as colors close to natural colors. Note that "haze" is a total of the surface haze and the internal haze.

The mean distance RSm between the apexes of the protrusions on the hard coat layer surface is preferably 55 μm or more and 500 μm or less. It becomes difficult to achieve both the antiglare property and suppression of clouding and glares when the distance is outside this range.

Substrate

The irregular surface of the substrate 11 is preferably a continuous wavy surface. This is because a continuous wavy surface can be formed in the surface of the hard coat layer 12 when the hard coat layer 12 is formed to resemble the irregular surface of the substrate 11. Here, the "continuous wavy surface" means that there is no discontinuity or steps in the substrate surface and the surface is smooth and, in particular, that differentiation is possible at any desired points on the substrate surface.

The substrate 11 is, for example, a plastic substrate having transparency. As for the form of the substrate 11, a transparent film, sheet, or substrate or the like can be used, for example. A common polymer material may be used as the material for the substrate 11, for example. Specific examples of the common polymer materials include triacetyl cellulose (TAC), polyester (TPEE), polyethylene terephthalate (PET), polyimide (PI), polyamide (PA), aramid, polyethylene (PE), polyacrylate, polyether sulfone, polysulfone, polypropylene (PP), diacetyl cellulose, polyvinyl chloride, acryl resin (PMMA), polycarbonate (PC), epoxy resin, urea resin, urethane resin, and melamine resin. The thickness of the substrate 11 is preferably 38 to 100 μm from the productivity standpoint but is not limited to this range.

The substrate 11 preferably has a function of a protection film for the polarizer 2b. This is because no separate protection film is needed for the polarizer 2b and the thickness of the polarizer 2b including the optical film 1 can thus be reduced.

The substrate 11 has an irregular shape in one main surface on which the hard coat layer 12 is formed. In particular, for example, the structure 11a which are recesses or protrusions are formed on the substrate surface in a non-periodical (random) manner two- and/or three-dimensionally. FIG. 2 shows an example in which the structures 11a which are protrusions are formed on the substrate surface. The structure 11a preferably has a side surface that spreads toward the bottom from the top of the structure 11a. When the structure has such a shape, the bottoms of the neighboring structures 11a are preferably in contact or substantially in contact with each other.

Examples of the shape of the structures 11a which may be recesses or protrusions include a dome shape, a cone shape, and a pillar shape but the shape is not limited to these and may be freely selected according to a desired optical characteristics. As for the dome shape, the apex thereof is preferably not flat but preferably has a shape of a rounded protrusion. Examples of such a dome shape include hemispherical and hemiellipsoidal shapes. Examples of the cone shape include a cone with a pointed apex, a cone with a rounded apex, and a cone with an apex cut off. Specific examples thereof include a conical shape, a frustum shape, an elliptical cone shape, an elliptical frustum shape, a pyramid shape, and a pyramidal frustum shape. Examples of the pyramid shape include a quadrangular pyramid shape, a hexagonal pyramid shape, and an octagonal pyramid shape. Examples of the pillar shape include a columnar shape and a prismatic shape. Examples of the prismatic shape include a quadrangular prism shape, a hexagonal prism shape, and an octagonal prism shape. A shape anisotropy may be imparted to the structures 11a. From the viewpoint of adjusting the optical characteristics of the display apparatus in horizontal and vertical directions, it is preferable to impart a shape anisotropy in two orthogonal directions among in-plane directions of the substrate 11, for example. In particular, examples of the shape of the structures 11a having a shape anisotropy include an elliptic cylinder shape, a hemiellipsoidal shape, an elliptic conical shape, and a prismatic or pyramid shape stretched in one direction.

Examples of the shape of the bottoms of the structures 11a include a circular shape, an elliptic shape, and a polygonal shape. These shapes may be used alone or as a combination of two or more. Examples of the polygonal shape of the bottom include a quadrangular shape, a hexagonal shape, and an octagonal shape. When the bottom of the structure 11a has an elliptic shape or a polygonal shape, the structures 11a are arranged on the substrate surface so that the bottoms of the structures 11a are oriented in the same direction. In particular, when the bottoms of the structures 11a have elliptic shapes, the structures 11a are arranged so that their major or minor axes are oriented in the same direction. When the bottoms of the structures 11a have polygonal shapes, the structures 11a are arranged so that their corners having the same angle are oriented in the same direction. The shape of the bottoms of the structures 11a is preferably selected according to a desired characteristic. For example, when the bottoms of the structures 11a have an elliptical shape, the irregularities formed thereby are smooth in the major axis direction compared to the minor axis direction; thus the influence of the outside light in the major axis direction is less and whitening of the display screen can be suppressed. Moreover, good antiglare property can be ensured since the irregularity shape is coarse in the minor axis direction compared to that in the major axis direction. In other words, when the bottoms of the structures 11a have an elliptical shape, an optical film 1 having a high antiglare property and achieving a high contrast as a whole can be obtained.

Hard Coat Layer

The hard coat layer 12 imparts the anti-scratch property and antiglare property to the surface of the substrate 11, i.e., the surfaces of the optical film and the display apparatus, etc., and is, for example, a polymer resin layer harder than the substrate 11. The hard coat layer has a continuous wavy surface that resembles the structures 11a on the substrate 11. The positions of the recesses and protrusions on the hard coat layer 12 correspond to the positions of the recesses and protrusions in the substrate 11. The amount of irregularities in the hard coat layer surface is smaller than the amount of irregularities on the substrate surface and decreases as the thickness of the hard coat layer increases. Preferably, a cross-section of the hard coat layer taken in any desired direction has a continuous wave shape. As a result, smooth undulations can be formed in the hard coat layer surface and light can be diffused by these undulations. Here, the "continuous wavy surface" means that there is no discontinuity or steps in the hard coat layer surface and the surface is smooth and, in particular, that differentiation is possible at any desired points on the hard coat layer surface.

1.3. Embossing Transfer Device

Figure 6:
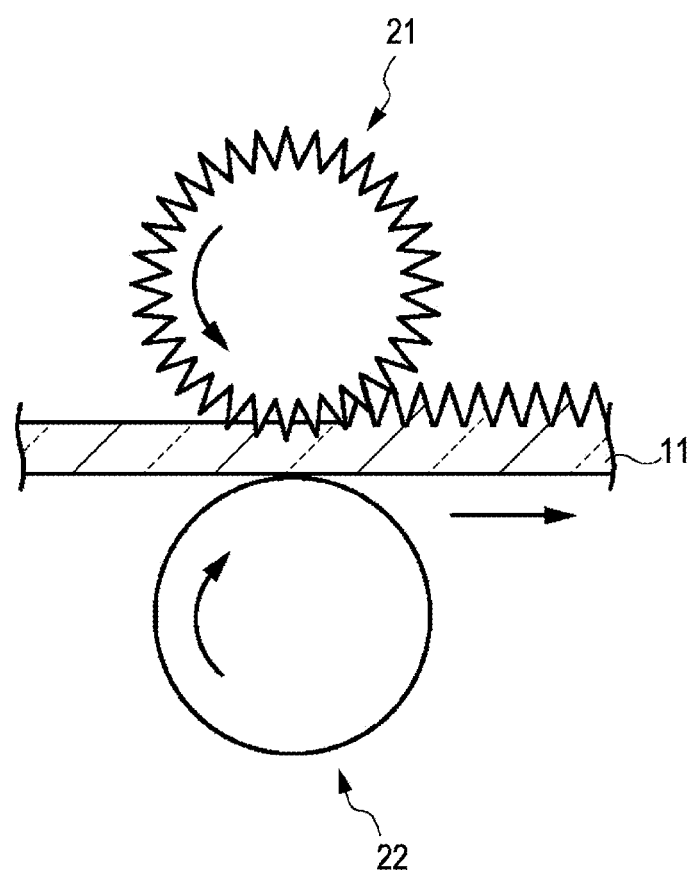
FIG. 6 is a cross-sectional view showing the structure of an embossing transfer device for forming the substrate.

Next, an embossing transfer device for shaping the substrate 11 having the above-described configuration is described with reference to FIG. 6. As shown in FIG. 6, the embossing transfer device includes a columnar embossing roll 21 and a backing roll 22.

As the embossing roll (roll master) 21, a heating roll such as an induction heating jacket roll, a heat medium circulating roll, a built-in heater roll, or the like can be used. The method for embossing the roll surface is preferably laser engraving. A $CO_2$ laser or a YAG laser is preferably used to conduct super-dense engraving exceeding 500 lines/inch. As for the surface treatment, hard chromium plating or ceramic spraying is preferred since abrasive durability for long-term use is excellent. For example, an embossing roll can be fabricated by performing ceramic spraying of chromium oxide on a metal surface of the embossing roll up to 100 μm and then engraving the ceramic layer with a YAG laser. The spraying conditions (type of ceramics and thickness) are not limited to these and a carbonic acid gas laser may be used as the laser.

The column surface of the embossing roll 21 has an irregular shape (emboss shape) for forming the irregular shape onto the substrate 11 by transfer. To be more specific, structures such as recesses and protrusions for forming the structures 11a by transfer are formed on the surface of the embossing roll 21. As for the shapes of the structures, shapes that are inversion of the irregular shapes of the structures 11a on the substrate 11 can be used.

An irregular shape can be formed on the substrate surface by pressing the substrate surface with the embossing roll 21. The irregularity height PV can be changed by controlling the solid content in the hard coat solution applied on the irregular surface of the substrate 11 and the thickness of the applied coating so that the diffuse reflection characteristics are controlled and an antiglare film having a desired contrast can be obtained.

The backing roll 22 preferably includes a rubber layer having a rubber hardness of JIS-D80 or higher or a resin layer having an equivalent hardness on an iron roll surface because a high pressure is desirable to transfer fine embosses onto the substrate surface, and the surface thereof is preferably finished by polishing.

It is also preferable to cool the surface of the rubber or resin layer by allowing a coolant to circulate inside the iron roll of the backing roll 22 or by using a cooling roll or a cooling nozzle. This is because it becomes possible to prevent the rubber or resin layer of the backing roll 22 from being heated by continuous heat conduction from the embossing roll 21 during embossing and to thereby prevent softening or melting of the substrate 11 and enable continuous embossing.

Figure 7:
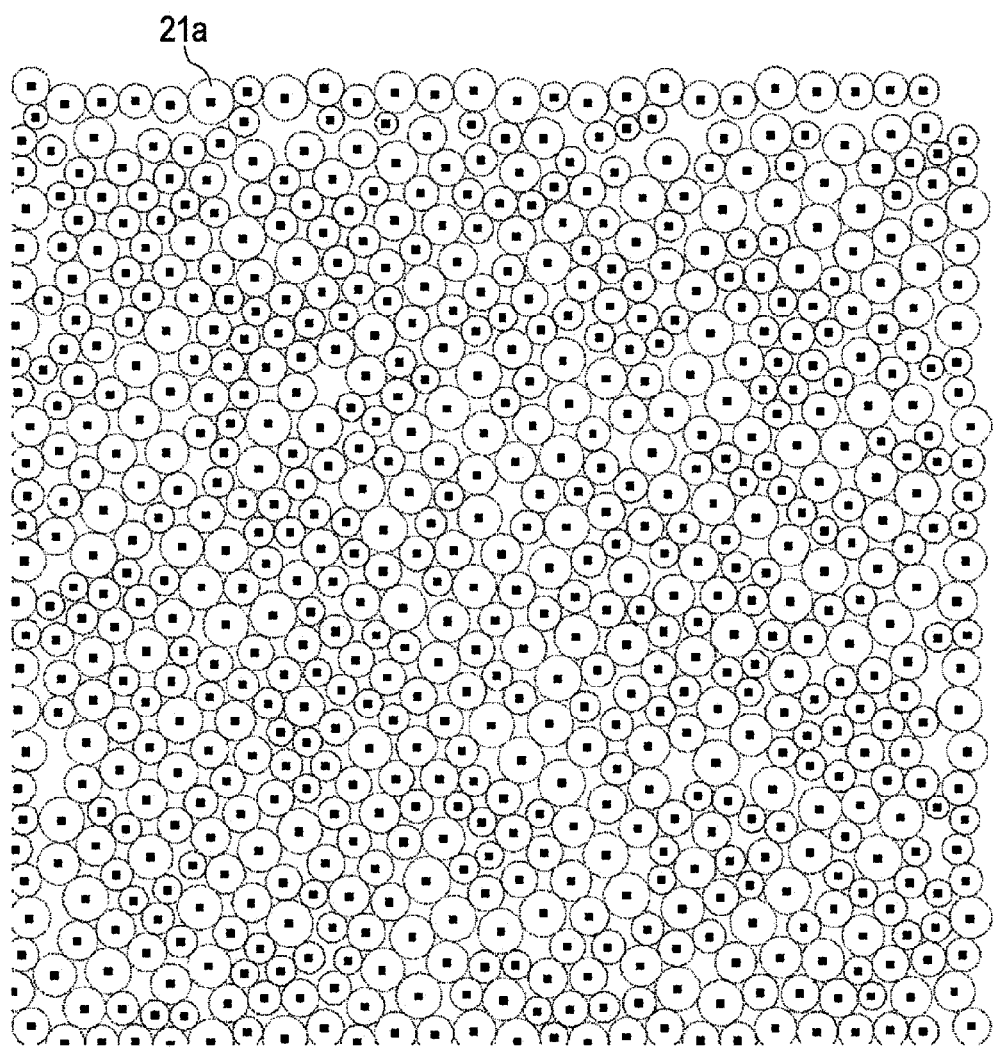
FIG. 7 is a diagram showing an example of the irregular shape on the embossing roll surface.
Figure 8:
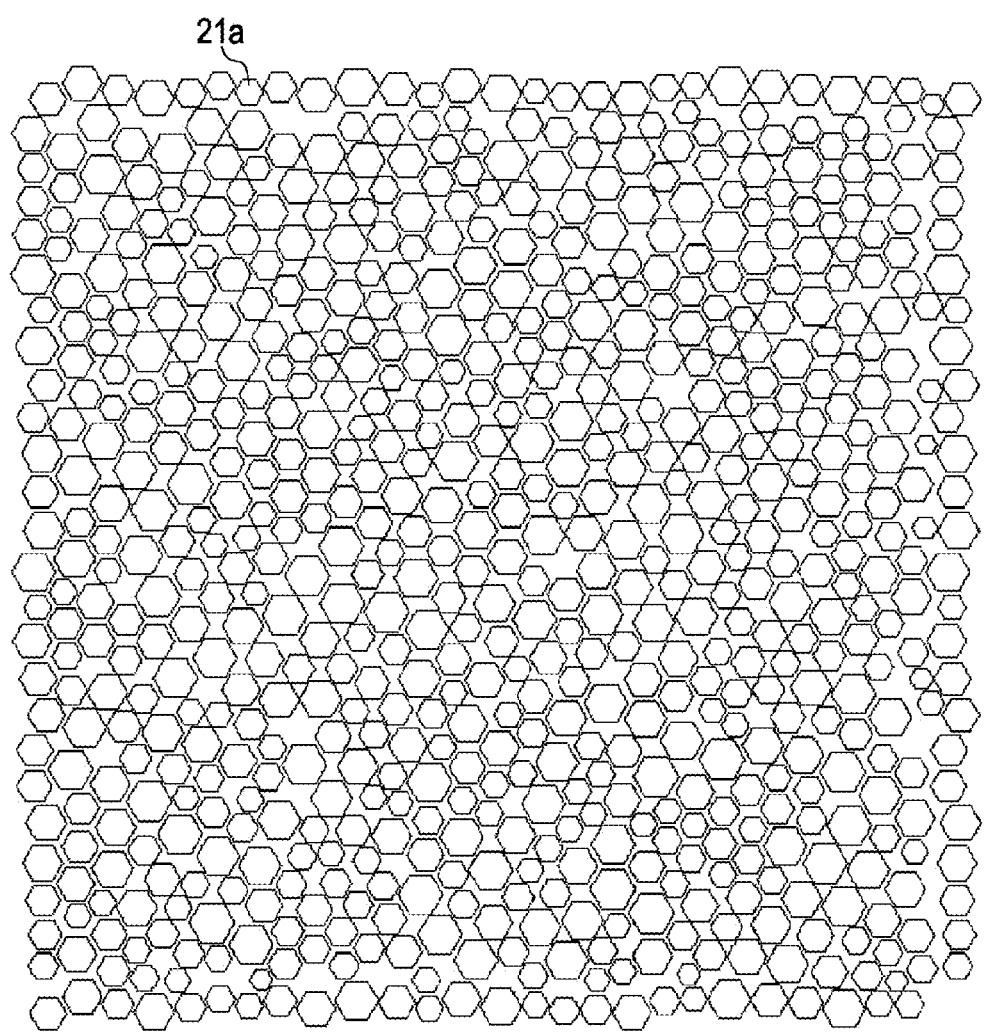
FIG. 8 is a diagram showing an example of the irregular shape on the embossing roll surface.
Figure 9:
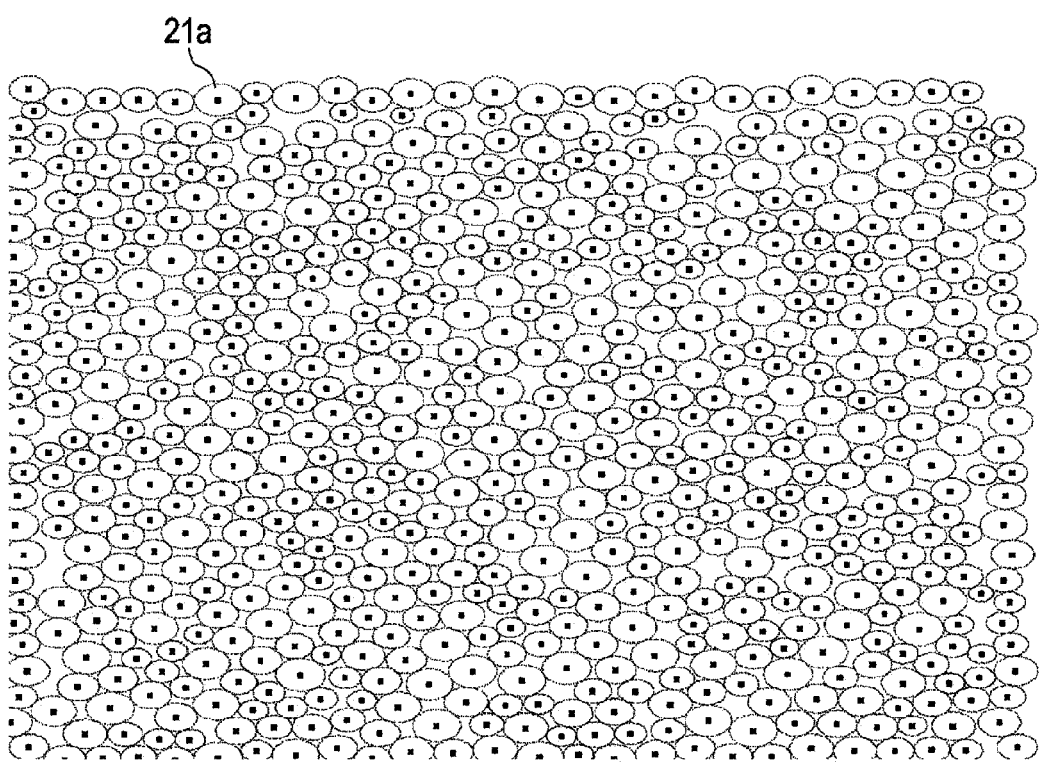
FIG. 9 is a diagram showing an example of the irregular shape on the embossing roll surface.

FIGS. 7 to 9 shows examples of the irregular shapes on the embossing roll surface. FIG. 7 shows an example in which structures 21a having circular bottoms are arranged while varying the size of the bottoms at random. FIG. 8 shows an example in which structures 21a having hexagonal bottoms are arranged while varying the size of the bottoms at random. FIG. 9 shows an example in which structures 21a having elliptical bottoms are arranged while varying the size of the bottoms at random.

1.4. Method of Arranging Bottoms of Structures on Transfer Roll

The method of arranging the structures 21a on the transfer roll will now be described in specific details. Here, the case of arranging the structures 21a having circular bottoms is described as an example but the shape of the structures 21a is not limited to this. Moreover, the "method of arranging circles on the transfer roll" and the "random-dot-generating algorithm" are not limited to the examples described below and may be any other. In particular, other methods can be employed for the methods for generating data above the X axis (bottom row), the methods for filling circles, and (2. Tiling method). The methods described below are executed by electronic computers having controllers such as central processing units (CPUs).

First, circles $C_i$ (i=0, 1, 2, ... ) that satisfy $R_m \le R_i \le R_M$ and are in contact with each other are drawn near and above the X axis. An example of the drawing process is as follows.

A circle $C_0$ having a radius $R_0$ (determined at random in the range of $R_m \le R_0 \le R_M$) is drawn at the origin (0,0).

The radius $R_1$ of a circle $C_1$ is determined at random in the range of $R_m \le R_1 \le R_M$.

$\theta_r$ is determined at random within the range of $-45° \le \theta_r \le 45°$.

The center coordinate of the circle $C_1$ is determined such that the circle $C_0$ is in contact with the circle $C_1$ and that the angle defined by the X axis and the straight line connecting the centers of the circle $C_0$ and the circle $C_1$ is $\theta_r$.

Next, a circle $C_2$ relative to the circle $C_1$ is determined and this is repeated up to a necessary range.

Next, a thus-generated random pattern constituting one row is set to be the bottom row and random circles C satisfying $R_m \le R \le R_M$ are stacked thereon in the positive Y axis direction by making them in contact with the circles at the bottom row. An example of such a stacking method is as follows.

A circle having the smallest y coordinate is selected, the center coordinate of this circle $C_i$ is set to $(x_i, y_i)$, and the radius thereof is set to $R_i$.

A circle having the smallest y coordinate other than the circle $C_i$ is selected from those near the circle $C_i$, the center coordinate of this circle $C_j$ is set to $(x_j, y_j)$, and the radius thereof is set to $R_j$.

Next, the center coordinate $(x_k, y_k)$ of a circle $C_k$ having a radius $R_k$ and being in contact with thus selected two circles $C_i$ (center coordinate $(x_i, y_i)$, radius $R_i$) and $C_j$ (center coordinate $(x_j, y_j)$, radius $R_j$) is determined as follows.

The $R_k$ is calculated by $R_k = R_m + (R_M - R_m) \times r$.

Then the angle $\theta$ that gives the following is calculated:

$$\cos\theta = \{R_i^2 - R_j^2 + 2(R_i - R_j)R_k + L_{ij}^2\} / \{2(R_i + R_k)L_{ij}\}$$

$$\therefore \theta = \cos^{-1}/\{R_i^2 - R_j^2 + 2(R_i - R_j)R_k + L_{ij}^2\} / \{2(R_i + R_k)L_{ij}\}$$

Then the center coordinate $(x_k, y_k)$ is calculated by the following formulae using the angle $\theta$:

$$x_k = x_i - (R_i + R_k)\{(x_i - x_y)\cos\theta - (y_i - y_j)\sin\theta\}/L_{ij} \quad (1)$$

$$y_k = y_i - (R_i + R_k)\{(y_i - y_y)\cos\theta - (x_i - x_j)\sin\theta\}/L_{ij} \quad (2)$$

This process is repeated to stack circles having random radii so as to generate a random pattern.

The description of the reference symbols used in the above-described formulae is as follows.

Figure 10A:
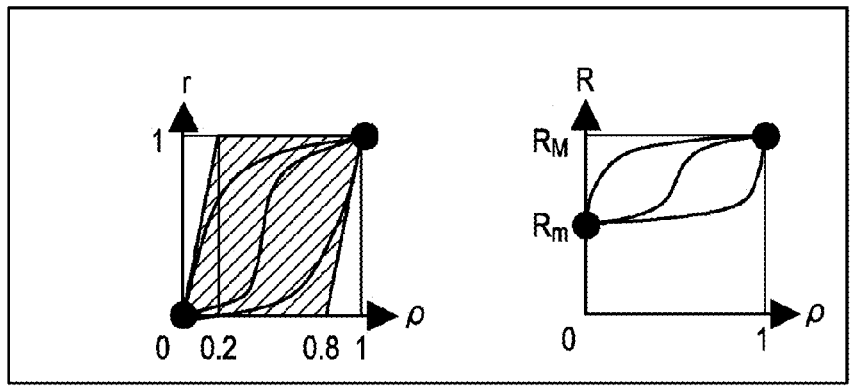
FIGS. 10A to 10C are graphs showing examples of the random number r and the radii of circles.
Figure 10B:
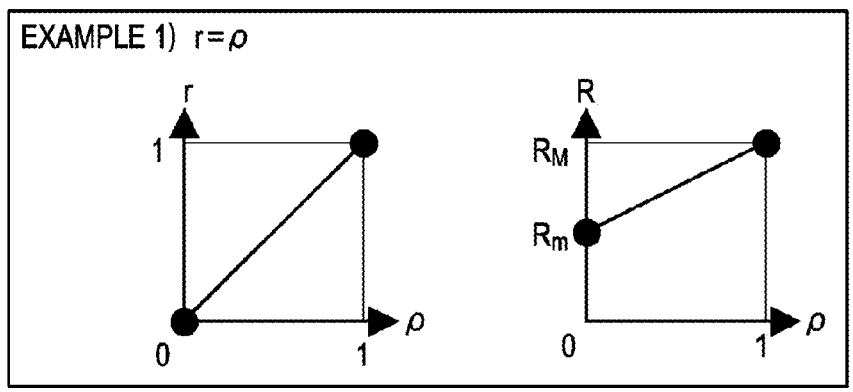
Figure 10C:
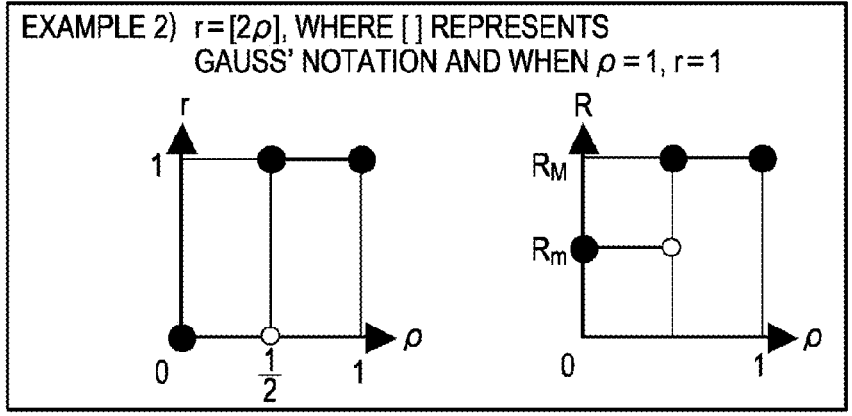
Figure 11A:
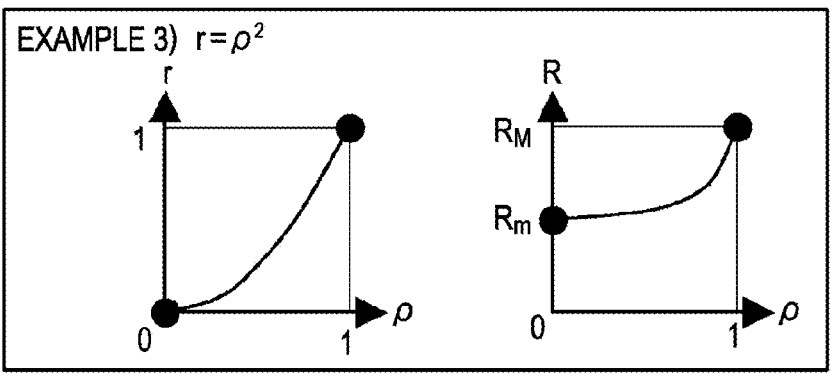
FIGS. 11A to 11C are graphs showing examples of the random number r and the radii of circles.
Figure 11B:
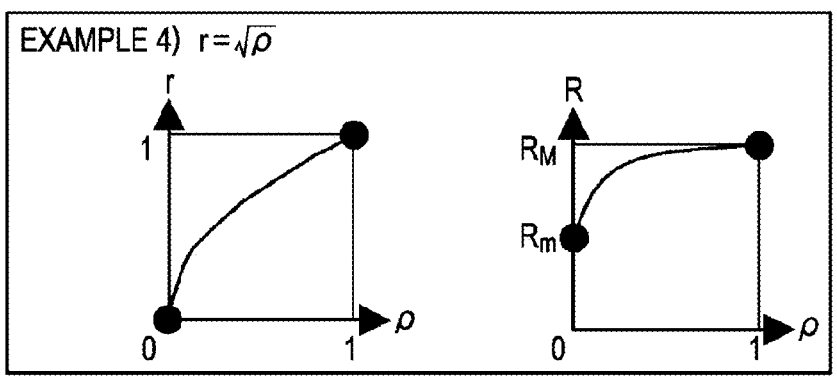
Figure 11C:
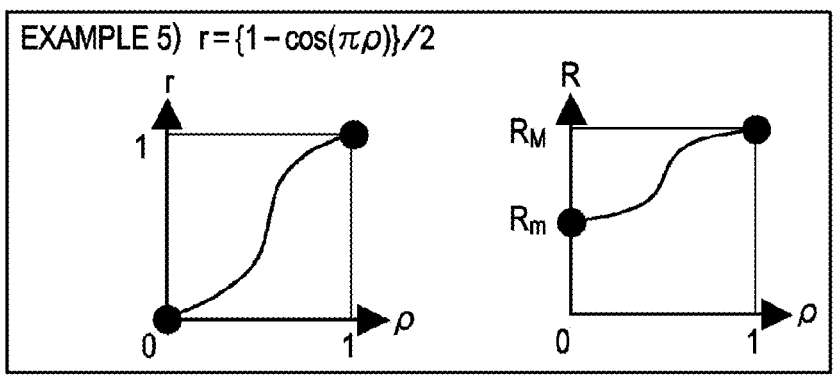

R: radius of a circle, $R_m$: radius of the smallest circle, $R_M$: radius of the largest circle $\rho$: a random number that constantly satisfies $0 \leq \rho \leq 1$ r: a random number that constantly satisfies $0 \leq r \leq 1$, r is a function of $\rho$, $r=f(\rho)$, and $f(\rho)$ may be, as shown in FIG. 10A, any function that takes values within the shaded range. Examples of the random numbers r and the radii of the circles are shown in FIGS. 10B to 10C and FIGS. 11A to 11C.

Circle $C_i$: a circle having a center having a coordinate $(x_i, y_i)$ and a radius $R_i$ calculated by the following formula.

$R_i$: radius of the circle Ci, $R_i = R_m + (R_M - R_m) \times r$ $$L_{ij} = \sqrt{(x_i - x_j)^2 + (y_i - y_j)^2}$$

Here, "$\sqrt{}$" means a square root of "$(x_i - x_j)^2 + (y_i - y_j)^2$" and $L_{ij}$ represents the distance between the center coordinate $(x_i, y_i)$ of the circle $C_i$ and the center coordinate $(x_j, y_j)$ of the circle $C_j$.

1.5. Regarding a Random-Dot-Generating Algorithm 1.5.1. Method 1 for Generating Data Above X Axis The calculation condition setting values are as follows:

$R_m$: minimum radius (μm) of circles
$R_M$: maximum radius (μm) of circles
$X_m$: minimum value (mm) of X coordinate
$X_M$: maximum value (mm) of X coordinate
$\theta_r$: angle defined by the straight line connecting centers of neighboring circles and the X axis ($-45° \leq \theta_r \leq 45°$)
r: random number obtained in the range of 0.0 to 1.0

Figure 12A:
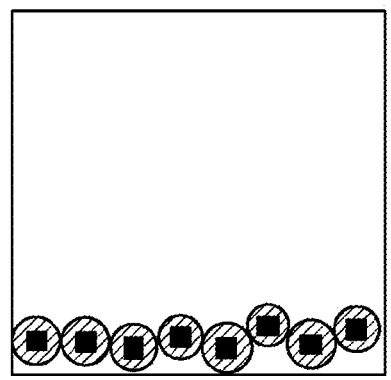
FIGS. 12A to 12D are diagrams for describing a random dot-generating algorithm.

Calculated circle center coordinate values: $P_0(x_0, y_0; R_0)$, $P_1(x_1, y_1; R_1)$, ... $P_n(x_n, y_n; R_0)$ Shaded circles shown in FIG. 12A are obtained by the following algorithm. The radii of the neighboring circles and the angle defined by a straight line connecting the centers and the X axis are determined at random and the circles are aligned so that they contact one another.

Figure 13:
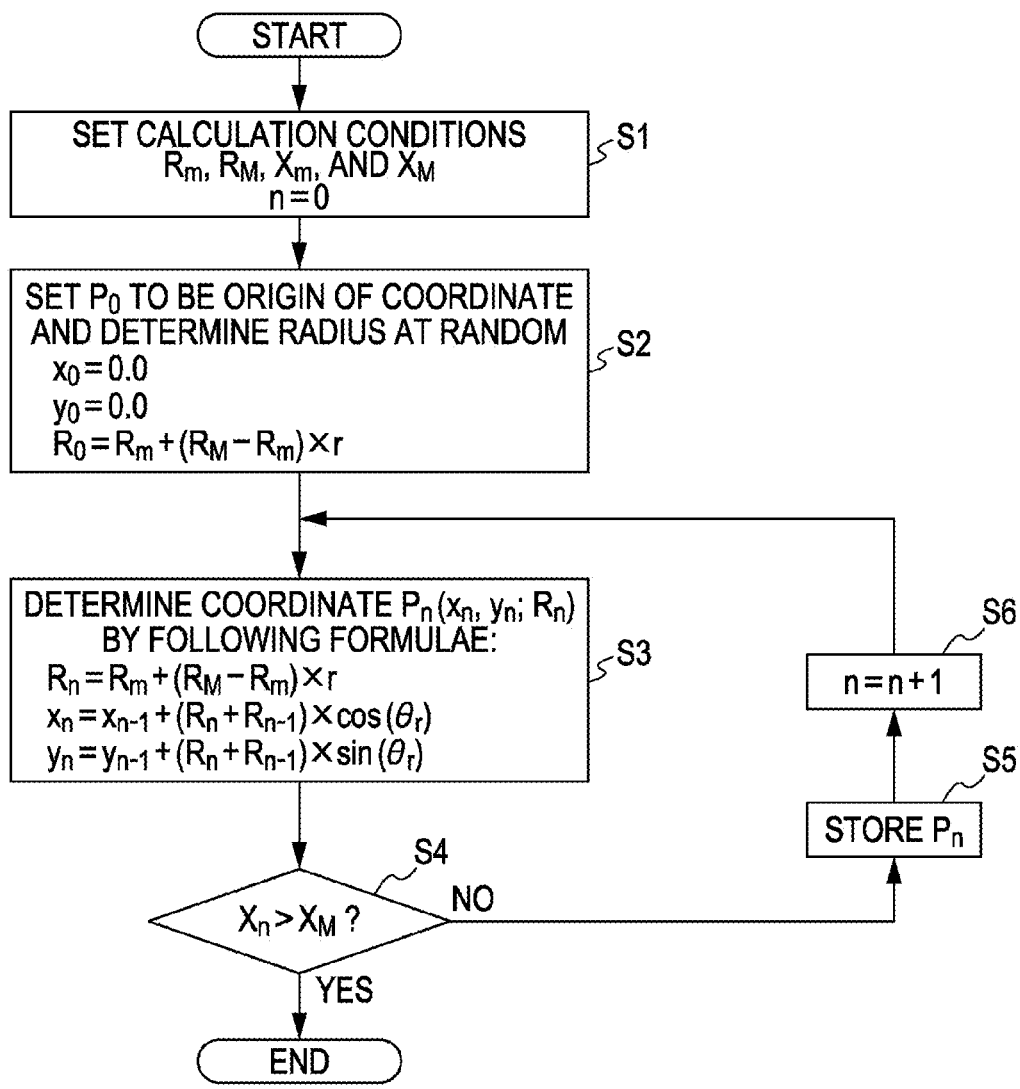
FIG. 13 is a flowchart illustrating the method 1 for generating data above the X axis.

FIG. 13 is a flowchart illustrating the method 1 for generating data above the X axis. First, in step S1, calculation conditions $R_m$, $R_M$, $X_m$, and $X_M$ are set. Next, in step S2, $P_0$ is set to the coordinate origin $(x_0, y_0) = (0.0, 0.0)$ and the radius $R_0 = R_m + (R_M - R_m) \times r$ is determined at random.

Next, in step S3, the coordinate $P_n(x_n, y_n; R_n)$ is determined by the following formulae:

$$R_n = R_m + (R_M - R_m) \times r$$

$$x_n = x_{n-1} - (R_n + R_{n-1}) \times \cos(\theta_r)$$

$$y_n = y_{n-1} - (R_n + R_{n-1}) \times \sin(\theta_r)$$

Next, in step S4, whether $X_n > X_M$ is determined. If Yes in step S4, the process ends. If No in step S4, the process proceeds to step S5. In step S5, the coordinate $P_n(x_n, y_n; R_n)$ is stored. Next, in step S6, the value of n is incremented and the process proceeds to step S3.

1.5.2. Method 2 for Generating Data Above the X Axis

The calculation condition setting values are as follows:

$R_m$: minimum radius (μm) of circles
$R_M$: maximum radius (μm) of circles
$X_m$: minimum value (mm) of X coordinate
$X_M$: maximum value (mm) of X coordinate
$Y_r$: amplitude (%) of the Y coordinate where $Y_r < 100$
r: random number obtained in the range of 0.0 to 1.0

Figure 12B:
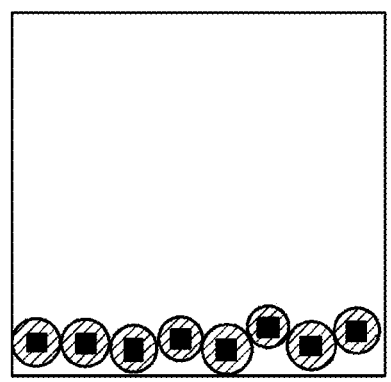

Calculated circle center coordinate values: $P_0(x_0, y_0; R_0)$, $P_1(x_1, y_1; R_1)$, ... $P_n(x_n, y_n; R_n)$ Shaded circles shown in FIG. 12B are obtained by the following algorithm. The radii and the Y coordinate values of the circles are determined at random within particular ranges and the circles are arranged so that neighboring circles contact one another.

Figure 14:
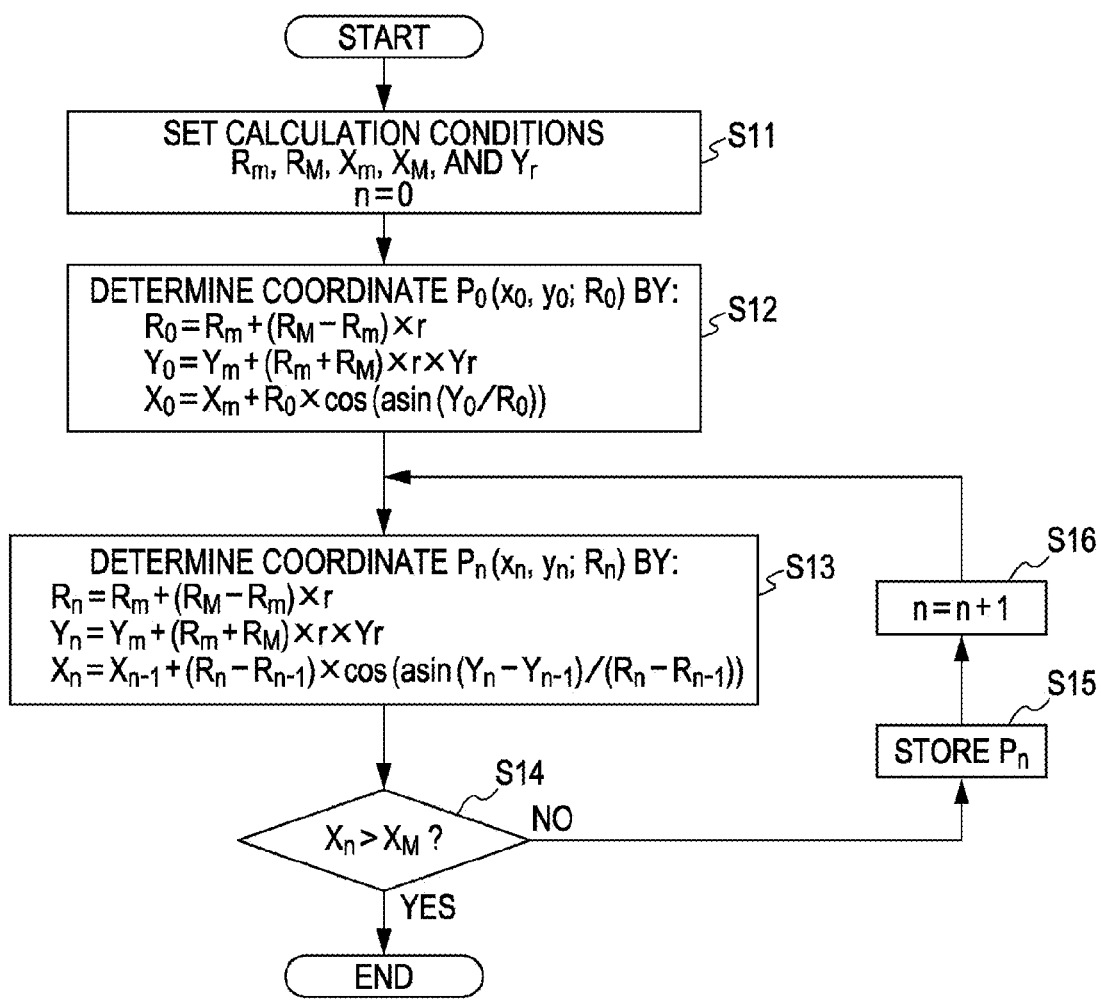
FIG. 14 is a flowchart illustrating the method 2 for generating data above the X axis.

FIG. 14 is a flowchart illustrating the method 2 for generating data above the X axis. First, in step S11, calculation conditions $R_m$, $R_M$, $X_m$, $X_M$, and $Y_r$ are set. Then the coordinate $P_0(x_0, y_0; R_0)$ is determined by the following formulae:

$$R_0 = R_m + (R_M - R_m) \times r$$

$$Y_0 = Y_m + (R_M + R_m) \times r \times Y_r$$

$$X_0 = X_m + R_0 \times \cos(a\sin(Y_0/R_0))$$

Next, in step S13, the coordinate $P_n(x_n, y_n; R_n)$ is determined by the following formulae:

$$R_n = R_m + (R_M - R_m) \times r$$

$$Y_n = Y_m + (R_M + R_m) \times r \times Y_r$$

$$X_n = X_{n-1} + (R_n - R_{n-1}) \times \cos(a\sin(Y_n - Y_{n-1})/(R_n - R_{n-1}))$$

Next, in step S14, whether $X_n > X_M$ is determined. If it is determined that $X_n > X_M$ in step S14, the process ends. If it is determined that $X_n > X_M$ is not satisfied in step S14, the process proceeds to step S15. In step S15, the coordinate $P_n(x_n, y_n; R_n)$ is stored. Next, in step S16, the value of n is incremented and the process proceeds to step S13.

1.5.3. Method 1 for Filling Circles

The calculation condition setting values are as follows:

$R_m$: minimum radius (μm) of circles
$R_M$: maximum radius (μm) of circles
$X_m$: minimum value (mm) of X coordinate
$X_M$: maximum value (mm) of X coordinate
$Y_m$: minimum value (mm) of Y coordinate
$Y_M$: maximum value (mm) of Y coordinate
r: random number obtained in the range of 0.0 to 1.0

Figure 12C:
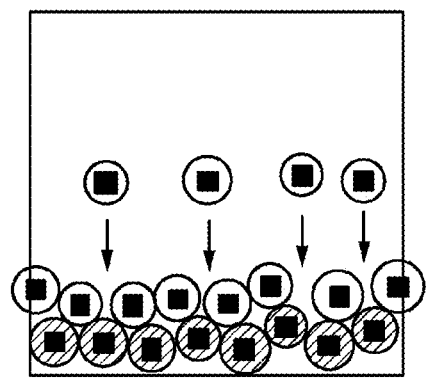

Calculated circle center coordinate values: $P_0(x_0, y_0; R_0)$, $(x_1, y_1; R_1)$, ..., $(x_n, y_n; R_n)$ Unshaded circles shown in FIG. 12C are obtained by the following algorithm.

Figure 15:
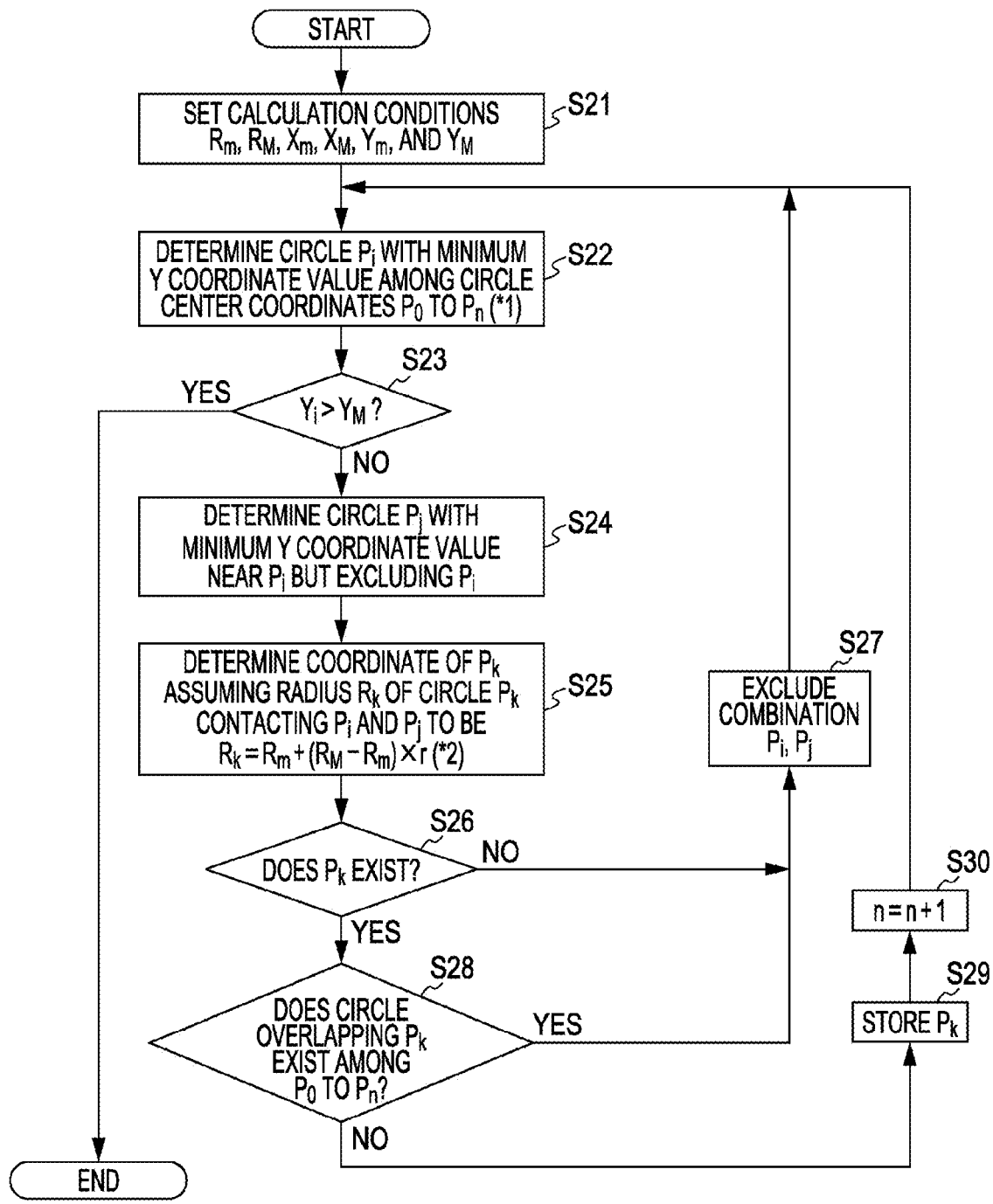
FIG. 15 is a flowchart describing a method 1 for filling circles.

FIG. 15 is a flowchart describing the method 1 for filling circles.

First, in step S21, calculation conditions $R_m$, $R_M$, $X_m$, $X_M$, $Y_m$, and $Y_M$ are set. Next, in step S22, a circle $P_i$ having the smallest Y coordinate value among the center circle coordinates $P_0$ to $P_n$ is determined. Next, in step S23, whether $Y_i > Y_M$ is determined. If Yes in step S23, the process ends. If No in step S24, a circle $P_j$ having the smallest Y coordinate value among those near $P_i$ but excluding $P_i$ is determined. Next, in step S25, the radius $R_k$ of a circle $P_k$ in contact with $P_i$ and $P_j$ is assumed to be $R_k = R_m + (R_M - R_m) \times r$ and the coordinate of $P_k$ is determined.

Next, in step S26, whether $P_k$ exists is determined. If it is determined that $P_k$ does not exist in step S26, then in step S27, the combination of $P_i$ and $P_j$ is excluded from here on. When it is determined that $P_k$ does exist in step S26, then whether a circle that overlaps $P_k$ exists among $P_0$ to $P_n$ is determined in step S28. If it is determined that overlapping circle does exist in step S28, then in step S27, the combination of $P_i$ and $P_j$ is excluded from here on. If it is determined that no overlapping circle exists in step S28, a coordinate $P_k(x_k, y_k; R_k)$ is stored in step S29. Next, in step S30, the value of n is incremented and the process proceeds to step S22.

Note that in FIG. 15, (*1) and (*2) have following meaning.

(*1) A method of determining a circle with the smallest $y_i+R_i$ for $P_j$ instead of the smallest value of the Y coordinate is also effective.

(*2) Formulae (1) and (2) described above are used in calculating $P_k$.

1.5.4. Method 2 for Filling Circles

Figure 16:
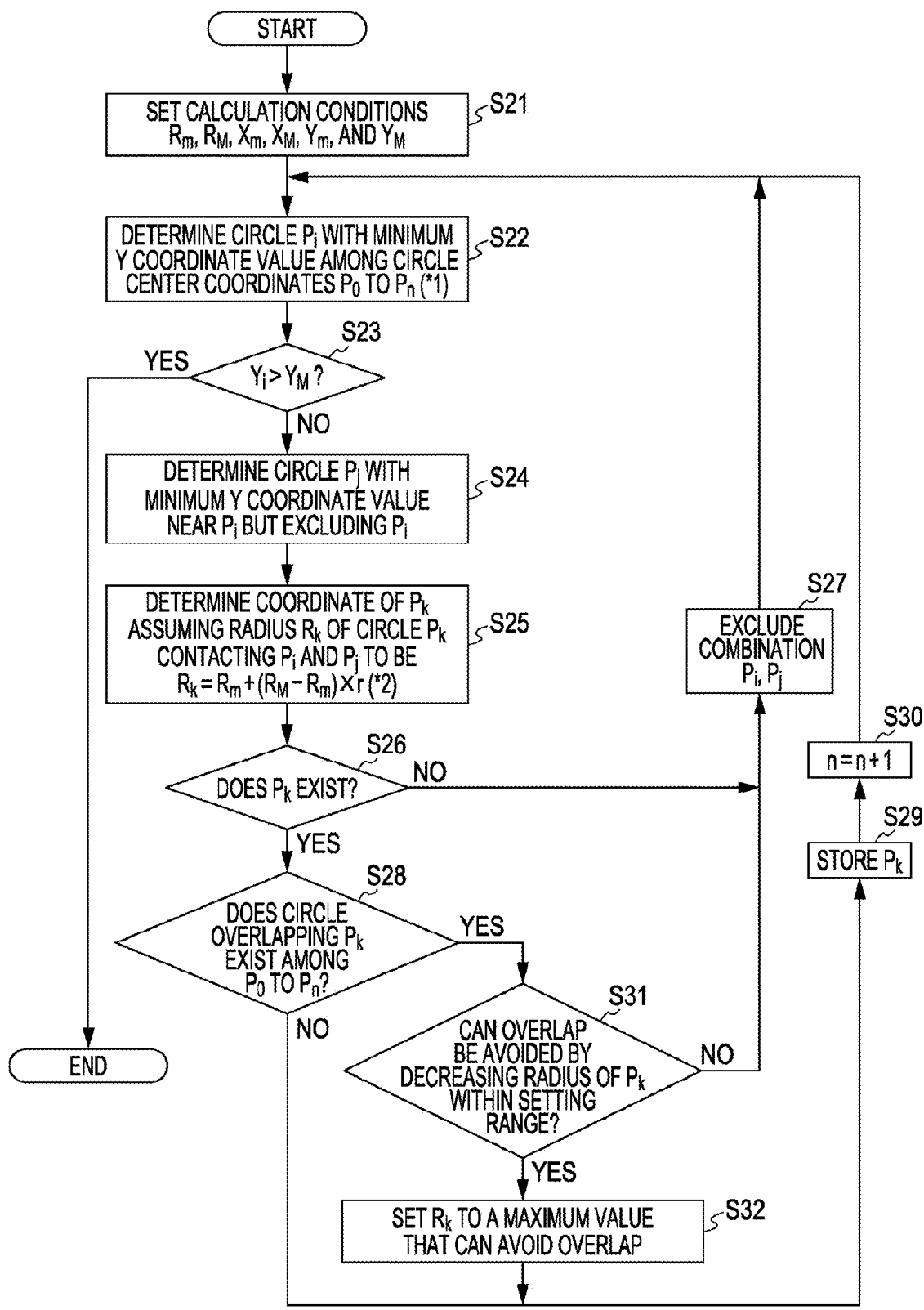
FIG. 16 is a flowchart describing a method 2 for filling circles.

FIG. 16 is a flowchart describing the method 2 for filling circles.

The method 2 for filling circles is different from the method 1 for filling circles in that additional processes of steps S31 and S32 are performed. This method improves the filling ratio by sacrificing randomness by a certain extent.

The steps up to S21 to S28 are the same as those of the method 1 for filling circles. Next, if it is determined that no overlapping circle exists in step S28, a coordinate $P_k(x_k,y_k;R_k)$ is stored in step S29. Next, in step S30, the value of n is incremented and the process proceeds to step S22. If it is determined that an overlapping circle exists in step S28, whether the overlap can be avoided by decreasing the radius of the coordinate $P_k(x_k,y_k;R_k)$ within the set range is determined in step S31. If it is determined that the overlap is difficult to avoid in step S31, then in step S27, the combination of $P_i$ and $P_j$ is excluded from here on. If it is determined that the overlap can be avoided in step S31, $R_k$ is set to a maximum value that can avoid the overlap in step S32. Next, in step S29, the coordinate $P_k(x_k,y_k;R_k)$ is stored. Next, in step S30, the value of n is incremented and the process proceeds to step S22.

1.5.5. Tiling Method

Figure 12D:
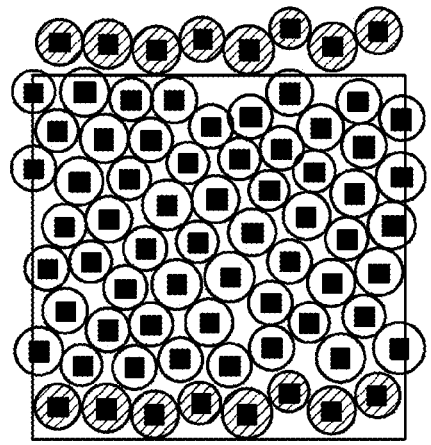

When a random pattern having a large area is to be fabricated, the fabrication can be efficiently carried out by repeatedly connecting patterns large enough not to affect the optical characteristics. In the case where the patterns are repeatedly connected, the arrangement of the straight line of the head of the pattern is desirably the same as the arrangement of the straight line of the tail of the pattern (the shaded circles in the top and bottom rows in FIG. 12D).

Figure 17:
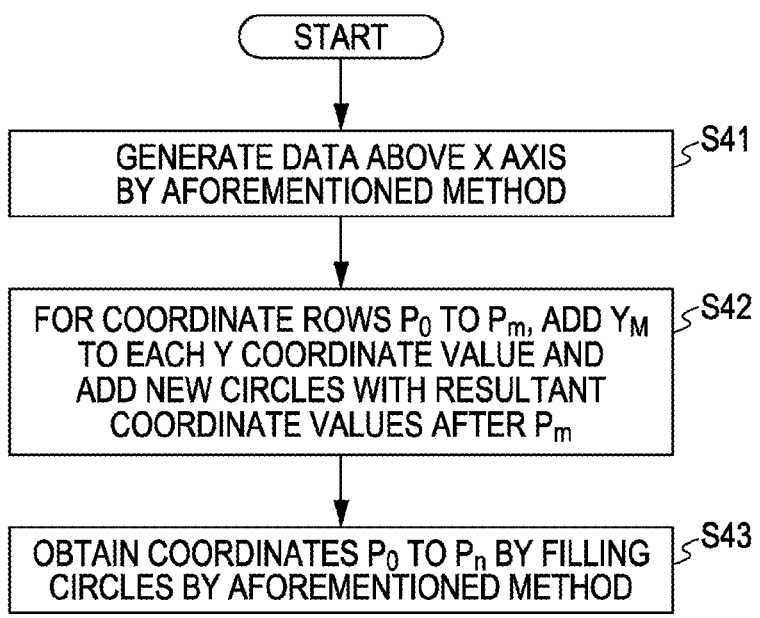
FIG. 17 is a flowchart describing a method for making the pattern of the starting point above the X axis to be the same as the pattern of the ending point.

FIG. 17 is a flowchart describing a method for making the pattern of the starting point above the X axis to be the same as the pattern of the ending point.

First, in step S41, the data above the X axis is generated by the above-described method. Next, in step S42, for coordinate rows $P_0$ to $P_m$, the coordinate values obtained by adding $Y_M$ to each y coordinate value are added as new circles after $P_m$. Then in step S43, the filling of circles is performed by the above-described method to obtain coordinates $P_0$ to $P_n$.

By forming a random pattern as described above, an optical film 1 that can suppress occurrence of moire can be obtained. This pattern can be engraved in the embossing roll surface by laser processing, an etching process, or the like.

Although circles are used to form a random pattern in the description above, the random pattern is not limited to circles. For example, a random pattern can be formed by using polygons, ellipses, and the like (refer to FIGS. 7 to 9). In particular, as shown in FIG. 9, when ellipses are used to form a random pattern, an optical anisotropy can be imparted to the optical film 1. The random pattern shown in FIG. 9 has a filling ratio as high as that achieved with circles. In the random pattern shown in FIG. 9, the irregularities are smooth in the major axis direction compared to that in the minor axis direction and thus the influence of outside light in the major axis direction is less and whitening of the display screen can be suppressed. In contrast, since the irregularities are coarse in the minor axis direction compared to that in the major axis direction, the antiglare property is ensured. Accordingly, a optical film 1 having a high antiglare property and a high contrast as a whole can be obtained from the random pattern shown in FIG. 9.

1.6. Pattern Generating Device

Figure 18:
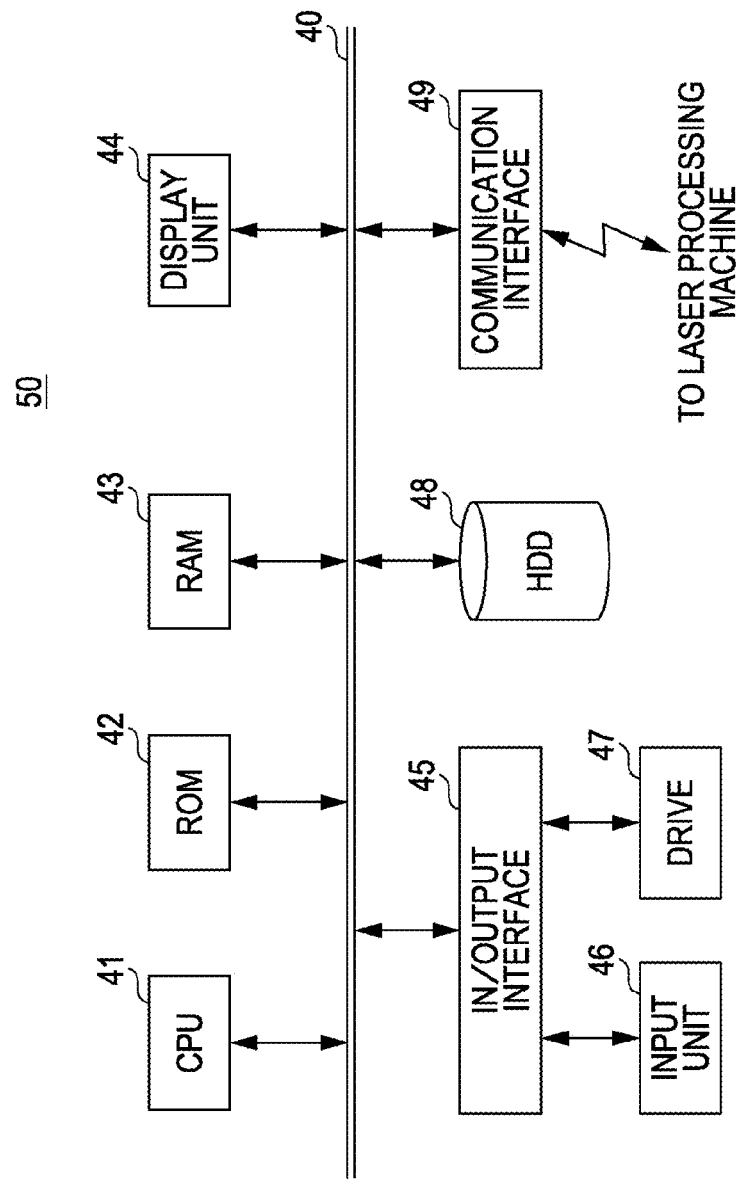
FIG. 18 is a block diagram showing an example of a configuration of a pattern-generating device for implementing a random pattern-generating process.

FIG. 18 is a block diagram showing an example of a configuration of a pattern-generating device for implementing the random pattern-generating process described above. The pattern-generating device is, for example, a machine that has a structure similar to general personal computers and computer devices.

In a pattern-generating device 50, a CPU (central processing unit) 41 and a ROM (read only memory) 42, and a RAM (random access memory) 43 are connected to a bus 40. In the ROM 42, an initial program for starting the pattern-generating device 50 is stored in advance, for example. The RAM 43 is used as a work memory of the CPU 41.

Furthermore, a display unit 44, an in/output interface (in/output I/F) 45, a hard disk drive 48, and a communication interface (communication I/F) 49 are connected to the bus 40. The display unit 44 is either inside the pattern-generating device 50 or connected to the pattern-generating device 50 and used, and performs display according to the display control signal generated in the CPU 41. An input unit 46, such as a keyboard or an operation panel having particular operation units, for receiving inputs from the user is connected to the in/output I/F 45. A drive device 47 that can read recording media such as CDs (compact discs) and DVDs (digital versatile discs) may be connected to the in/output I/F 45.

A program for controlling the operation of the pattern-generating device 50 and implementing the methods described above is stored in the hard disk drive 48. The CPU 41 reads the program in the hard disk drive 48 according to the initial program read from the ROM 42 during the startup of the pattern-generating device 50 and expands the program on the RAM 43 to control operation of the pattern-generating device 50.

The communication I/F 49 is, for example, connected to a laser processing device through a network such as LAN (local area network). The CPU 41 controls the laser processing device through the communication I/F 49. The laser processing device is controlled on the basis of the random pattern generated in the pattern-generating device 50 or the pattern formed by tiling the random pattern appropriately.

1.7. Method for Producing Optical Film

Figure 19:
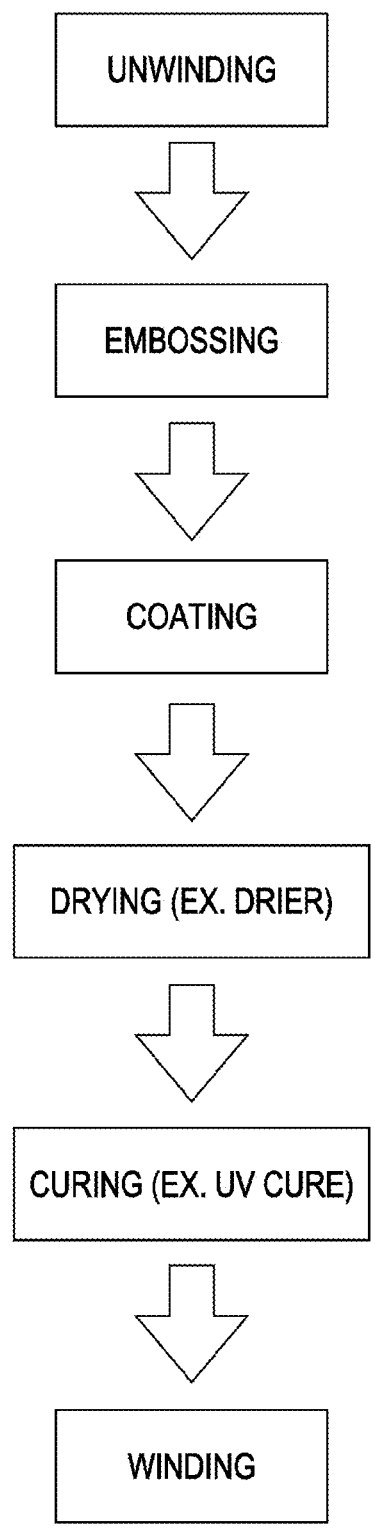
FIG. 19 is a diagram illustrating steps for fabricating an optical film according to the first embodiment.

Next, an example of a method for producing the optical film having the above-described configuration is described with reference to FIGS. 19 to 21. FIG. 19 is a diagram showings steps of producing an optical film. Note that the steps shown in FIG. 19 can be performed in-line. Here, a method for producing an optical film in which the random pattern is constituted by circles is described but the shape constituting the random pattern is not limited to circular.

A coating to be applied on the irregular surface of the substrate 11 preferably satisfies the following conditions (1) to (3). This is because of the following reason: when a coating is applied on the irregular surface of the substrate 11, the coating surface becomes flat by the surface tension of the liquid and the leveling caused by gravity and the antiglare property is lost, i.e., the cloudiness decreases and the contrast increases, but when these conditions are satisfied the decrease in the antiglare property and glaring caused by outside light can be suppressed.

(1) The coating contains a solvent that evaporates by drying and a transparent resin. The transparent resin is composed of an ultraviolet-curable resin, a thermosetting resin, a dry-curable resin, and the like the like. The coating to be applied does not have a structural viscosity immediately after application and forms a flat surface by leveling.

(2) The Coating has a gelling property that allows the coating to exhibit a structural viscosity as the solvent evaporates and to have a yield value.

(3) The coating has a property of losing its fluidity once dried (i.e., dry cure). The coating satisfying the condition (2) may contain a dry-curable resin.

In order to impart the property that satisfies the condition (2), a structural viscosity adjustor is added to the coating. Fine particles several ten nanometers in size that do not absorb visible light are preferably used as the structural viscosity adjustor in order to maintain the transparency of the coating. The amount of the particles added is preferably adequately set according to the solid content in the coating, the diameter of particles, and the surface property. Since the fluidity changes depending on the drying temperature, the amount added is set to a level that can bring about gelation at the drying temperature. Silica, alumina, titanium oxide, zirconia, tin oxide, and electrically conductive particles such as PTO, ATO, ITO, and antimony pentoxide may be used as the fine particles. Alternatively, any fine particles that can impart a structural viscosity by the interaction between the fine particles may be used and thus the fine particles are not limited to these fine particles and may contain a polymer having a functional group that bonds between the fine particles, for example.

Examples of the dry-curable resin that satisfies the condition (3) include urethane resins, acryl resin, methacryl resins, styrene resins, melamine resins, and cellulose resins that solidify once dried. Preferably, these are used while being adequately mixed with ionization radiation-curable oligomers and thermosetting oligomers. When dry-curable resins are added, the coating stops flowing as drying proceeds. The examples of the resin are not limited to those described above and, for example, a resin having an ionization radiation-curable functional group such as an acryl double bond or a thermosetting group such as a —OH group can be used as the polymer.

Figure 21A:
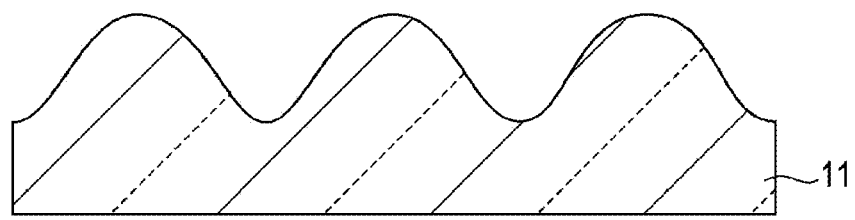
FIGS. 21A to 21C are step diagrams for describing a method for fabricating the optical film according to the first embodiment.
Figure 21B:
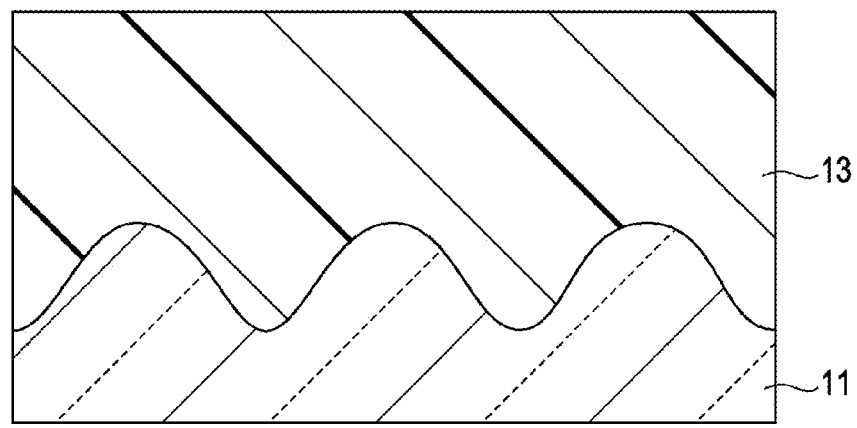
Figure 21C:
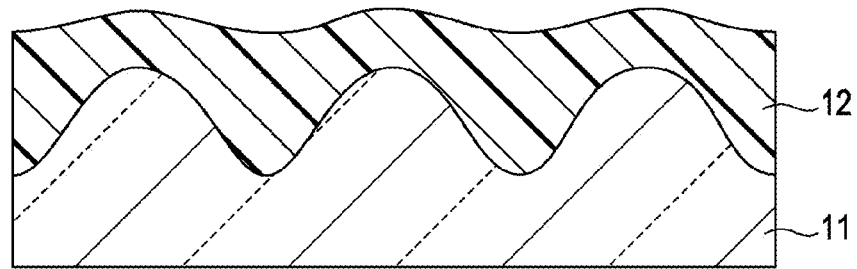

When such a coating is applied on the irregular surface of the substrate 11, the region near the coating surface first stops flowing at an early stage of drying. Then the coating shrinks in the thickness direction according to the amount of the solvent evaporated. At the same time, the coating as a whole stops flowing and the leveling in the flat plane direction is suppressed. Thus, irregularities corresponding to the depths from the coating surface to the irregularities in the base are formed in the coating surface. The irregularity height on the coating surface is smaller than the irregularity height on the base depending on the solid content before drying and thus the irregularities are smoother than the irregularities on the substrate 11. FIGS. 21A to 21C show steps of forming the coating.

Master Fabrication Step

Figure 20A:
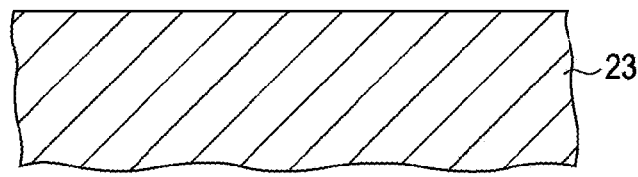
FIGS. 20A to 20C are step diagrams for describing a method for fabricating the optical film according to the first embodiment.
Figure 20B:
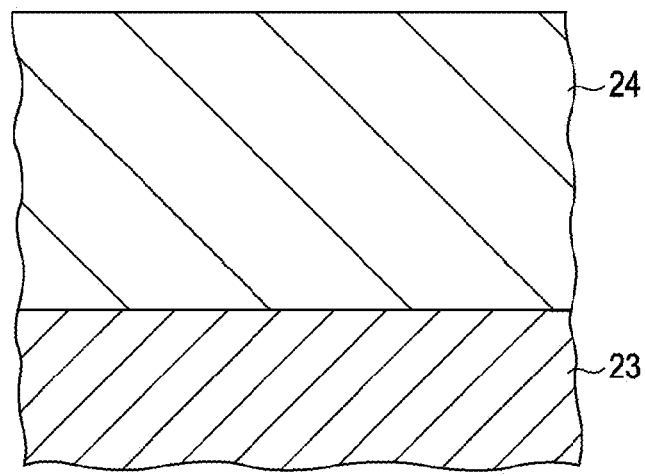
Figure 20C:
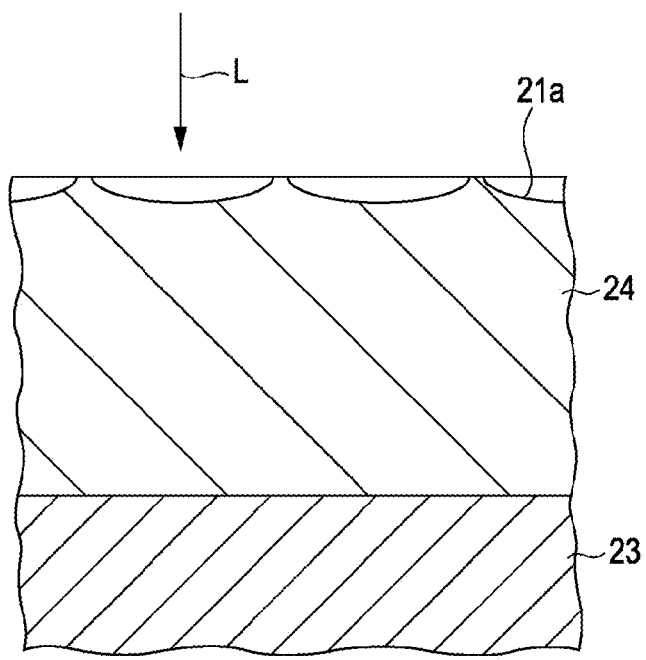

Before the steps shown in FIG. 19, the embossing roll 21 serving as a master is fabricated as follows. First, as shown in FIG. 20A, a roll 23 serving as a workpiece is prepared. The surface of this roll is composed of, for example, a metal. Next, as shown in FIG. 20B, a ceramic layer 24 is formed by ceramic spraying. Next, as shown in FIG. 20C, the pattern produced as above is formed on the surface of the roll 23 by laser processing. In particular, structures 21a which are recesses or protrusions are formed while changing the size of the bottoms of the structures (structures for transfer) 21a in the range of the minimum radius $R_m$ or more and the maximum radius $R_M$ or less and while arranging the bottoms of the structures 21a to be in contact or substantially in contact with each other. The minimum radius $R_m$ and the maximum radius $R_M$ of the bottoms of the structures 21a are adjusted to satisfy the relationship $R_m/R_M \leq 0.9$. As a result, an embossing roll (roll master) 21 having an irregular shape which is an inversion of the irregular shape of the substrate surface is obtained.

Unwinding and Transfer Step

Next, the substrate 11 wound into a roll, for example, is unwound. Next, the embossing roll 21 and the backing roll 22 sandwiching the substrate 11 are continuously rotated using the embossing transfer device shown in FIG. 6 to transfer the emboss shape onto the substrate 11. As a result, as shown in FIG. 21A, an irregular shape is formed in the surface of the substrate 11. The embossing is preferably conducted while heating and pressurizing the substrate 11. When embossing is conducted at low-temperature, low-pressure conditions, the film does not reach the bottoms of the recesses formed by laser engraving and protrusions have a small height with their tops flat. In contrast, at a high temperature and a high pressure, although the transfer amount increases, the substrate becomes thermally deformed and a good substrate 11 is not obtained. The transfer amount increases with linear load but uniform linear load is difficult to obtain in the transverse direction due to the increase in deflection of the rolls, thereby demanding economical judgment. Thus, it is critical that optimum embossing conditions be found for the physical properties and dimensions of the substrate 11.

Coating Step

Next, as shown in FIG. 21B, a hard coat solution 13 is applied on the substrate 11. Although the liquid surface of the applied hard coat solution 13 is leveled, a distribution in thickness between the substrate surface and the irregular shape exists and thus, gas-liquid interface having a smooth irregular shape is formed by the volume change caused by drying. As a result, an optical film 1 in which the amount of surface irregularities of the hard coat layer 12 is smaller than the amount of the surface irregularities of the substrate 11 can be obtained. The amount of surface irregularities of the substrate 11 can be controlled by the thickness of the hard coat solution 13 applied. Moreover, since surfaces can be formed in a non-contact manner in throughout the process from application to curing, a high-quality optical film 1 free of defects can be provided.

The coating method is not particularly limited and any common coating method may be employed. Examples of the coating method include a micro gravure coating method, a wire bar coating method, a direct gravure coating method, a die coating method, a dipping method, a spray-coating method, a reverse roll coating method, a curtain coating method, a comma coating method, a knife coating method, and a spin coating method.

The hard coat solution 13 includes, for example, a hard coat solution (coating) prepared by mixing a resin raw material such as a difunctional or higher functional monomer and/or oligomer, a photopolymerization initiator, and a solvent. The hard coat solution 13 used is preferably one that loses its fluidity by evaporation of the solvent. The fluidity is lost when the solution solidifies by drying only or has a structural viscosity and a yield value. To achieve this, for example, a dry-curable polymer, a fine particle sol, or the like is added. As a result, smoother irregularities resembling the irregularities formed by transfer can be formed and the cloudiness can be decreased while maintaining the antiglare property. When a commonly employed UV resin that levels even after drying is used, the surface becomes flat and the antiglare property is lost. Optionally, a photopolymerization initiator, a photo stabilizer, an UV absorber, an antistatic agent, a flame retarder, an antioxidant, a viscosity adjustor, and the like may be mixed and used. The amount of surface irregularities of the substrate 11 can be controlled by the solid content in the hard coat solution 13 applied and the thickness of the hard coat solution 13 applied.

As the hard coat solution, an ionization radiation-curable resin curable with light, electron beams, or the like, or a thermosetting resin curable by heat is preferably used and a photosensitive resin curable with UV rays is most preferably used from the viewpoint of ease of production. Examples of such a photosensitive resin include acrylate resins such as urethane acrylate, epoxy acrylate, polyester acrylate, polyol acrylate, polyether acrylate, and melamine acrylate. For example, a urethane acrylate resin can be obtained by reacting a polyester polyol with an isocyanate monomer or a prepolymer and then allowing the resultant product to react with a hydroxyl-containing acrylate- or methacrylate-based monomer. The properties after cure can be adequately selected. For example, from the viewpoint of image transmission property, a higher light-transmission property is preferred and from the viewpoint of scratch resistance, a high hardness is preferred. The photosensitive resin is not particularly limited to the above described examples and any photosensitive resin having a light-transmitting property can be used; however, a photosensitive resin that does not undergo large changes in the hue and quantity of transmitted light by coloring and haze is preferred. In particular, a resin having a refractive index not largely different from that of the transparent plastic substrate used is preferably used. This is because when a resin having a largely different refractive index is used, reflection occurs at the substrate interface and clouding occurs.

As the photopolymerization initiator contained in the photosensitive resin, for example, a benzophenone derivative, an acetophenone derivative, an anthraquinone derivative, and the like can be used alone or in combination. A component that improves formation of the coating, e.g., an acryl resin, may be adequately selected and added to the photosensitive resin.

The solvent preferably dissolves the resin raw material, exhibits good wettability to the transparent plastic substrate, and causes no whitening. Examples thereof include solvents composed of ketones or carboxylic acid esters such as acetone, diethyl ketone, dipropyl ketone, methyl ethyl ketone, methyl butyl ketone, methyl isobutyl ketone, cyclohexanone, methyl formate, ethyl formate, propyl formate, isopropyl formate, butyl formate, methyl acetate, ethyl acetate, propyl acetate, isopropyl acetate, butyl acetate, isobutyl acetate, sec-butyl acetate, amyl acetate, isoamyl acetate, sec-amyl acetate, methyl propionate, ethyl propionate, methyl butyrate, ethyl butyrate, and methyl lactate; and alcohols such as methanol, ethanol, isopropanol, n-butanol, sec-butanol, and tert-butanol. These solvents may be used alone or as a mixture containing two or more components, and, furthermore, solvents other than those described above may be added as long as the performance of the resin composition is not impaired.

Drying Step

Next, the hard coat solution 13 applied on the substrate is dried to evaporate the solvent. The drying conditions are not particularly limited. The drying may be conducted naturally or artificially by controlling the drying time and temperature etc. However, when wind is applied to the coating surface during drying, it is preferable not to generate any wind ripples on the coating surface. When wind ripples occur, a desired smooth undulating fine irregular shape is not easily formed in the antiglare layer surface and it becomes difficult to achieve the antiglare property and contrast simultaneously. The drying temperature and the drying time can be adequately determined on the basis of the boiling point of the solvent contained in the hard coat solution. In such a case, the drying temperature and the drying time are preferably selected by considering the thermal resistance of the substrate 11 and in the range that does not cause deformation of the substrate 11 by thermal shrinkage.

Curing and Winding Step

Next, as shown in FIG. 21C, the hard coat solution 13 dried on the transparent plastic substrate is cured by irradiation with ionization radiation or heating. As a result, a smooth fine irregular shape can be formed in which an embossed shape forms a hill. Examples of the ionization radiation that can be used include an electron beam, an UV ray, a visible light ray, and a gamma ray. From the viewpoint of production equipment, the UV ray is preferred. The integrated irradiation intensity is preferably adequately selected on the basis of the curing property of the resin by considering suppression of yellowing of the resin and the substrate 11. The atmosphere of irradiation can be adequately selected according to the condition of the curing of the resin and may be, for example, an inert gas atmosphere such as air, nitrogen, argon, and the like. Lastly, the optical film 1 is wound into a roll if necessary.

As a result, the desired optical film 1 is obtained.

According to the first embodiment, the optical film 1 includes a substrate 11 having structures 11a formed on its surface and a hard coat layer 12 formed on the substrate 11. An irregular shape is formed on the surface of the substrate 11 by the structures 11a. A continuous waveform resembling the irregular shape on the substrate 11 is formed on the surface of the hard coat layer 12. The size of the bottoms of the structures 11a changes at random in the range of the minimum distance $R_m$ or more and the maximum distance $R_M$ or less. The structures 11a are arranged and filled so that the bottoms of the structures 11a are in contact or substantially in contact with each other. The minimum distance $R_m$ and the maximum distance $R_M$ of the bottom of the structure 11a satisfy the relationship $R_m/R_M \leq 0.9$. According to the above-described configuration, moire can be prevented and the surface irregularity shape can be controlled. Moreover, smooth undulation can be formed after application of the hard coat and thus a high-contrast antiglare film that does not produce moire with blurred contours can be obtained.

2. Second Embodiment

A second embodiment differs from the first embodiment in that the embossing roll is fabricated by performing an etching process instead of the laser processing. Since other features are the same as in the first embodiment, only the process of fabricating the embossing roll is described below.

FIGS. 22 and 23 are step diagrams illustrating a method of fabricating the embossing roll according to the second embodiment.

Resist Layer-Forming Step

Figure 22A:
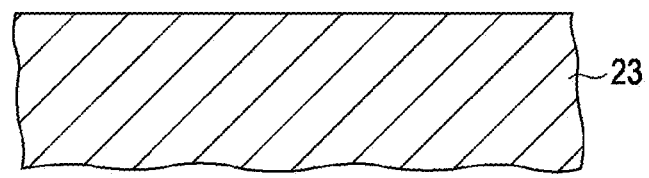
FIGS. 22A to 22C are step diagrams for describing a method for fabricating an embossing roll according to a second embodiment.
Figure 22B:
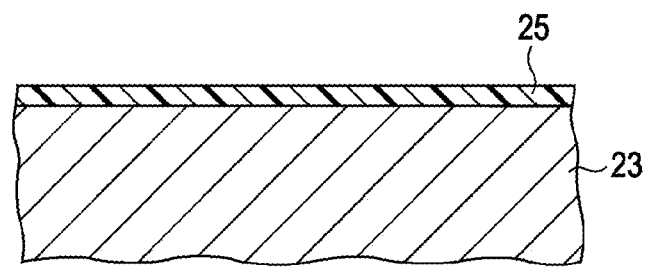

First, as shown in FIG. 22A, a roll 23 serving as a workpiece is prepared. Then, for example, as shown in FIG. 22B, a resist layer 25 is formed on the surface of the roll 23. For example, either an inorganic resist or an organic resist can be used as the material for the resist layer 25.

Exposure Step

Figure 22C:
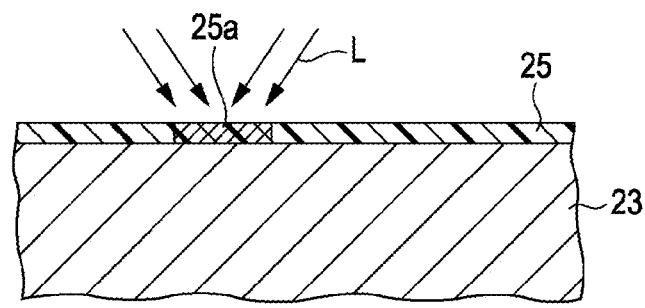

Next, as shown in FIG. 22C, the resist layer 25 is irradiated with a laser beam L to form exposure patterns 25a in the resist layer 25. The exposure patterns 25a are formed according to the pattern generated as in the first embodiment. Examples of the shape of the exposure patterns 25a include a circular shape, an elliptic shape, and a polygonal shape. In particular, the laser beam L is applied to the resist layer 25 while the size of the exposure patterns 25a is changed at random within the range of the minimum distance $R_m$ or more and the maximum distance $R_M$ or less and while the exposure patterns 25a are arranged to contact or substantially contact each other. Furthermore, the minimum distance $R_m$ and the maximum distance $R_M$ of the exposure patterns 25a are adjusted to satisfy the relationship $R_m/R_M \leq 0.9$. Note that when the bottom of each exposure pattern 25a is circular in shape, the minimum distance $R_m$ is the minimum radius $R_m$ and the maximum distance $R_M$ is the maximum radius $R_M$ in the above-described relationships. When the bottom of each exposure pattern 25a is elliptical in shape, the minimum distance $R_m$ is the minimum value $R_m$ of the short axis length (minor axis) and the maximum distance $R_M$ is the maximum value $R_M$ of the long axis length (major axis).

Development Step

Figure 23A:
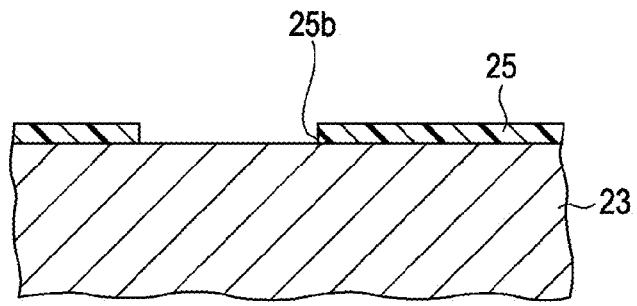
FIGS. 23A to 23D are step diagrams for describing the method for fabricating the embossing roll according to the second embodiment.

Next, the resist layer 25 with the exposure patterns 25a formed therein is developed, for example. As a result, as shown in FIG. 23A, openings 25b corresponding to the exposure patterns 25a are formed in the resist layer 25. Note that although a positive resist is used as the resist and openings 25b are formed in exposed regions in the example shown in FIG. 23A, the resist is not limited to this example. In other words, a negative resist may be used as the resist and the exposed regions may be left intact.

Etching Step

Figure 23B:
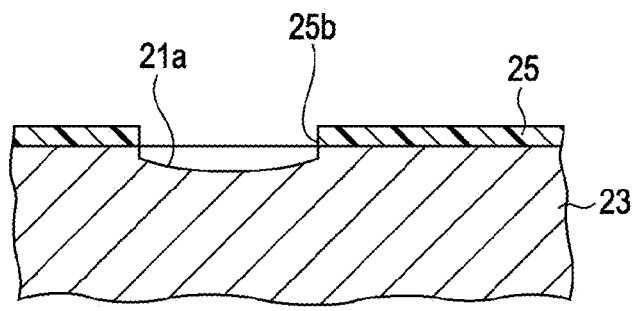

Next, for example, the surface of the roll 23 is etched using the resist layer 25 with the openings 25b as a mask. As a result, structures 21a are formed as shown in FIG. 23B. Either thy etching or wet etching may be employed as the etching but wet etching is preferred since the facility is simple. For example, either isotropic etching or anisotropic etching may be employed as the etching.

Resist Stripping Step

Figure 23C:
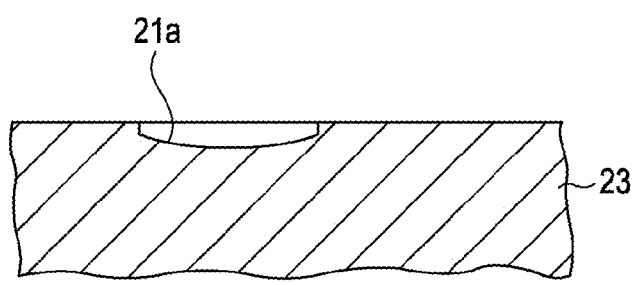

Next, as shown in FIG. 23C, the resist layer 25 formed on the substrate surface is stripped by, for example, ashing. As a result, an embossing roll (roll master) 21 having an irregular shape which is an inversion of the irregular shape on the surface of the substrate 11 is obtained.

Plating Step

Figure 23D:
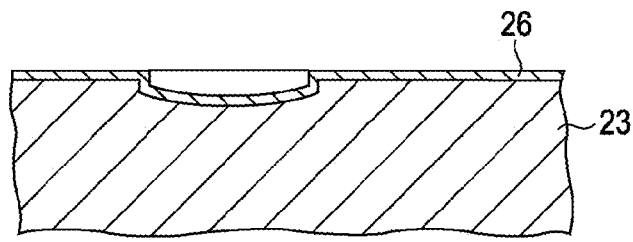

Next, as shown in FIG. 23D, if necessary, a plating layer 26 such as nickel plating is formed by plating the surface of the embossing roll 21.

As a result, the embossing roll 21 is obtained.

The second embodiment achieves the same advantages as the first embodiment.

3. Third Embodiment

Figure 24:
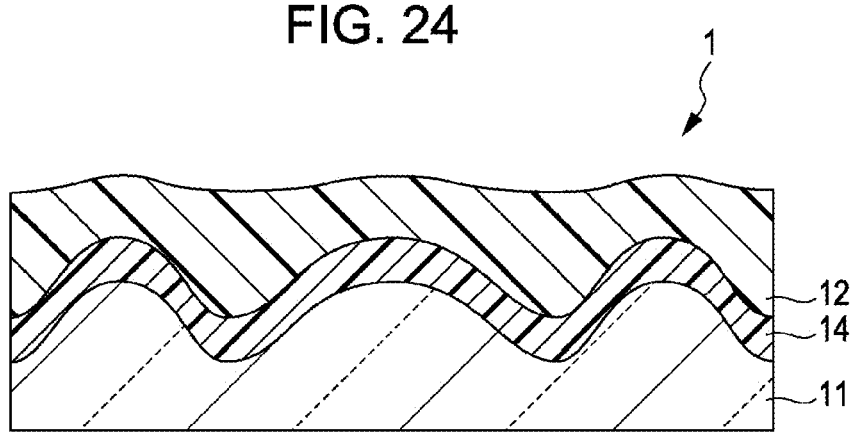
FIG. 24 is a cross-sectional view showing one example of a structure of an optical film according to a third embodiment.

FIG. 24 is a cross-sectional view showing one example of a structure of an optical film according to a third embodiment. As shown in FIG. 24, the optical film is different from that of the first embodiment in that an antistatic layer 14 is interposed between the substrate 11 and the hard coat layer 12. Since the substrate 11 and the hard coat layer 12 are the same as those of the first embodiment described above, they are represented by the same reference symbols and description therefor is omitted.

The antistatic layer 14 contains a resin and an antistatic agent. Optionally, additives such as a photostabilizer, an UV absorber, a flame retarder, an antioxidant, and a viscosity modifier may be added to the antistatic layer. As the resin and the antistatic agent, those the same as those used in the hard coat layer 12 in the first embodiment may be used.

Since the antistatic layer 14 is interposed between the substrate 11 and the hard coat layer 12 in the third embodiment, occurrence of moire can be suppressed and an optical film that has a high antiglare property, a high contrast, scratch resistance, and an antistatic function can be obtained.

4. Fourth Embodiment

Figure 25:
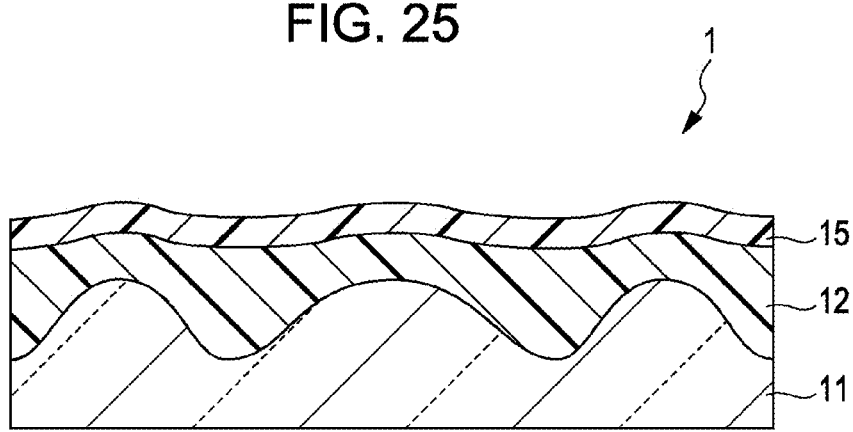
FIG. 25 is a cross-sectional view showing one example of a structure of an optical film according to a fourth embodiment.

FIG. 25 is a cross-sectional view showing one example of a structure of an optical film according to a fourth embodiment. As shown in FIG. 25, the optical film 1 differs from that of the first embodiment in that an antireflection layer 15 is provided on the hard coat layer 12. Since the substrate 11 and the hard coat layer 12 are the same as those of the first embodiment described above, they are represented by the same reference symbols and description therefor is omitted.

A low-refractive-index layer containing hollow fine particles or a low-refractive-index layer containing a fluorocarbon resin can be used as the antireflection layer 15, for example. Examples of the hollow fine particles include inorganic fine particles such as silica and alumina and organic fine particles such as styrene and acryl, but silica fine particles are particularly preferred. Since hollow fine particles incorporate air, the refractive index thereof is lower than normal particles. For example, whereas the refractive index of silica fine particles is 1.46, the refractive index of hollow silica fine particles is $\leq 1.45$.

Since the antireflection layer 15 is provided on the hard coat layer 12 in the fourth embodiment, the antiglare property can be improved compared to the first embodiment.

5. Fifth Embodiment

In a fifth embodiment, the optical film used as the antiglare film in the first embodiment is used as an anti Newton-ring (ANR) film.

Figure 26:
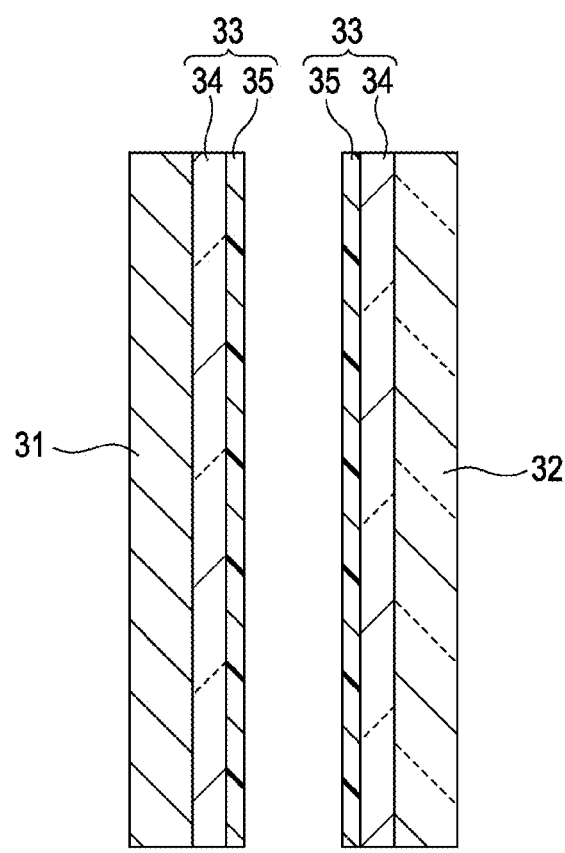
FIG. 26 is a cross-sectional view showing one example of a structure of a display apparatus according to a fifth embodiment.

FIG. 26 is a cross-sectional view showing one example of a structure of a display apparatus according to the fifth embodiment. This display apparatus includes a display unit 31 and a front face member 32 disposed in front of the display unit 31. An air layer is formed between the display unit 31 and the front face member 32, for example. An optical film 33 is provided on at least one of the front face side of the display unit 31 and the back face side of the front face member 32. In FIG. 26, an example of a display apparatus including two optical films 33 respectively disposed at the front face side of the display unit 31 and the back face side of the front face member 32 is shown. From the viewpoint of suppressing occurrence of Newton rings, it is preferable to provide two optical films 33 respectively at the display surface side of the display unit 31 and the back face side of the front face member 32. The optical films 33 are bonded to the front face member 32 and the display unit 31 with an adhesive or the like. For the purpose of the present invention, the front face refers to a face at the display surface side, i.e., the observer side, and the back face refers to a face opposite the display surface.

Examples of the display unit 31 that can be used include liquid crystal displays, cathode ray tube (CRT) displays, plasma display panels (PDPs), organic electroluminescence (EL) displays, inorganic EL displays, surface-conduction electron-emitter displays (SEDs), and field emission displays (FEDs).

The front face member 32 is used to provide protections to the front face (observer side) of the display unit 31 from mechanical impact, heat, and weather and for design purposes. The front face member 32 may be a sheet, a film, or a plate, for example. Examples of the material for the front face member 32 include glass, triacetyl cellulose (TAC), polyester (TPEE), polyethylene terephthalate (PET), polyimide (PI), polyamide (PA), aramid, polyethylene (PE), polyacrylate, polyether sulfone, polysulfone, polypropylene (PP), diacetyl cellulose, polyvinyl chloride, acryl resin (PMMA), and polycarbonate (PC) but are not limited to these. Any material that has transparency can be used.

Figure 27:
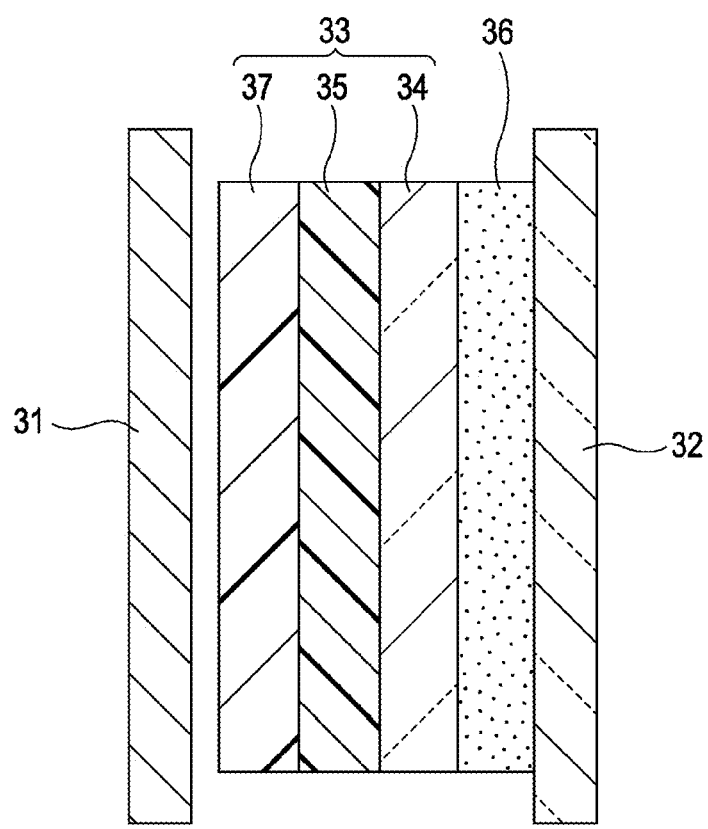
FIG. 27 is a cross-sectional view showing one example of a structure of an optical film according to the fifth embodiment.

FIG. 27 is a cross-sectional view showing an example of the structure of the optical film. An optical film 33 is provided to suppress occurrence of Newton rings in the display apparatus. As shown in FIG. 27, the optical film 33 includes a substrate 34 and a hard coat layer 35 disposed on the substrate 34. The optical film 33 is bonded to an adherend such as the front face member 32 with an adhesive layer 36 therebetween. The adhesive layer 36 is mainly composed of an adhesive. Adhesives commonly used in the technical field of optical films can be used as the adhesive, for example. Note that for the purposes of this specification, tackiness agents such as pressure sensitive adhesives (PSAs) are also regarded as one type of adhesives.

As the optical film 33, a film the same as the optical film 1 in the first embodiment can be used. In particular, the substrate 34 may be the same as the substrate 11 in the first embodiment and the hard coat layer 35 may the same as the hard coat layer 12 in the first embodiment.

As shown in FIG. 27, from the viewpoint of reducing the reflected light, an antireflection (AR) layer 37 is preferably formed on the hard coat layer 35. The AR layer 37 may be either a dry type or a wet type but is preferably a wet type. Examples of the wet-type AR layer 37 include those containing fluorocarbon resins and those containing hollow fine particles such as silica.

According to the fifth embodiment, the optical film 33 is disposed on at least one of the front face side of the display unit 31 and the back face side of the front face member 32. As a result, the occurrence of the Newton ring can be suppressed or reduced to a level that the Newton rings are not noticeable.

6. Sixth Embodiment

Figure 28:
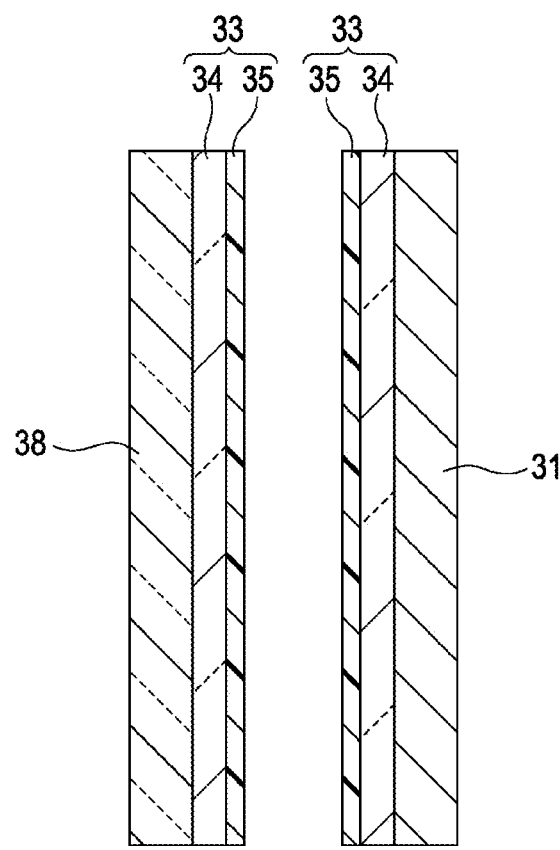
FIG. 28 is a cross-sectional view showing an example of a structure of a display apparatus according to a sixth embodiment.

FIG. 28 is a cross-sectional view showing an example of a configuration of a display apparatus according to a sixth embodiment. The sixth embodiment differs from the fifth embodiment in that the display unit 31 and a back face member 38 behind the display unit 31 are provided and that at least one of the back face side of the display unit 31 and the front face side of the back face member 38 has the optical film 33 thereon.

FIG. 28 shows an example of a display apparatus including two optical films 33 respectively disposed at the back face side of the display unit 31 and the front face side of the back face member 38. The parts similar to those of the fifth embodiment are referred to by the same reference characters and the description therefor is omitted.

The back face member 38 may be a sheet, a film, or a plate, for example. When the display unit is a liquid crystal display, the back face member 38 is a diffusing plate or sheet for making the light source luminance uniform in the surface, a lens film for controlling the viewing angle, a polarization beam separation reflection film for polarizing and separating the light from the light source to use the light again, or the like, for example.

According to the sixth embodiment, since at least one of the back face side of the display unit 31 and the front face side of the back face member 38 has the optical film 33 thereon, the occurrence of the Newton rings can be suppressed or reduced to a level that the Newton rings are not noticeable.

7. Seventh Embodiment

FIG. 29 is a flowchart illustrating an example of a method for making an antiglare film according to a seventh embodiment. FIGS. 30 to 32 are step diagrams illustrating a method for fabricating an optical film according to the seventh embodiment. The seventh embodiment differs from the second embodiment in that after a first etching process is conducted on the surface of the master by using an etching mask having a plurality of openings, the etching mask is removed from the master surface and a second etching process is performed on the entire surface of the master.

Here, a depth D1 for the first etching process is the largest depth among the recessed structures formed in the master surface by the first etching process. Usually, D1 is determined by the etching rate of the etchant and the etching process time. When the same etchant is used and the amount etched is not so large, D1 increases substantially in proportion to the etching process time Te1.

When the first etching process depth D1 is obtained by etching for a process time Te1, the etching rate of the etchant can be defined as D1/Te1.

The second etching process is conducted to etch the entire surface of the roll for a predetermined time Te2 by using the etchant having the thus determined etching rate D1/Te1. The value obtained by multiplying the etching rate D1/Te1 with Te2 is defined as a second etching process depth D2 (D2= (D1/Te1)·Te2).

The method for making the antiglare film according to the seventh embodiment will now be described with reference to the flowchart shown in FIG. 29 and the step diagrams shown in FIGS. 30 to 32.

Plating Step

In step S101, the surface of the substrate 21, i.e., the workpiece, is plated as occasions demand to form a plating layer such as copper plating. The shape of the substrate 21, i.e., the workpiece, may be a plate, a sheet, a film, a block, a column, a cylinder, or the like.

Resist Layer-Forming Step

Figure 30A:
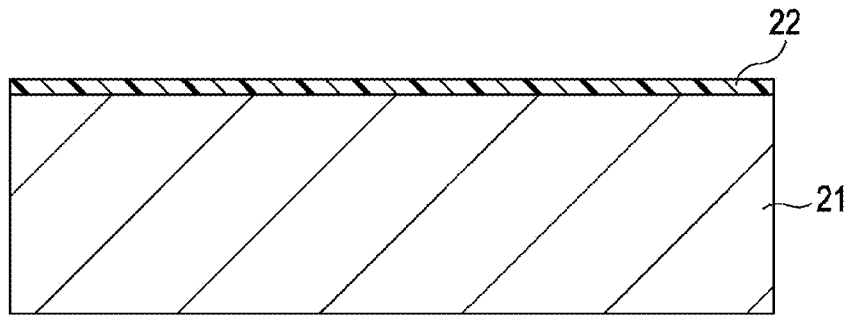
FIGS. 30A to 30C are step diagrams illustrating an example of a method for making an antiglare film according to the seventh embodiment.

Next, in step S102, a resist layer 22 is formed on a surface of the substrate 21 (refer to FIG. 30A). For example, either an inorganic resist or an organic resist can be used as the material for the resist layer 22. When the substrate 21 is columnar or cylindrical in shape, it is preferable to form the resist layer 22 on its outer peripheral surface.

Exposure Step

Figure 30B:
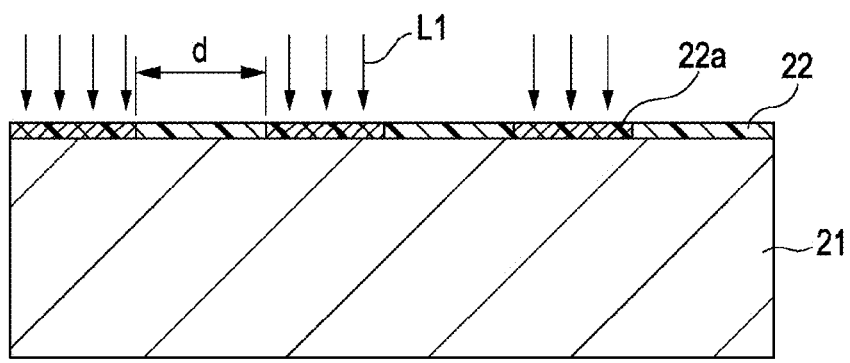
Figure 30C:
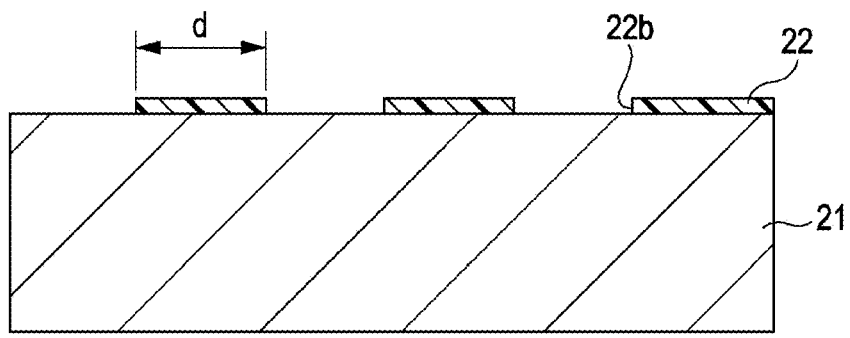

Next, in step S103, for example, the resist layer 22 is irradiated with a laser beam L1 to form a plurality of exposed portions 22a having a particular exposure pattern in the resist layer 22 (refer to FIG. 30B). For example, the laser beam L1 is applied to the resist layer 22 while the size of the exposed portions 22a is changed at random within the range of the minimum distance $R_m$ or more and the maximum distance $R_M$ or less and while the exposed portions 22a are arranged to contact or substantially contact each other. Furthermore, the minimum distance $R_m$ and the maximum distance $R_M$ of the exposed portions 22a are adjusted to satisfy the relationship $R_m/R_M \leq 0.9$. Here, the minimum distance $R_m$ is the shortest distance from the center of gravity to the rim of the exposed portion 22a and the maximum distance $R_M$ is the largest distance from the center of gravity to the rim of the exposed portion 22a. Examples of the shape of the exposed portions 22a include a circular shape, an elliptic shape, and a polygonal shape. When the exposed portions 22a are circular in shape, the minimum distance $R_m$ is the minimum radius $R_m$ and the maximum distance $R_M$ is the maximum radius $R_M$. When the exposed portions 22a are elliptical in shape, the minimum distance $R_m$ is the minimum value $R_m$ of the short axis length (minor axis) and the maximum distance $R_M$ is the maximum value $R_M$ of the long axis length (major axis).

Development Step

Next, in step S104, the resist layer 22 with the exposed portions 22a formed therein is developed. As a result, openings 22b corresponding to the exposed portions 22a are formed in the resist layer 22 (refer to FIG. 30C). Note that although a positive resist is used as the resist and the exposed portions 22a form the openings 22b in the example shown in FIG. 30C, the resist is not limited to this example. In other words, a negative resist may be used as the resist and the exposed portions 22a may be left intact.

The smallest interval d between neighboring openings 22b is preferably 1 μm or more and (D2×4) μm or less. Here, D2 represents an etch depth (amount) achieved by the re-etching (second etching process). When the smallest interval is less than 1 µm, the wall between the recesses having a columnar shape or the like collapses and the recesses connect to each other during re-etching, the area of the flat portions tends to increase, and the antiglare property tends to decrease. When the smallest interval exceeds (D2×4) µm, the area of the flat portions increases and the antiglare property tends to decrease despite re-etching of the entire surface of the substrate 21.

Etching Step

Next, in step S105, the surface of the substrate 21 is etched (first etching process) using the resist layer 22 having openings 22b therein as an etching mask. As a result, recesses 21a are formed (refer to FIG. 31A). Either dry etching or wet etching may be employed as the etching but wet etching is preferred since the facility is simple. Either isotropic etching or anisotropic etching may be employed as the etching and appropriate selection is preferably made on the basis of the desired shape of the structures 11a. The etch depth D1 is preferably 0.5 µm or more and 10 µm or less. When the etch depth is less than 0.5 µm, it becomes necessary to reduce the thickness of the hard coat to maintain the antiglare property and this tends to result in deterioration of the pencil hardness. Furthermore, the recesses become shallow or the area of the flat portions increases by the re-etching process and this tends to result in a decrease in antiglare property. If the depth exceeds 10 µm, coarse textures are generated after application of the hard coat or the thickness of the hard coat is increased to reduce clouding, thereby resulting in increased curling. Moreover, the transfer rate tends to lower and the productivity tends to be degraded. The etchant may be a cupric chloride etchant (cupric chloride, hydrochloric acid, and water) solution but is not limited to this.

Resist Stripping Step

Figure 31A:
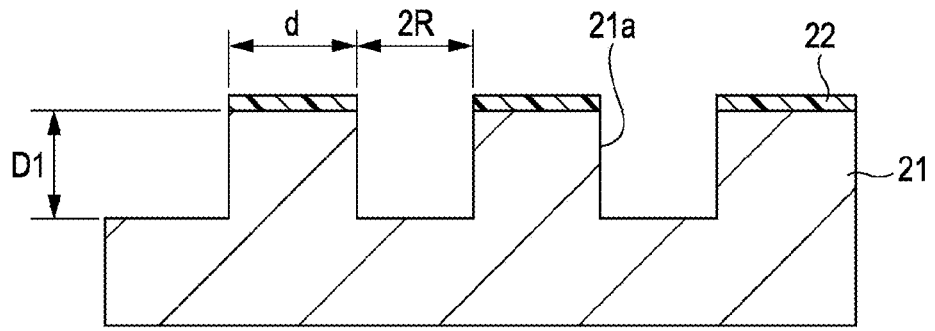
FIGS. 31A to 31D are step diagrams illustrating an example of a method for making an antiglare film according to the seventh embodiment.
Figure 31B:
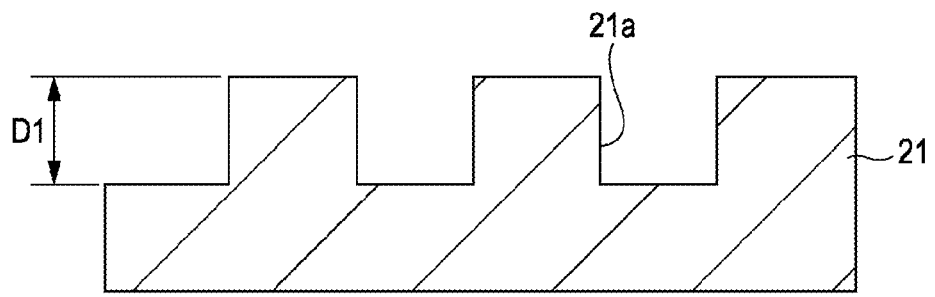
Figure 31C:
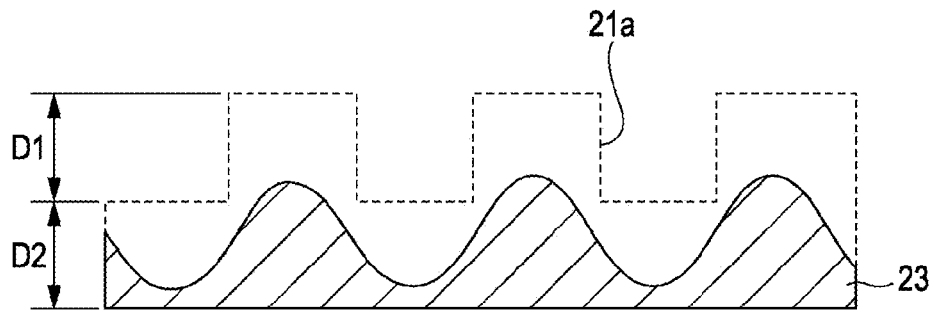

Next, in step S106, the resist layer 22 formed on the surface of the substrate is stripped by ashing or the like (refer to FIG. 31B). As a result, recesses 21a having the same depth are formed in the substrate surface. That is, an irregular surface is formed on the substrate surface.

Re-etching Step

Next, in step S107, the entire irregular surface of the substrate 21 is re-etched (second etching process). As a result, the shape of the recesses 21a formed on the surface of the substrate 21 can be changed, for example, from a columnar shape to a dome shape and a master 23 having a smooth irregular surface is obtained thereby (refer to FIG. 31C). The irregular surface of the master 23 is the inversion of the irregular surface of the substrate 11 and is preferably a continuous wavy surface. This is because the continuous wavy surface can be transferred onto the substrate 11. Here, the "continuous wavy surface" means that there is no discontinuity or steps in the master surface and the surface is smooth and, in particular, that differentiation is possible at any desired points on the master surface. The etch depth D2 of the re-etching is preferably (D1×0.6) µm or more and (D1×2) µm or less. If the depth is less than (D1×0.6) µm, formation of the dome shape or the like is not sufficient, the flat portions remain, linear slopes are formed, and the improvements on the antiglare property tend to be insufficient. In contrast, when the depth exceeds (D1×2) µm, the recesses become excessively shallow or the area of the flat portions increases, which tends to decrease the antiglare property.

The structures (structures for transfer) 21a formed on the master (e.g., roll master) 23 can be identified as openings defined by a particular shape and size and as recessed structures having a particular depth formed in the master surface. In other words, they can be identified as the structures which are inversion of the structures formed on the film.

In order to identify or measure the shape of the recessed structures, a replica shape (protruding structure) taken from the master 23 may be obtained using an UV curable resin or the like. For example, a replica can be taken from the master 23 using an UV curable resin as follows. First, an adequate amount of an UV curable resin is filled in the gap between the master surface and a transparent film substrate (e.g., a PET film) having a flat surface, and the UV curable resin is sufficiently leveled until it spreads flat in the region sandwiched by the film and the master 23. Then the UV curable resin is cured by irradiation of UV light from the film side for an adequate length of time to cure the resin. Subsequently, the film is removed from the master surface so that a replica having protruding structures and being composed of the UV curable resin can be obtained on the film substrate.

As for the definitions of the center of gravity, radius, and depth of the structures 21a for transfer (recessed structures), the definitions associated with the structures 11a on the optical element described above can be used for the protruding structures of the replica. Here, the depth of the structure 21a for transfer means the height of the protruding structure of the replica and the Z axis is a direction perpendicular to the surface of the film substrate used to take the replica. Moreover, the projection plane for defining the bottom and the radius is any plane perpendicularly intersecting the Z axis. The same measurement method as that used in evaluating the structures 11a on the optical element may be applied.

Plating Step

Next, in step S108, the irregular surface of the master 23 is plated as occasions demand to form a plating layer such as Cr plating.

Shape Transfer Step

Figure 31D:
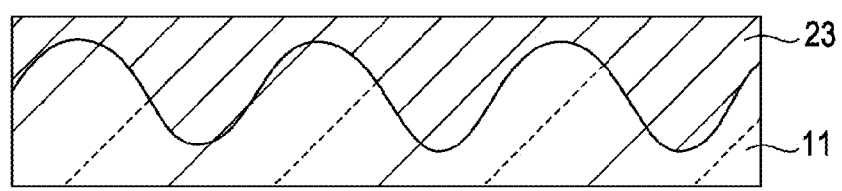

Next, in step S109, the master 23 is pressed against the flat surface of the substrate 11 while heating the substrate 11 so as to transfer the irregular shape of the master 23 onto the substrate 11 (refer to FIG. 31D). As a result, a substrate 11 having an irregular surface is obtained.

Coating Step

Figure 32A:
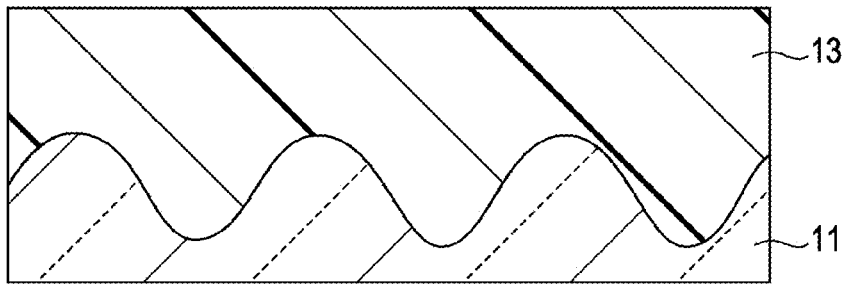
FIGS. 32A to 32C are step diagrams illustrating an example of a method for making an antiglare film according to the seventh embodiment.
Figure 32B:
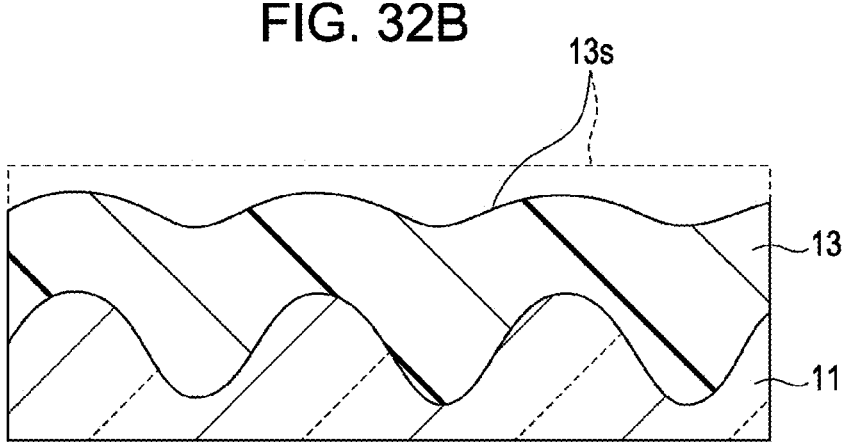
Figure 32C:
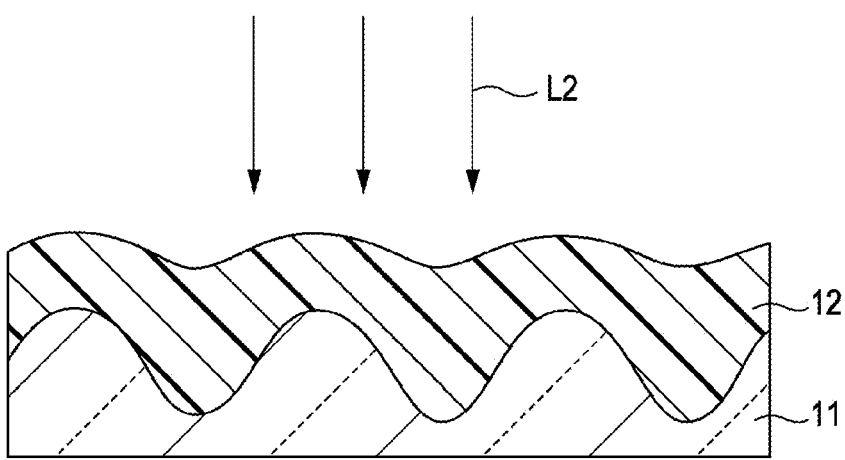

Next, in step S110, a resin composition (also referred to as "coating" hereinafter) 13 is applied on the irregular surface of the substrate 11 (refer to FIG. 32A). The coating method is not particularly limited and any common coating method may be employed. Examples of the coating method include a micro gravure coating method, a wire bar coating method, a direct gravure coating method, a die coating method, a dipping method, a spray-coating method, a reverse roll coating method, a curtain coating method, a comma coating method, a knife coating method, and a spin coating method.

Resin Composition

The resin composition preferably has properties that allow the viscosity to increase and the fluidity to be lost in the drying step (step S111) which is a step performed later. This is because the resin composition can follow the irregular surface of the substrate 11 in the drying step performed later. From the viewpoint of ease of production, an ionization radiation-curable resin that can be cured with light, an electron beam, or the like, or a thermosetting resin that can be cured by heat is preferably used in the resin composition. The ionization radiation-curable resin is preferably a photosensitive resin composition that cures by light and most preferably an UV-curable resin composition that cures by UV light. The ionization radiation-curable resin or the thermosetting resin preferably contains a viscosity adjustor and a solvent. This is because when these materials are incorporated, the resin composition can follow the irregular surface of the substrate 11 in the drying step performed later.

UV Curable Resin Composition

The UV curable resin composition contains, for example, an acrylate, a photopolymerization initiator, a viscosity adjustor, and a solvent. Preferably, the UV curable resin composition further contains an antifoulant from the viewpoint of imparting an antifouling property. The UV curable resin composition preferably further contains a leveling agent from the viewpoint of improving the wettability to the substrate 11. The UV curable resin composition preferably further contains an antistatic agent from the viewpoint of imparting an antistatic function to an antiglare film 1. Moreover, the UV curable resin composition may further contain, if occasions demand, an organic or inorganic filler that imparts an internal haze to the hard coating. When a filler is to be contained as such, the difference in refractive index between the filler and the matrix is preferably 0.01 or more. The average particle diameter of the filler is preferably 0.1 to 1 μm. The UV curable resin composition may further contain a photostabilizer, a flame retardant, an antioxidant, and the like, as occasions demand.

The acrylate, photopolymerization initiator, viscosity adjustor, solvent, antistatic agent, antifoulant, and leveling agents are described one by one below.

Acrylate

A monomer and/or an oligomer having two or more (meth)acryloyl groups is preferably used as the acrylate. Examples of such a monomer and/or oligomer that can be used include urethane(meth)acrylate, epoxy(meth)acrylate, polyester(meth)acrylate, polyol(meth)acrylate, polyether(meth)acrylate, and melamine(meth)acrylate. Here, "(meth)acryloyl group" refers to either an acryloyl group or a methacryloyl group. Moreover, the "oligomer" refers to a molecule having a molecular weight of 500 or more and 60000 or less.

Photopolymerization Initiator

A photopolymerization initiator appropriately selected from existing materials can be used. Examples of the existing materials include benzophenone derivatives, acetophenone derivatives, anthraquinone derivatives, and the like. They can be used alone or in combination. The content of the polymerization initiator is preferably 0.1 mass % or more and 10 mass % or less of the solids. At a content less than 0.1 mass %, the photocurability is degraded and such a photopolymerization initiator is substantially not suitable for industrial production. At a content exceeding 10 mass %, odor tends to remain in the coatings when the irradiation intensity is small. Here, the "solids" refers to all components that constitute the hard coat layer 12 after curing, e.g., all components other than the solvent and the viscosity adjustor. To be more specific, the acrylate, the photopolymerization initiator, the inorganic oxide filler, the antistatic agent, the leveling agent, the antifoulant, etc., are referred to as the solids.

Viscosity Adjustor

As the viscosity adjustor (structural viscosity adjustor), an inorganic and/or organic viscosity adjustor may be used and preferably both inorganic and organic viscosity adjustors are used. This is because the shape-following property increases when both are used. For example, an inorganic oxide filler may be used as the inorganic viscosity adjustor. Examples of the inorganic filler that can be used include silica, alumina, zirconia, antimony pentoxide, zinc oxide, tin oxide, indium tin oxide (ITO), indium oxide, antimony-doped tin oxide (ATO), and aluminum zinc oxide (AZO). The inorganic oxide filler is preferably surface-treated with an organic dispersant terminated with a functional group such as a (meth)acryl group, a vinyl group, an epoxy group, or the like. For example, a silane coupling agent having the above-described functional group at a terminus is preferred as the organic dispersant. An example of the silane coupling agent having an acryl group at its terminus is KBM-5103 produced by Shin-Etsu Chemical Co., Ltd. Examples of the silane coupling agent having a methacryl group at its terminus include KBM-502, ICBM-503, KBE-502, and KBE-503 produced by Shin-Etsu Chemical Co., Ltd. Examples of the silane coupling agent having a vinyl group at its terminus include KA-1003, KBM-1003, and KBE-1003 produced by Shin-Etsu Chemical Co., Ltd. Examples of the silane coupling agent having an epoxy group at its terminus include KBM-303, KBM-403, KBE-402, and KBE-403 produced by Shin-Etsu Chemical Co., Ltd. Other than the silane coupling agents, organic carboxylic acids may be used. When such a surface-treated inorganic oxide filler is used, the inorganic oxide filler integrates with a nearby acrylate, such as (meth)acryl monomer and/or oligomer, in the step of curing the coating described below, and thus the hardness and the flexibility of the coating are improved.

The inorganic oxide filler preferably have OH groups and the like on its surface. In this manner, in the step of drying the coating described below, hydrogen bonds or coordinate bonds are formed between the OH groups and the like on the surface of the inorganic oxide filler and the functional groups of the viscosity adjustor as the solvent evaporates, resulting in an increase in the viscosity of the coating, preferably, gelation of the coating. When the viscosity increases, the coating follows the irregular shape on the substrate 11 and an irregular shape resembling the irregular shape of the substrate 21 is formed in the coating surface.

The average particle diameter of the inorganic oxide filler is, for example, 1 nm or more and 100 nm or less. The inorganic oxide filler content is preferably 10 mass % or more and 70 mass % or less of the solids. Here, the total of the solids is set to 100 mass %. At a content of less than 10 mass %, the system tends not to become viscous during the course of solvent evaporation or the coating tends to become turbid or the coating hardness tends to degrade due to the excessively large amount of the viscosity adjustor used to achieve the high viscosity. In contrast, at a content exceeding 70 mass %, the flexibility of the cured film tends to degrade.

Examples of the organic viscosity adjustor include molecules having hydroxyl groups (OH groups), carboxyl groups (COOH groups), urea groups (—NH—CO—NH—), amide groups (—NH—CO—), and amino groups (NH2), and, preferably, a molecule having two or more of at least one type of functional group selected from these functional groups is used. From the viewpoint of suppressing aggregation of the inorganic oxide filler, a molecule having carboxyl groups is preferably used as the viscosity adjustor. Common anti-sagging agents or anti-sedimentation agents may also be used. Preferable examples of the viscosity adjustor include BYK-405, BYK-410, BYK-411, BYK-430, and BYK-431 produced by BYK Japan KK, and Talen 1450, Talen 2200A, Talen 2450, Flowlen G-700, and Flowlen G-900 produced by Kyoeisha Chemical Co., Ltd. The viscosity adjustor content is preferably 0.001 to 5 parts by mass relative to the 100 parts by mass of the entire coating. The optimum content is preferably adequately selected on the basis of the material type and content of the inorganic oxide filler, the material type of the viscosity adjustor, and the desired hard coat thickness.

Solvent

A solvent that dissolves the resin raw material such as acrylate, has good wettability on the substrate 11, and does not cause whitening of the substrate 11 is preferable as the solvent. Examples thereof include solvents composed of ketones or carboxylic acid esters such as acetone, diethyl ketone, dipropyl ketone, methyl ethyl ketone, methyl butyl ketone, methyl isobutyl ketone, cyclohexanone, methyl formate, ethyl formate, propyl formate, isopropyl formate, butyl formate, methyl acetate, ethyl acetate, propyl acetate, isopropyl acetate, butyl acetate, isobutyl acetate, sec-butyl acetate, amyl acetate, isoamyl acetate, sec-amyl acetate, methyl propionate, ethyl propionate, methyl butyrate, ethyl butyrate, and methyl lactate; alcohols such as methanol, ethanol, isopropanol, n-butanol, sec-butanol, and tert-butanol; and ethers such as tetrahydrofuran, 1,4-dioxane, and 1,3-dioxolane. These solvents may be used alone or as a mixture containing two or more components, and, furthermore, solvents other than those described above may be added as long as the performance of the resin material is not impaired.

Antistatic Agent

As described above, the resin composition preferably further contains an antistatic agent. At least one selected from a quaternary ammonium salt, an electrically conductive polymer, an ionic liquid, and electrically conductive fine particles is preferably contained as the antistatic agent.

A compound intramolecularly containing a quaternary ammonium base is preferred as the quaternary ammonium salt. A monomer and/or oligomer having one or more quaternary ammonium bases and one or more (meth)acryloyl groups is preferably used as the compound intramolecularly containing a quaternary ammonium base. Due to the quaternary ammonium base in the molecule, the antistatic function can be imparted to the hard coat layer 12. When the monomer and/or oligomer contains (meth)acryloyl groups, it integrates with a matrix resin or the like by irradiation with UV light. As a result, bleeding out of the quaternary ammonium salt is suppressed.

Examples of the compound intramolecularly containing a quaternary ammonium base include methacryloyloxyethyltrimethylammonium chloride, acryloyloxyethyltrimethylammonium chloride, acryloylaminopropyltrimethylammonium chloride, methacryloylaminopropyltrimethylammonium chloride, acryloyloxyethyldimethylbenzylammonium chloride, methacryloyloxyethyldimethylbenzylammonium chloride, methacryloylaminopropyldimethylbenzylammonium chloride, methacryloyloxyethyltrimethylammoniummethyl sulfate, methacryloylaminopropyltrimethylammoniummethyl sulfate, methacryloyloxyethyldimethylethylammoniumethyl sulfate, methacryloylaminopropyldimethylethylammoniumethyl sulfate, methacryloyloxyethyltrimethylammonium p-toluenesulfonate, and methacryloylaminopropyltrimethylammonium p-toluenesulfonate.

Examples of the electrically conductive polymer include substituted or unsubstituted polyanilines, polypyrroles, polythiophenes, and (co)polymers constituted by at least one selected from the foregoing. In particular, polypyrrole, polythiophene, poly(N-methyl pyrrole), poly(3-methoxythiophene), poly(3,4-ethylenedioxythiophene), and a (co)polymer constituted by at least one selected from the foregoing are preferred.

An electrically conductive polymer having a good compatibility with the UV curable resin composition is preferably selected as the eclectically conductive polymer. When the compatibility is low, the amount of the electrically conductive polymer used to achieve the desired antistatic performance increases and deterioration of mechanical properties, coloring (deterioration of the transparent), and the like may be induced.

From the viewpoint of improving the electrical conductivity, the electrically conductive polymer preferably contains a dopant. Examples of the dopant include halogen compounds, Lewis acids, and protic acids. Specific examples thereof include organic acids such as organic carboxylic acids and organic sulfonic acids, organic cyano compounds, fullerene, hydrogenated fullerene, carboxylated fullerene, and sulfonated fullerene. A polyethylenedioxythiophene solution doped with a polystyrene sulfonic acid is preferred since it has a relatively high heat stability and a low degree of polymerization, which is advantageous for achieving transparency after formation of the coating.

Antifoulant

As described above, the resin composition preferably further contains an antifoulant. Preferably, a silicone oligomer and/or fluorine-containing oligomer containing at least one (meth)acryl group, vinyl group, or epoxy group is used as the antifoulant. When alkali resistance is to be imparted to the optical film 1, a fluorine-containing oligomer is preferably used. The content of the silicone oligomer and/or fluorine-containing oligomer is preferably 0.01 mass % or more and 5 mass % or less of the solids. At a content less than 0.01 mass %, the antifouling function tends to be insufficient. In contrast, at a content exceeding 5 mass %, the hardness of the coating tends to decrease. Preferred examples of the antifoulant include RS-602 and RS-751-K produced by DIC Corporation, CN4000 produced by Sartomer Company, OPTOOL DAC-HP produced by Daikin Industries, Ltd., X-22-164E produced by Shin-Etsu Chemical Co., Ltd., FM-7725 produced by Chisso Corporation, EBECRYL 350 produced by Daicel-Cytec Company Ltd., and TEGORad 2700 produced by Degussa Corporation.

Leveling Agent

The UV curable resin composition preferably further contains a common leveling agent from the viewpoint of improving the wettability to the substrate 11 as described above. The content of the leveling agent is preferably 0.01 mass % or more and 5 mass % or less of the solids. At a content less than 0.01 mass %, improvements of wettability tend to be insufficient. At a content exceeding 5 mass %, the hardness of the coating tends to decrease.

Drying Step

Next, in step S111, the resin composition 13 applied on the irregular surface of the substrate 11 is dried to evaporate the solvent. The drying conditions are not particularly limited. The drying may be conducted naturally or artificially by controlling the drying time and temperature etc. However, when wind is applied to the coating surface during drying, it is preferable not to generate any wind ripples on the coating surface. The drying temperature and the drying time can be adequately determined on the basis of the boiling point of the solvent contained in the coating. In such a case, the drying temperature and the drying time are preferably selected by considering the thermal resistance of the substrate 11 and in the range that does not cause deformation of the substrate 11 by thermal shrinkage.

In the course of solvent evaporation, the solid component concentration in the coating increases and a network is formed by bonds such as hydrogen or coordinate bonds formed between the inorganic oxide filler and the viscosity adjustor in the system. As a result, the viscosity increases the coating becomes viscous. Due to the increase in viscosity, the irregular shape on the substrate 11 is left in a surface 13s of the dried resin composition (refer to FIG. 32B). In other words, an adequate degree of smoothness is rendered to the surface 13s of the dried resin composition and thus an antiglare property is exhibited. As described above, when the resin composition becomes highly viscous in the course of solvent evaporation, the dried resin composition resembles the irregular shape of the substrate 11 and exhibits an antiglare property. In contrast, when the UV curable resin composition does not become highly viscous, the dried resin composition flattens the irregular shape of the substrate 11, thereby failing to obtain an antiglare property.

Curing Step

Next, in step S112, the resin composition 13 dried on the irregular surface of the substrate 11 is cured by, for example, irradiation with ionization radiation L2 or by heating. As a result, a hard coat layer 12 having a smooth irregular shape is formed (refer to FIG. 32C). Examples of the ionization radiation that can be used include an electron beam, an UV ray, a visible light ray, a gamma ray, and an electron beam. From the viewpoint of production equipment, UV ray is preferred. The integrated irradiation intensity is preferably adequately selected on the basis of the curing property of the resin by considering suppression of yellowing of the resin and the substrate 11. The atmosphere of irradiation is preferably adequately selected according to the type of the resin composition and may be, for example, an inert gas atmosphere such as air, nitrogen, argon, and the like.

As a result, the desired antiglare film 1 is obtained.

The method for forming the base pattern (irregular pattern of the substrate 11) is not limited to the above-described method and may be any method as long as the method has the protrusion radius distribution selectivity, random arrangement, height controllability, protrusion shape (slope) controllability, and the like. For example, a method of forming protrusions on a metal die roll by applying a resist on a metal die, removing a computer-generated random pattern by laser ablation, and dissolving the metal with an etchant may be employed. Alternatively, a method involving using a pattern prepared by incrementing/decrementing the radius of the above-described base pattern and repeating the laser etching technique in multiple stages may be employed. The slopes can be moderated by stripping the resist and etching the entirety after the pattern is formed by such a method.

In generating a random pattern with a computer, narrowing the diameter distribution of circular patterns or limiting the arrangement of patterns to increase the pattern density result in decreased randomness. This tends to cause the reflected light to disperse although a display apparatus using such a pattern has no moire. Thus, it is preferable to secure a wide diameter distribution of the circular patterns and not to pose any limit in terms of arrangement. For example, the diameter distribution of circular patterns is preferably wide, such as 150 µm or less and more preferably 20 µm or more and 150 µm or less. The maximum value of the autocorrelation function can be suppressed to 0.1 or less and a dispersion phenomenon can be moderated by selecting such a diameter distribution range for the circular patterns. Note that the diameter distribution of the bottoms of the structures of the substrate 11 are substantially identical to the circular patterns generated with the computer described above.

In order to achieve the desired diffuse reflection angle characteristics, the etch depth of the die, the overall etching time after the resist stripping, and the like are preferably adjusted. Moreover, a resin having a leveling property adjusted by addition of an inorganic filler, a viscosity adjustor, and the like is preferably applied on the irregular surface of the substrate 11 while controlling the thickness.

As described above, according to the first embodiment, first, an etching mask having a plurality of openings 22b is used to conduct a first etching process on the substrate surface, followed by removal of the etching mask from the substrate surface. Next, a second etching process (re-etching process) is conducted on the entire substrate surface from which the etching mask has been removed so as to form a master 23 having smooth irregularities. A hard coat coating which loses its fluidity once dried is applied, dried, and cured on the substrate shaped with this master 23 so as to form a hard coat layer 12 that resembles the irregularities on the substrate surface. Thus, an antiglare film that satisfy both a high antiglare property and low clouding can be obtained.

8. Eighth Embodiment 8.1. Structure of Optical Film

Figure 33:
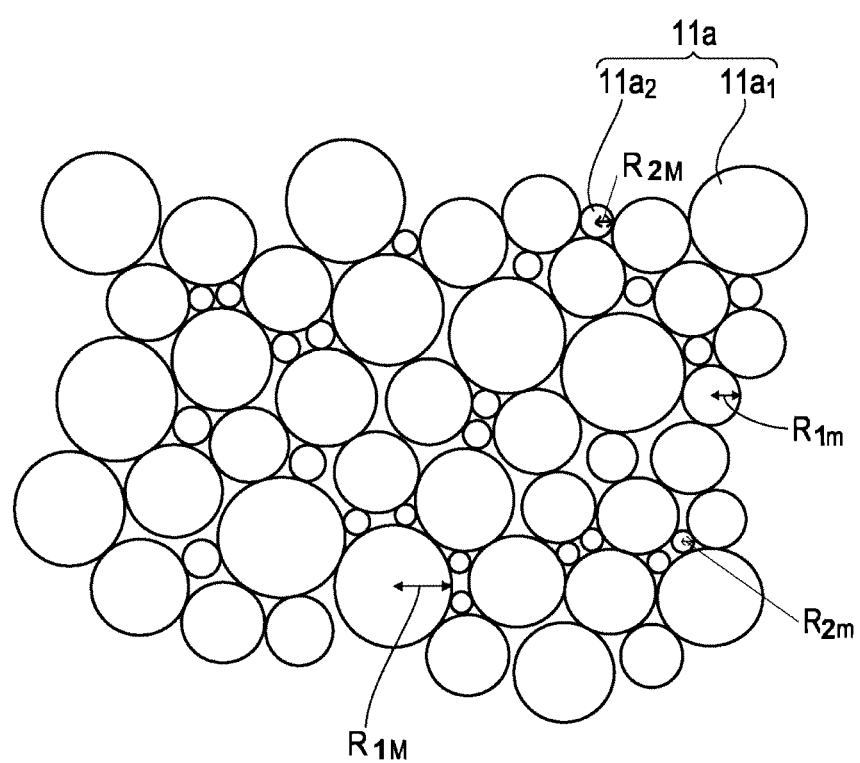
FIG. 33 is a plan view showing one example of the shape of an irregular surface of a substrate included in an optical film according to an eighth embodiment.

FIG. 33 is a plan view showing one example of the shape of an irregular surface of a substrate included in an optical film according to an eighth embodiment. As shown in FIG. 33, the optical film according to the eighth embodiment differs from that of the first embodiment in that the structures 11 include first structures $11a_1$ and second structures $11a_2$.

Preferably, the size of the bottoms of the first structures $11a_1$ varies at random in the range of $0 \, \mu m \leq R_{1m} < R_{1M} \leq 75 \, \mu m$ and the size of the bottoms of the second structures $11a_2$ varies at random in the range of $R_{2m} < R_{2M} \leq R_{1m}$. Here, the minimum distance $R_{1m}$ is the shortest distance between the center of gravity of the bottom of the first structure $11a_1$ to the rim of the bottom and the maximum distance $R_{1M}$ is the longest distance between the center of gravity of the bottom of the first structure $11a_1$ to the rim of the bottom. Furthermore, the minimum distance $R_{2m}$ is the shortest distance between the center of gravity of the bottom of the second structure $11a_2$ to the rim of the bottom and the maximum distance $R_{2M}$ is the longest distance between the center of gravity of the bottom of the second structure $11a_2$ to the rim of the bottom. When $10 \, \mu m > R_{1m}$, such structures become substantially flat and the surface tends to be coarse. When $R_{1M} > 75 \, \mu m$, the surface may become coarse or the screen may appear glaring.

When the second structures $11a_2$ are arranged in gaps between the first structures $11a_1$ and the relationship $h_1 \geq h_2$ is satisfied where $h_1$ is the smallest height among the first structures $11a_1$ and $h_2$ is the largest height among the second structures $11a_2$, the sizes of the bottoms of the first structures $11a_1$ and the second structures $11a_2$ preferably vary as follows. That is, the size of the bottoms of the first structures $11a_1$ preferably varies at random in the range of $R_{1m} < R_{1M} \leq 75 \, \mu m$ and the size of the bottoms of the second structures $11a_2$ preferably varies at random in the range of $R_{2m} < R_{2M} \leq R_{1m}$. When $R_{1M} > 75 \, \mu m$, the surface may become coarse or the screen may appear glaring.

Preferably, the smallest height $h_1$ among the first structures $11a_1$ and the largest height $h_2$ among the second structures $11a_2$ satisfy the relationship $h_1 \geq h_2$ while the heights of the first structures $11a_1$ and the second structures $11a_2$ are varied. In this manner, the heights of the structures 11 vary depending on the radius of the structures 11 and three-dimensionally random surface shape can be imparted to the optical element surface. As a result, a rainbow pattern of reflected light generated when the heights of the structures 11 are uniform, i.e., a dispersion phenomenon, can be suppressed.

8.2. Method for Producing Optical Film

A method for producing an optical film according to the eighth embodiment is the same as that of the first embodiment except for from that of the first embodiment in all points other than that the exposure step described below is provided. First, as in the first embodiment, exposed portions corresponding to the first structures $11a_1$ are formed. Then, exposed portions corresponding to the second structures $11a_2$ are arranged in the gaps between the exposed portions.

In the description below, recesses for forming the first structures $11a_1$ are referred to as first recesses (first structures for transfer) and recesses for forming the second structures $11a_2$ are referred to as second recesses (second structures for transfer).

When a master is formed by an etching process, the depth of the first recesses and the depth of the second recesses tend to vary depending on (1) size of bottoms of the recesses, (2) intervals between the bottoms of neighboring recesses, (3) size of bottoms of neighboring recesses, and (4) other master processing conditions. Thus, the depths of the first and second recesses can be intentionally varied by adequately adjusting the conditions (1) to (4) above in making the master by the etching process. In particular, the depth of the second recesses can be set smaller than the depth of the first recesses by setting the maximum value $R_M$ of the radius of the bottom of the second recess to be equal to or lower than the minimum value $R_m$ of the radius of the bottom of the first recess. The first structures $11a_1$ and second structures $11a_2$ can be formed by transferring such first and second recesses onto a film.

A variation can also be intentionally produced among the heights of the second structures $11a_2$ and the second structures $11a_2$ on the optical film side according to the variation in depth of the first and second recesses on the master described above. As a result, a dispersion phenomenon in which the reflected light appears rainbow-like can be suppressed in the optical film 1.

Moreover, because the second recesses are provided in the master in addition to the first recesses, the density of the recesses on the master can be increased. As a result, the density of the structures 11a on the optical film can be increased. When the density of the structures 11a increases, the area of the flat regions in the irregular surface of the optical film 1 decreases and thus the antiglare property can be enhanced.

9. Ninth Embodiment

Figure 34A:
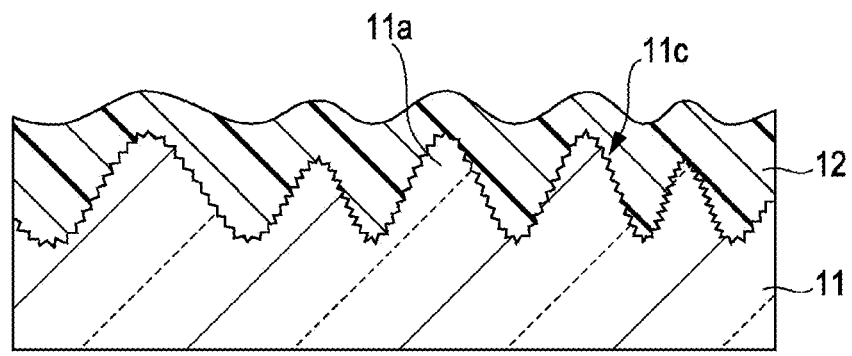
FIG. 34A is a cross-sectional view showing a first example of the structure of a substrate included in an optical film according to a ninth embodiment and FIG. 34B is a cross-sectional view showing a second example of the structure of a substrate included in an optical film according to the ninth embodiment.

FIG. 34A is a cross-sectional view showing a first example of the structure of a substrate included in an optical film according to a ninth embodiment. As shown in FIG. 34A, the substrate 11 differs from that of the first embodiment in that a plurality of fine structures 11c are formed on the irregular surface on which the hard coat layer 12 is formed. The fine structures 11c are, for example, formed in at least part of the surface of the structures 11a. From the viewpoint of reducing glares, the fine structures 11c are preferably formed on the entire surface of the structure 11a. The fine structures 11c are recesses or protrusions finer than the structures 11a. Whether the fine structures 11c are formed on the irregular surface of the substrate 11 or not can be checked as follows. That is, the substrate 11, e.g., a TAC film or the like, is dissolved in a solvent to expose the interface between the hard coat layer 12 and the substrate 11, and the interface is observed with a microscope to check the presence of the fine structures 11c.

The shape of the fine structures 11c may be a dot, a line, or the like, or any combination of such shapes. Examples of the line include a straight line, a curved line, a ring, or any combination of the foregoing and the line shape is preferably adequately selected from these depending on the desired properties. The height and width of the fine structures 11c are smaller than those of the structures 11a, for example. The fine structures 11c are arranged on the irregular surface of the substrate 11 at a period shorter than that of the structures 11a. The fine structures 11c can be formed by adding a surfactant to an etchant used in the etching step, for example.

Figure 35A:
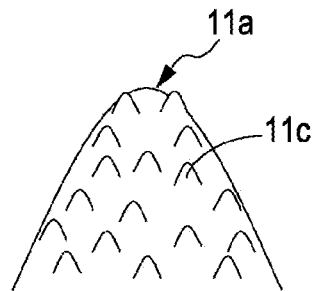
FIG. 35A is an outline of a first example of shapes of fine structures.

FIG. 35A is an outline of a first example of shapes of fine structures. As shown in FIG. 35A, a plurality of fine structures 11c protruding in a dot-shape are formed on the surface of a structure 11a. The arrangement of the fine structures 11c is not particularly limited and may be periodic or random depending on the desired property.

Figure 35B:
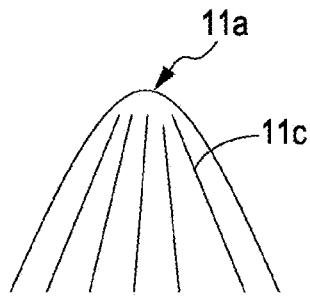
FIG. 35B is an outline of a second example of shapes of fine structures.

FIG. 35B is an outline of a second example of shapes of fine structures. As shown in FIG. 35B, a plurality of fine structures 11c protruding in a straight line shape extend from the apex to the bottom of a structure 11a.

Figure 35C:
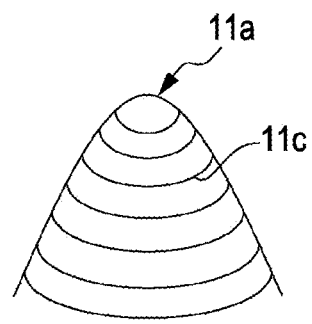
FIG. 35C is an outline of a third example of shapes of fine structures.

FIG. 35C is an outline of a third example of shapes of fine structures. As shown in FIG. 35C, a plurality of fine structures 11c protruding in a ring shape are formed from the apex to the bottom of a structure 11a. In other words, concentrically arranged ridges are formed on the surface of the structure 11a.

According to the ninth embodiment, since the fine structures 11c are formed on the irregular surface on which the hard coat layer 12 is formed, the internal haze (e.g., 1% to 5%) can be imparted. When the optical film 1 including this substrate 11 is used as the surface of a display apparatus, glares can be reduced. Note that an irregular shape (i.e., diffuse reflection characteristics) substantially the same as that achieved when no fine structures 11c are formed can be obtained by adequately adjusting the size an shape of the fine structures 11c.

Figure 34B:
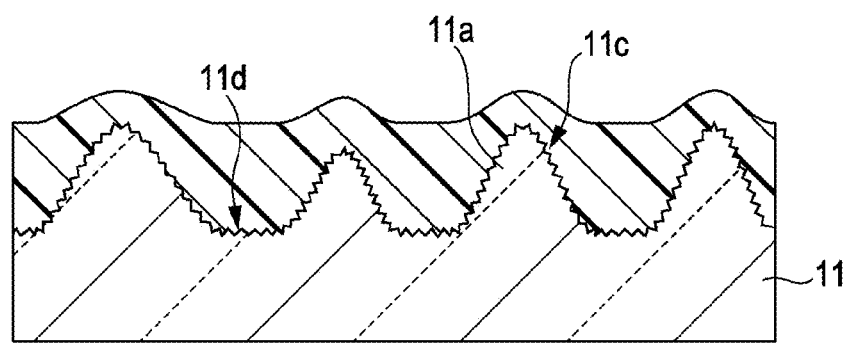

FIG. 34B is a cross-sectional view showing a second example of the structure of a substrate included in an optical film according to a ninth embodiment. As shown in FIG. 34B, the second example differs from the first example in that gaps 11d are formed between neighboring structures 11a. When the gaps 11d are formed as such, the fine structures 11c may be formed on the surfaces of the structure 11a and/or the gaps 11d between the structures 11a. From the viewpoint of reducing glares, the fine structures 11c are preferably formed on the surfaces of the structures 11a as well as the gaps 11d between the structures 11a.

10. Tenth Embodiment

Figure 36:
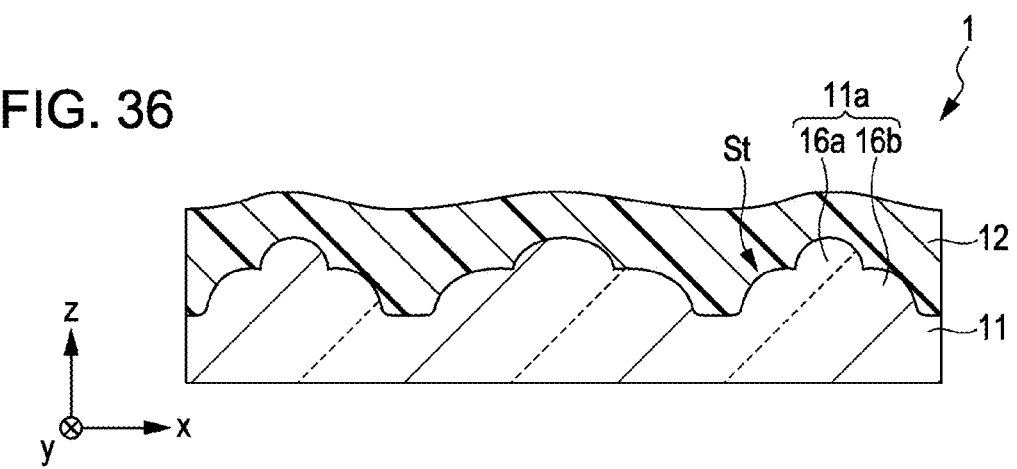
FIG. 36 is a cross-sectional view showing one example of a structure of an optical film according to a tenth embodiment.

FIG. 36 is a cross-sectional view showing one example of a structure of an optical film according to a tenth embodiment. The tenth embodiment differs from the first embodiment in that each structure 11a has one or more steps St on the side surface so that the structure 11a has a stepped structure constituted by two or more step structures. The two or more step structures are designed so that their sizes are reduced toward the surface of the hard coat layer from the substrate side. FIG. 36 shows an example in which the each structure 11a has one step in the side surface and is thus constituted by a first step structure 16b and a second step structure 16a. Each structure 11a preferably has a dome shape as a whole. The shapes of the bottoms of the step structures constituting the steps are not limited to the same shape and may be different from one another.

EXAMPLES

The present invention will now be specifically described by using examples; however, the invention is not limited to these examples.

Example 1

First, an embossing roll was prepared as follows. A pattern was generated under calculation condition setting values of ($R_m$: 17.5 µm, $R_M$: 25 µm, $X_m$: 0.0 mm, $X_M$: 40.0 mm, $Y_m$: 0.0 mm, $Y_M$: 40.0 mm). FIG. 7 is a diagram showing a 2 mm×2 mm region cut out from this pattern.

Next, generated patterns were tiled and engraved by etching to prepare an embossing roll. The etch depth was about 5 µm. An iron roll with a rubber having a JIS-D90 hardness wound around the roll surface and finished by polishing was used as a backing roll. A heater was housed in the embossing roll so that the temperature can be controlled to 200° C. or higher. The backing roll was a water-cooling roll prepared by winding a JIS-D90 hardness rubber onto an iron roll surface and conducting polishing. The water-cooling roll was used along with an air-cooling nozzle.

Figure 37A:
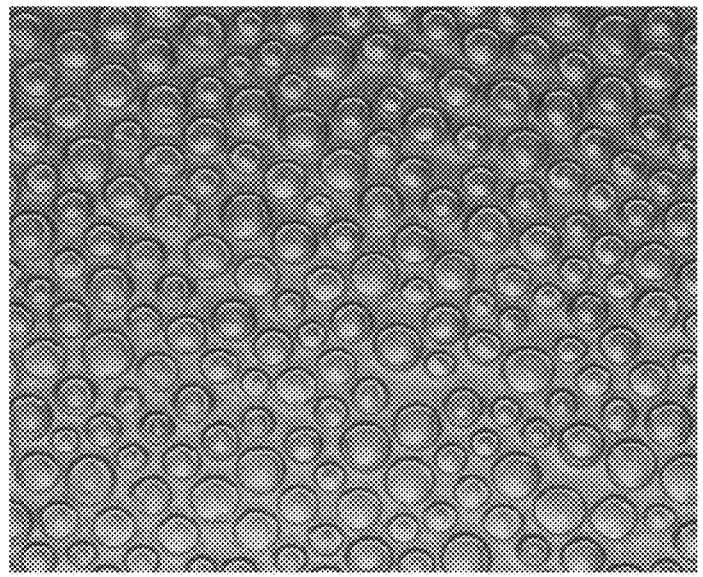
FIG. 37A is a photograph showing a TAC film surface of Example 1 and FIG. 37B is a photograph showing a TAC film surface of Reference Example.
Figure 37B:
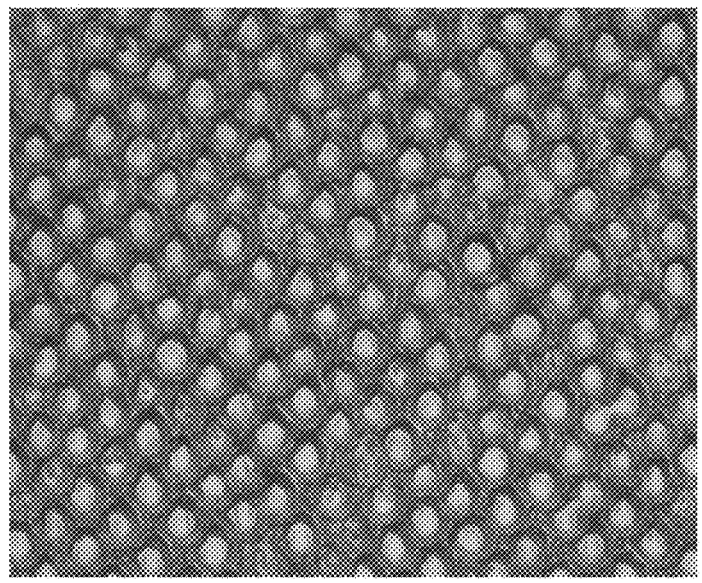

Next, a triacetyl cellulose (TAC) film 80 µm in thickness sandwiched between the embossing roll and the backing roll was heated and pressurized while being continuously rotated so as to form irregularities on the TAC film surface as follows. In particular, while the TAC film 80 µm in thickness sandwiched between the embossing roll heated to 180° C. and the backing roll cooled to 50° C. was continuously rotated, nipping was performed at a linear load of 2000 N/cm. The irregular shape of the embossing roll was continuously transferred onto the TAC surface. Next, the surface of the TAC film after transfer was observed with a laser microscope. FIG. 37A is a photograph of the TAC film surface (a confocal image taken with the laser microscope). For reference, FIG. 37B shows a TAC film surface onto which transfer was conducted with an embossing roll having patterns arranged with $R_m$: 25 µm and $R_M$: 30 µm and being laser-engraved at the same radius, 25 µm.

The following materials were mixed in a disperser for 2 hours to prepare a hard coat solution:
UV curable urethane acryl oligomer: 100 parts by weight
Reaction initiator IRG-184: 5 parts by weight
Silica sol (MIBK dispersion containing dispersed silica having a diameter of 30 nm and having a solid content of 30%): 500 parts by weight
MIBK: 85 parts by weight Next, the resulting hard coat solution was applied on the irregular surface with a wire bar. During this process, the gauge of the wire bar was adjusted to control the thickness of application so that a desired PV value could be obtained after curing. Next, the hard coat solution was dried by being left to stand for 2 minutes in an 80° C. oven to thereby evaporate the solvent. Next, the TAC film was transferred to an UV curing oven and irradiated with UV at an output of 160 W and an integrated light intensity of 300 mJ/cm$^2$ to form a hard coat layer. As a result, an antiglare film having PV of 0.26 µm was prepared.

Example 2

A pattern was generated under calculation condition setting values of ($R_m$: 12 µm, $R_M$: 17 µm, $X_m$: 0.0 mm, $X_M$: 40.0 mm, $Y_m$: 0.0 mm, $Y_M$: 40.0 mm), and generated patterns were engraved by etching to prepare an embossing roll. An antiglare film having PV of 0.27 was made as in Example 1 except for this.

Example 3

A pattern was generated under calculation condition setting values of ($R_m$: 49 µm, $R_M$: 70 µm, $X_m$: 0.0 mm, $X_M$: 40.0 mm, $Y_m$: 0.0 mm, $Y_M$: 40.0 mm), generated patterns were engraved by etching to prepare an embossing roll. An antiglare film having PV of 0.67 was made as in Example 1 except for this.

Example 4

A pattern was generated under calculation condition setting values of ($R_m$: 11 µm, $R_M$: 25 µm, $X_m$: 0.0 mm, $X_M$: 40.0 mm, $Y_m$: 0.0 mm, $Y_M$: 40.0 mm) and generated patterns were engraved by etching to prepare an embossing roll. An antiglare film having PV of 0.30 was made as in Example 1 except for this.

Example 5

A pattern was generated under calculation condition setting values of ($R_m$: 21 µm, $R_M$: 25 µm, $X_m$: 0.0 mm, $X_M$: 40.0 mm, $Y_m$: 0.0 mm, $Y_M$: 40.0 mm), and generated patterns were engraved by etching to prepare an embossing roll. An antiglare film having PV of 0.26 was made as in Example 1 except for this.

Example 6

A pattern was generated under calculation condition setting values of ($R_m$: 10 µm, $R_M$: 11.1 µm, $X_m$: 0.0 mm, $X_M$: 40.0 mm, $Y_m$: 0.0 mm, $Y_M$: 40.0 mm), and generated patterns were engraved by etching to prepare an embossing roll. An antiglare film having PV of 0.23 was made as in Example 1 except for this.

Example 7

A pattern was generated under calculation condition setting values of ($R_m$: 67.5 µm, $R_M$: 75 µm, $X_m$: 0.0 mm, $X_M$: 40.0 mm, $Y_m$: 0.0 mm, $Y_M$: 40.0 mm), and generated patterns were engraved by etching to prepare an embossing roll. An antiglare film having PV of 1.54 was made as in Example 1 except for this.

Example 8

An antiglare film having PV of 0.27 was prepared as in Example 1 except that the surface shape of the embossing roll was formed by laser processing.

Comparative Example 1

A pattern was generated under calculation condition setting values of ($R_m$: 8 µm, $R_M$: 11 µm, $X_m$: 0.0 mm, $X_M$: 40.0 mm, $Y_m$: 0.0 mm, $Y_M$: 40.0 mm), and generated patterns were engraved by etching to prepare an embossing roll. An antiglare film having PV of 0.23 was made as in Example 1 except for this.

Comparative Example 2

A pattern was generated under calculation condition setting values of ($R_m$: 56 µm, $R_M$: 80 µm, $X_m$: 0.0 mm, $X_M$: 40.0 mm, $Y_m$: 0.0 mm, $Y_M$: 40.0 mm), and generated patterns were engraved by etching to prepare an embossing roll. An antiglare film having PV of 1.03 was made as in Example 1 except for this.

Comparative Example 3

A pattern was generated under calculation condition setting values of ($R_m$: 24 µm, $R_M$: 25 µm, $X_m$: 0.0 mm, $X_M$: 40.0 mm, $Y_m$: 0.0 mm, $Y_M$: 40.0 mm), and generated patterns were engraved by etching to prepare an embossing roll. An antiglare film having PV of 0.39 was made as in Example 1 except for this.

Comparative Example 4

An embossing roll was prepared by generating patterns according to the calculation condition setting values of Example 6 and engraving the generated patterns by etching. Irregularities were formed in the TAC surface using this embossing roll. An antiglare film having PV of 0.19 was made as in Example 1 except for this.

Comparative Example 5

An embossing roll was prepared by generating patterns according to the calculation condition setting values of Example 7 and engraving the generated patterns by etching. An antiglare film having PV of 1.68 was made as in Example 1 except for this.

Comparative Example 6

A roll subjected to blasting using #300 glass beads was used as the embossing roll. The hard coat solution was applied on the irregular surface of the TAC film to a thickness that yielded a cloudiness of 0.3. An antiglare film was made as in Example 1 except for this.

Comparative Example 7

A roll subjected to blasting using #400 glass beads was used as the embossing roll. The hard coat solution was applied on the irregular surface of the TAC film to a thickness that yielded a cloudiness of 0.3. An antiglare film was made as in Example 1 except for this.

Comparative Example 8

Patterns in which circles having the same radius, i.e., 25 were arranged in a grid were engraved by etching to prepare an embossing roll. Irregularities were formed in the TAC surface using this embossing roll. An antiglare film was made as in Example 1 except for this.

Comparative Example 9

Patterns in which circles having the same radius, i.e., 25 μm, were arranged in a staggered manner were engraved by etching to prepare an embossing roll. Irregularities were formed in the TAC surface using this embossing roll. An antiglare film was made as in Example 1 except for this.

Evaluation of Filling Ratio

Figure 38A:
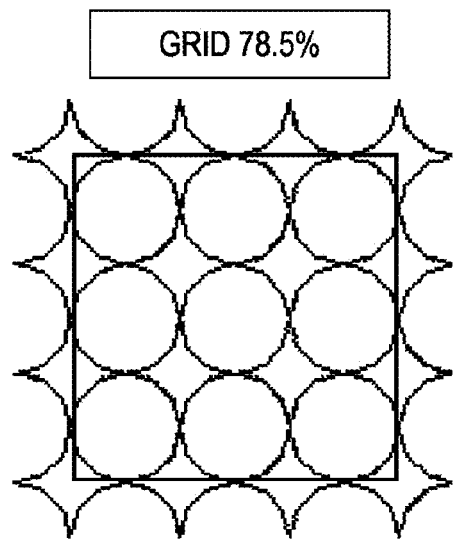
FIG. 38A is a diagram showing the arrangement pattern of Comparative Example 8 and FIG. 38B is a diagram showing the arrangement pattern of Comparative Example 9.
Figure 38B:
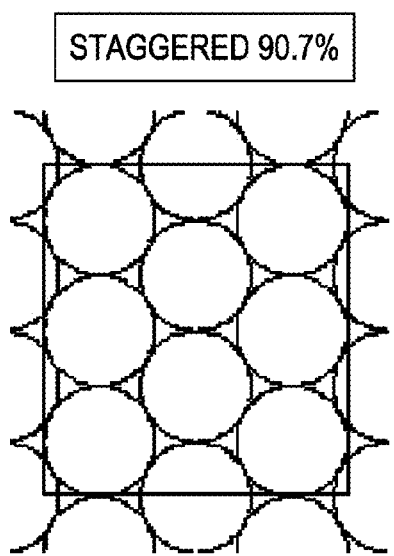

The filling ratio is the ratio of the area of the generated circles to the area of the segment. The gap between the circles is flat and the filling ratio (1—filling ratio) indicates the ratio of the area occupied by the circles. The area of a segment is the total area of the pattern (the total area of the circles and the gaps between circles). When the area of the flat portions is large, i.e., when the filling ratio is low, the antiglare property decreases. Thus, a high filling ratio is desirable. The filling ratios of Comparative Example 8 (FIG. 38A) and Comparative Example 9 (FIG. 38B) are described here as the reference of the filling ratio. The filling ratio is 78.5% when circles with the same radius are arranged into a grid pattern (refer to FIG. 38A) and is 90.7% when circles with the same radius are arranged into a staggered pattern (refer to FIG. 38B).

Evaluation of Cloudiness

In order to suppress influence of back reflection, the antiglare film was bonded onto a black acryl plate with an adhesive to make an evaluation sample. Next, an integrating-sphere spectrophotometer SP64 produced by X-Rite was used to conduct measurement with a d/8° optical system in which a sample surface was irradiated with diffused light and reflected light was detected with a detector installed at a position oblique with respect to the sample normal direction by 8°. As for the measurement values, the SPEX mode which removes the specular reflection components and detects only the diffuse reflection components was employed and the detection viewing angle was 2°. The cloudiness determined by this measurement had been confirmed by experiment that the cloudiness has a correlation with the cloudy appearance observed with naked eye. The results are shown in Table 1.

Black acryl plate: Acrylite Black 502 (3 mm thick) produced by Mitsubishi Rayon Co., Ltd.

Adhesive used for bonding: Nonsupport adhesive film TU41A produced by Tomoegawa Co., Ltd.

Evaluation of Antiglare Property

Bare fluorescent lamps were projected on the optical film and the blurring of the reflected images was evaluated by the following standard. The results are shown in Table 1.

⊚: Contour of the fluorescent lamp is not identifiable (two lamps appear as one)

◯: Although the fluorescent lamp can be identified to some degree, the contour is blurred.

×: Fluorescent lamp is directly projected.

Evaluation of Irregular Shape

A five-line confocal microscope OPTELIC S130 produced by Lasertec Corporation was used.

Sample: As in the measurement of cloudiness, a film was bonded onto a black acryl plate to prepare a measurement sample.

Objective: 50× magnification, Eyepiece: 10× magnification

Scanning was done in the Z axis direction to capture the Z image.

A measurement section position was set so that the section passed on the tops of the protrusions observed in a 200 μm×200 μm region. The heights of the protrusions (structures) were measured by the steps in the section. The heights were measured at 10 positions and averaged to determine the average height PV of the protrusions (structures). The results are shown in Table 1.

The average center-to-center distance PP between the closest neighboring circles was determined as follows. The center-to-center distance PP was determined at 10 positions from the pattern generated on the basis of the above-described calculation condition setting values and averaging the results to obtain the average center-to-center distance PP. The results are shown in Table 1.

Evaluation or Moire and Glares

A green image was output in a 17-inch monitor (SXGA 1280×1024) and a film was placed thereon to visually confirm whether moire occurred and whether the image appeared glaring. The results are shown in Table 1.

Table 1 shows all of the evaluation results described above.

TABLE 1

| | Substrate irregularity shape | | | Protrusion height (μm) | Filling ratio | PV | Antiglare property | Clouding | Moire | Glares | Rainbow pattern |
|---|---|---|---|---|---|---|---|---|---|---|---|
| | $R_m$ (μm) | $R_M$ (μm) | $R_m/R_M$ | | | | | | | | |
| Example 1 | 1.75 | 25 | 0.7 | 5 | 79.9 | 0.26 | ◯ | 0.41 | Not observed | Not observed | Δ |
| Example 2 | 12 | 17 | 0.7 | 5 | 80.2 | 0.27 | ◯ | 0.63 | Not observed | Not observed | Δ |
| Example 3 | 49 | 70 | 0.7 | 5 | 77.4 | 0.67 | ◯ | 0.38 | Not observed | Not observed | Δ |
| Example 4 | 11 | 25 | 0.44 | 5 | 79.2 | 0.30 | ◯ | 0.65 | Not observed | Not observed | Δ |
| Example 5 | 21 | 25 | 0.8 | 5 | 79.9 | 0.26 | ◯ | 0.38 | Not observed | Not observed | Δ |
| Example 6 | 10 | 11.1 | 0.9 | 5 | 80.7 | 0.23 | ◯ | 0.68 | Not observed | Not observed | Δ |
| Example 7 | 67.5 | 75 | 0.9 | 5 | 78.5 | 1.54 | ◯ | 0.69 | Not observed | Not observed | Δ |

TABLE 1-continued

| | $R_m$ (μm) | $R_M$ (μm) | $R_m/R_M$ | Substrate irregularity shape Protrusion height (μm) | Filling ratio | PV | Antiglare property | Clouding | Moire | Glares | Rainbow pattern |
|---|---|---|---|---|---|---|---|---|---|---|---|
| Example 8 | 17.5 | 25 | 0.7 | 5 | 79.9 | 0.27 | ○ | 0.43 | Not observed | Not observed | Δ |
| Comparative Example 1 | 8 | 11 | 0.7 | 5 | 80.7 | 0.23 | ○ | 0.82 | Not observed | Not observed | Δ |
| Comparative Example 2 | 56 | 80 | 0.7 | 5 | 77.6 | 1.03 | ○ | 0.51 | Not observed | Observed | Δ |
| Comparative Example 3 | 24 | 25 | 0.95 | 5 | 79.6 | 0.39 | ○ | 0.51 | Observed | Not observed | X |
| Comparative Example 4 | 10 | 11.1 | 0.9 | 5 | 80.7 | 0.19 | X | 0.63 | Not observed | Not observed | Δ |
| Comparative Example 5 | 67.5 | 75 | 0.9 | 5 | 78.5 | 1.68 | ○ | 0.76 | Not observed | Not observed | Δ |
| Comparative Example 6 | — | — | — | — | — | — | ○ | 0.32 | Not observed | Observed | ○ |
| Comparative Example 7 | — | — | — | — | — | — | X | 0.28 | Not observed | Not observed | ○ |
| Comparative Example 8 | 25 | 25 | 1 | 78.5 | 50 | 0.33 | ○ | 0.42 | Observed | Not observed | X |
| Comparative Example 9 | 25 | 25 | 1 | 90.7 | 50 | 0.32 | ○ | 0.41 | Observed | Not observed | X |

PV: Average height of protrusions (structures)
PP: Average center-to-center distance of circular patterns (bottoms of structures)

Table 1 indicates the following.

According to the antiglare film of Examples 1 to 8, a high-contrast antiglare film that does not suffer from moire or glares is obtained. Moreover, as for the antiglare films of Examples 1 to 8, (1) the size of the bottoms of the structures varies at random, (2) the bottoms of the structures are in contact or substantially in contact with each other, and (3) the minimum distance $R_m$ and the maximum distance $R_M$ of the bottoms of the structures satisfy the relationship $R_m/R_M \leq 0.9$. The results indicate that when above-described conditions (1) to (3) are satisfied, a high-contrast antiglare film free of moire or glares can be obtained.

Comparative Example 10

A transfer roll was prepared as follows. First, a surface of an iron core (100 mm in diameter, 300 mm in face length) of the transfer roll was plated with copper. A photoresist was applied on a roll surface plated with copper so as to form a photoresist layer. Next, the photoresist layer was exposed with a laser beam to form exposed portions of the grid pattern and developed. As a result, openings of the grid pattern were formed in the photoresist layer to obtain an etching mask. While the transfer roll with the etching mask thereon was rotated, an etchant was sprayed onto the surface of the transfer roll to perform a first etching process on the transfer roll surface. As a result, a large number of openings arranged into a grid pattern were formed in the roll surface. Next, the photoresist layer was removed from the roll surface and the entire roll surface was evenly etched again to conduct a second etching process on the roll surface. A cupric chloride etchant (cupric chloride, hydrochloric acid, and water) was used as the etchant. Then a 5 μm hard chromium plating was formed on the roll surface to obtain a desired transfer roll.

The exposure conditions and etching conditions of the transfer roll were as follows:

Exposure Conditions
Shape of exposed portions: circular
Diameter of circular exposed portions: 40 μm
Exposure pattern: grid pattern
Smallest intervals between the circumferences of neighboring exposed portions (referred to as "smallest exposure interval" hereinafter): 20 μm (=D2×2.9)

Etching Conditions
Depth D1 of first etching process: 7.5 μm
Depth D2 of second etching process: 7 μm (D2=D1×0.93)
Since etching time is in proportion to the etch depth, etching was conducted on the entire surface for a predetermined depth by making the etching time the same.

Comparative Example 11

An etching mask was formed on the roll surface as in Example 1 except that exposed portions arranged into a grid pattern having a circle diameter of 35 μm and a smallest hole interval of 25 μm (=D2×3.6) were formed in the photoresist layer. Next, a transfer roll was obtained as in Comparative Example 10 except that the etching was conducted using this etching mask under the following conditions:
Etching Conditions
Depth D1 of first etching process: 7.5 μm
Depth D2 of second etching process: 7 μm (D2=D1×0.93)

Example 9

An etching mask was formed on the roll surface as in Example 1 except that exposed portions arranged into a random pattern (Rm: 23.5 μm, RM: 38.5 μm, smallest hole interval: 2 μm (=D2×0.29)) were formed in the photoresist layer. Next, a transfer roll was obtained as in Comparative Example 10 except that the etching was conducted using this etching mask under the following conditions:
Etching Conditions
Depth D1 of first etching process: 7.5 μm
Depth D2 of second etching process: 7 μm (D2=D1×0.93)
Next, irregularities on the transfer roll was transferred onto a triacetyl cellulose (TAC) film surface at a transfer roll temperature of 170° C. and a linear load of 200 kg/cm. The following materials were mixed in a disperser for 2 hours to prepare a hard coat coating. The prepared hard coat coating was applied on a shape-transfer-receiving surface of the TAC film to a thickness that yielded a cloudiness of 0.3 to 0.4, dried, and cured by irradiation with UV rays to form a hard coat layer on the shape transfer-receiving surface of the TAC film. As a result, a desired antiglare film was obtained.

Hard Coat Coating

UV curable urethane acryl oligomer: 100 parts by weight
Reaction initiator (trade name: Irgacure 184 produced by Ciba Specialty Chemicals): 5 parts by weight
Silica sol (methyl isobutyl ketone (MIBK) dispersion containing dispersed silica having a diameter of 30 nm and having a solid content of 30%): 500 parts by weight
Methyl isobutyl ketone MIBK: 85 parts by weight Example 10

An etching mask was formed on the roll surface as in Example 9 except that exposed portions arranged into a random pattern (Rm: 23.5 μm, RM: 38.5 μm, smallest hole interval: 8 μm (=D2×1.6)) were formed in the photoresist layer. Next, an antiglare film was obtained as in Example 9 except that the etching was conducted using this etching mask under the following conditions:
Etching Conditions
Depth D1 of first etching process: 5.5 μm
Depth D2 of second etching process: 5 μm (D2=D1×0.91)

Example 11

An etching mask was formed on the roll surface as in Example 9 except that exposed portions arranged into a random pattern (Rm: 12.5 μm, RM: 20 μm, smallest hole interval: 5 μm (=D2×1)) were formed in the photoresist layer. Next, an antiglare film was obtained as in Example 9 except that the etching was conducted using this etching mask under the following conditions:
Etching Conditions
Depth D1 of first etching process: 4.1 μm
Depth D2 of second etching process: 5 μm (D2=D1×1.2)

Compared to Examples 9 and 10, the hole diameter of the master of Example 11 is small and thus the transfer rate can be further increased an the productivity can be improved. When the hole diameter in the master is small, heat is more efficiently conducted to TAC during the transfer process.

Comparative Example 12

An etching mask was formed on the roll surface as in Example 1 except that exposed portions arranged into a grid pattern having a circle diameter of 30 μm and a smallest hole interval of 30 μm (=D2×4.3) were formed in the photoresist layer. Next, a transfer roll was obtained as in Example 10 except that the etching was conducted using this etching mask under the following conditions:
Etching Conditions
Depth D1 of first etching process: 7.5 μm
Depth D2 of second etching process: 7 μm (D2=D1×0.93)

Example 12

An etching mask was formed on the roll surface as in Example 9 except that exposed portions arranged into a random pattern (Rm: 23.5 μm, RM: 38.5 μm, smallest hole interval: 5 μm (=D2×1.7)) were formed in the photoresist layer. Next, an antiglare film was obtained as in Example 9 except that the etching was conducted using this etching mask under the following conditions:
Etching Conditions
Depth D1 of first etching process: 5.25 μm
Depth D2 of second etching process: 3 μm (D2=D1×0.57)

Example 13

An etching mask was formed on the roll surface as in Example 9 except that exposed portions arranged into a random pattern (Rm: 23.5 μm, RM: 38.5 μm, smallest hole interval: 2 μm (=D2×0.13)) were formed in the photoresist layer. Next, an antiglare film was obtained as in Example 9 except that the etching was conducted using this etching mask under the following conditions:
Etching Conditions
Depth D1 of first etching process: 7.5 μm
Depth D2 of second etching process: 16 μm (D2=D1×2.1)

Example 14

An etching mask was formed on the roll surface as in Example 9 except that exposed portions arranged into a random pattern (Rm: 23.5 μm, RM: 38.5 μm, smallest hole interval: 1 μm (=D2×2.5)) were formed in the photoresist layer. Next, an antiglare film was obtained as in Example 9 except that the etching was conducted using this etching mask under the following conditions:
Etching Conditions
Depth D1 of first etching process: 0.4 μm
Depth D2 of second etching process: 0.4 μm (D2=D1×1)

Roll mater disks and antiglare films of Examples 9 to 14 and Comparative Examples 10 to 12 obtained as such were evaluated as follows.

Evaluation of Antiglare Property

Bare fluorescent lamps were projected on the antiglare film and the blurring of the reflected images was evaluated by the following standard.

◯: Contours of fluorescent lamps are completely unidentifiable.

Δ: Fluorescent lamps appear foggy and contours are vaguely recognizable.

×: Fluorescent lamps appear unblurred and are clearly recognizable and their contours are visible.

Evaluation of Cloudiness

In order to suppress influence of back reflection, the antiglare film was bonded onto a black acryl plate with an adhesive to make an evaluation sample. Next, an integrating-sphere spectrophotometer SP64 produced by X-Rite was used to conduct measurement with a d/8° optical system in which a sample surface was irradiated with diffused light and reflected light was detected with a detector installed at a position oblique with respect to the sample normal direction by 8°. As for the measurement values, the SPEX mode which removes the specular reflection components and detects only the diffuse reflection components was employed and the measurement was conducted at a detection viewing angle of 2°. The cloudiness determined by this measurement had been confirmed by experiment that the cloudiness has a correlation with the cloudy appearance observed with naked eye. The results are shown in Table 2.

Black acryl plate: Acrylite Black 502 (3 mm thick) produced by Mitsubishi Rayon Co., Ltd.
Adhesive used for bonding: Nonsupport adhesive film TU41A produced by Tomoegawa Co., Ltd.

Evaluation of Cross-sectional Shape

A five-line confocal microscope OPTELIC S130 produced by Lasertec Corporation was used to conduct the following measurement. Scanning was conducted in the Z axis direction to capture the Z image and a straight line passing through the centers of the holes was drawn to measure the cross-sectional shape. The measurement conditions were as follows:

Sample: As in the measurement of cloudiness, a film was bonded onto a black acryl plate to prepare a measurement sample.

Objective: 50× magnification
Eyepiece: 10× magnification

Then on the basis of the cross-sectional shapes measured, whether there is connections and flat portions between recesses was evaluated. The results are shown in Table 2.

Figure 39A:
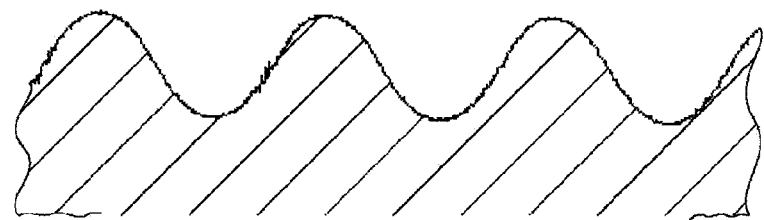
FIG. 39A is a diagram showing a cross-sectional profile of a master of Example 1.
Figure 39B:
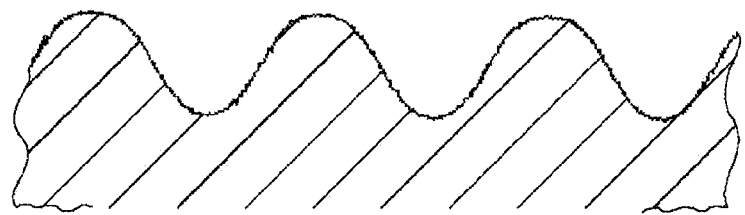
FIG. 39B is a diagram showing a cross-sectional profile of a master of Example 2.
Figure 39C:
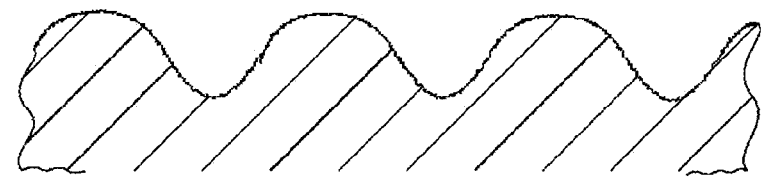
FIG. 39C is a diagram showing a cross-sectional profile of a master of Comparative Example 1.

Representative examples of the cross-sectional provides of the roll masters of Comparative Examples 10 to 12 are shown in FIGS. 39A to 39C.

TABLE 2

| | Pattern | Radius (μm) | Smallest hole interval (μm) | Etch depth D1 (μm) | Etch depth D2 (μm) | Transfer rate (m/min) | Connection between recesses | Flat portions | Antiglare property | Clouding | Rainbow pattern |
|---|---|---|---|---|---|---|---|---|---|---|---|
| Comparative Example 10 | Grid | 20 | 20 (=D2 × 2.9) | 7.5 | 7 (=D1 × 0.93) | — | Not observed | Not observed | — | — | X |
| Comparative Example 11 | Grid | 17.5 | 25 (=D2 × 3.6) | 7.5 | 7 (=D1 × 0.93) | — | Not observed | Not observed | — | — | X |
| Example 9 | Random | Rm: 23.5 RM: 38.5 | 2 (=D2 × 0.29) | 7.5 | 7 (=D1 × 0.93) | 8 | Not observed | Not observed | ○ | 0.32 | ○ |
| Example 10 | Random | Rm: 23.5 RM: 38.5 | 8 (=D2 × 1.6) | 5.5 | 5 (=D1 × 0.91) | 8 | Not observed | Not observed | ○ | 0.35 | ○ |
| Example 11 | Random | Rm: 12.5 RM: 20 | 5 (=D2 × 1) | 4.1 | 5 (=D1 × 1.2) | 15 | Not observed | Not observed | ○ | 0.31 | ○ |
| Comparative Example 12 | Grid | 15 | 30 (=D2 × 4.3) | 7.5 | 7 (=D1 × 0.93) | — | Not observed | Observed | — | — | X |
| Example 12 | Random | Rm: 23.5 RM: 38.5 | 5 (=D2 × 1.7) | 5.25 | 3 (=D1 × 0.57) | 5 | Not observed | Observed | Δ | 0.34 | Δ |
| Example 13 | Random | Rm: 23.5 RM: 38.5 | 2 (=D2 × 0.13) | 7.5 | 16 (=D1 × 2.1) | 8 | Not observed | Observed | Δ | 0.32 | ○ |
| Example 14 | Random | Rm: 23.5 RM: 38.5 | 1 (=D2 × 2.5) | 0.4 | 0.4 (=D1 × 1) | 8 | Not observed | Observed | Δ | 0.3 | Δ |

Table 2 shows that compared to Example 12 in which the depth D2 of the second etching is less than D1×0.6, the transfer rate can be increased and the productivity can be improved according to Examples 9 and 10 in which the depth D2 of the second etching is D1×0.6 or more.

FIGS. 39A and 39B show that continuous wavy irregular shapes free of flat portions are obtained from the masters of Comparative Examples 10 and 11. In contrast, FIG. 39C shows that flat portions remain between recesses according to the master of Comparative Example 12.

Figure 40A:
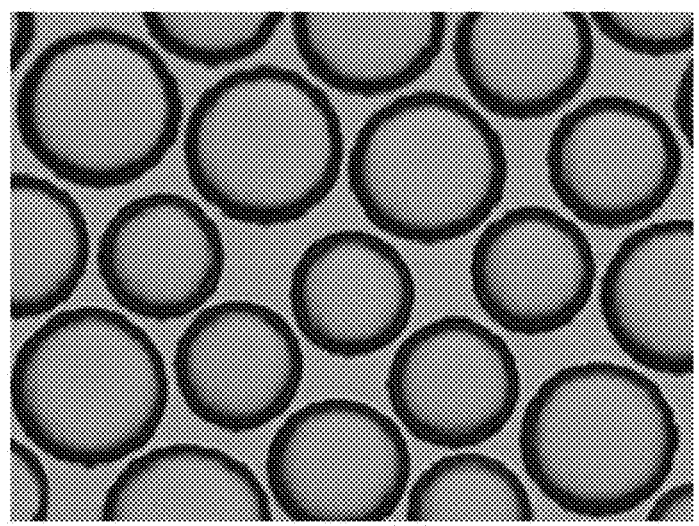
FIG. 40A is a photograph showing a master surface in which a plurality of columnar recesses are formed and FIG. 40B is a photograph showing a cross-sectional profile of a master surface in which a plurality of columnar recesses are formed.
Figure 40B:
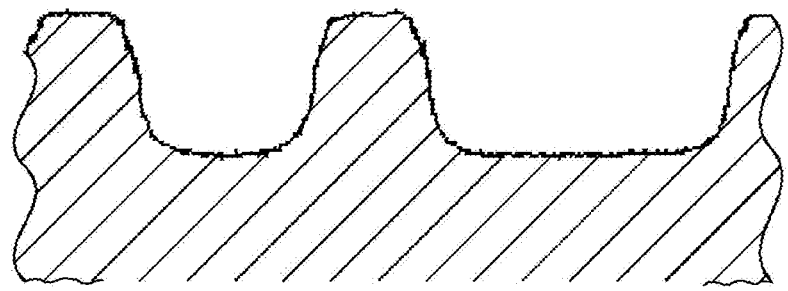
Figure 41A:
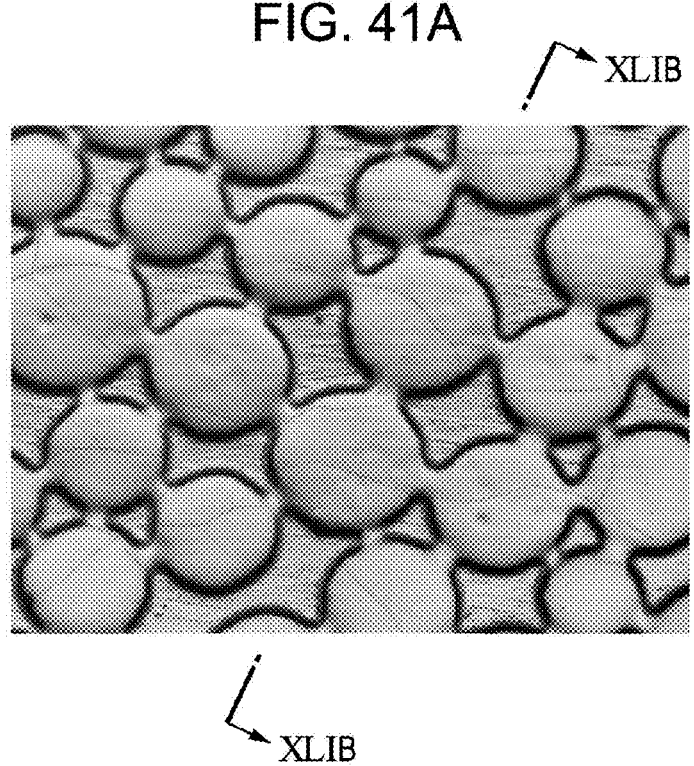
FIG. 41A is a photograph showing a master surface in which recesses are connected into a mesh shape and FIG. 41B is a diagram showing a cross-sectional profile taken along line XLIB-XLIB of FIG. 41A.
Figure 41B:
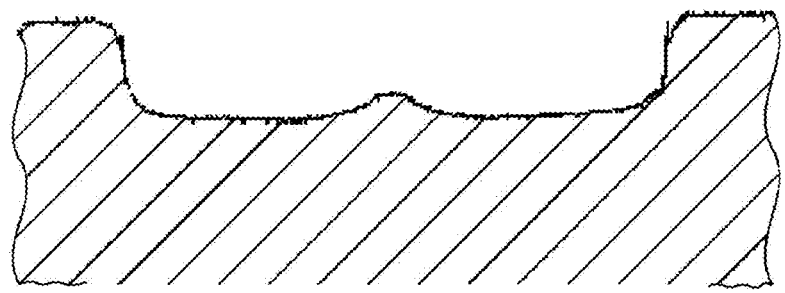

When the master surface is engraved to a depth smaller than the radius of each opening in the resist layer by chemical (wet) etching (first etching process), a plurality of recesses having a columnar shape are formed in the master (refer to FIGS. 40A and 40B). When the recesses of this master are transferred onto a substrate, a plurality of protrusions having the columnar shape are formed on the substrate. Moreover, depending on the distance between neighboring recesses, the recesses become connected to each other during etching and a mesh-shaped array is formed by such recesses (refer to FIGS. 41A and 41B). When the substrate is formed using the master with such an array, optical characteristics are deteriorated. Thus, in order to form columnar recesses that prevent formation of connections between recesses, gaps are desirably secured between the recesses. In order to avoid the connections between the recesses, it is preferable to set the smallest interval between the circular openings to be 1 μm or more after the development.

Moreover, when a hard coat coating that loses its fluidity once dried is applied on the irregularities on the substrate, the regions between the columnar protrusions (the troughs of the wavy surface) and the upper surfaces of the columnar protrusions tend to be flat although a wavy surface is obtained. Moreover, the slope between the apex and the trough tends to form a straight line. Thus, the area of the flat portions tends to increase and the antiglare property tends to decrease in attempting to obtain a smooth continuous wavy surface that suppresses the cloudy feed.

Figure 42A:
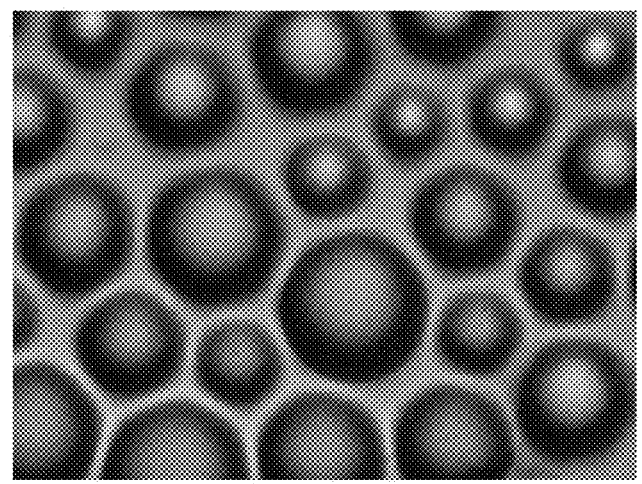
FIG. 42A is a photograph showing a master surface in which a plurality of dome-shaped recesses are formed.
Figure 42B:
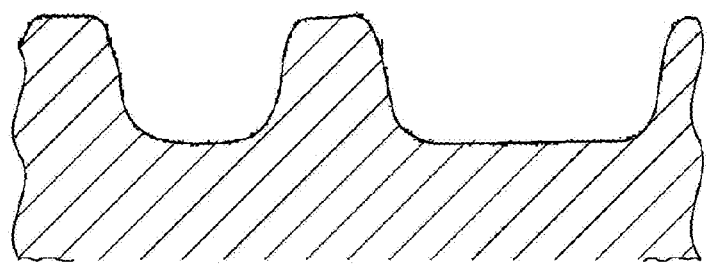
FIG. 42B is a cross-sectional profile showing an irregular shape formed by a first etching process.
Figure 42C:
FIG. 42C is a cross-sectional profile showing an irregular shape smoothened by a second etching process.

In order to suppress the decrease in the antiglare property, the shape of each recess of the master is preferably changed to a dome shape that does not have a linear portion and the columnar holes that are independently present are preferably changed to a continuous irregular shape. In order to form such a continuous irregular shape in a master surface, a multi stage etching process should be employed in the step of forming the master. That is, after shallow columnar recesses may be formed by etching and the metal surface of the master is exposed by removing the resist layer, the entire roll surface may be etched again (refer to FIGS. 42A to 42C). Since the degree of come shape changes depending on the etching conditions and this change in degree affects the diffuse reflection characteristics, the etch depth and the intervals between recesses are preferably adequately adjusted.

Example 15

A transfer roll was prepared as follows. First, a surface of an iron core (100 mm in diameter, 300 mm in face length) of the transfer roll was plated with copper. A photoresist was applied on a roll surface plated with copper so as to form a photoresist layer.

A circular pattern was generated under calculation condition setting values of ($R_m$: 23.5 μm, $R_M$: 38.5 μm, $X_m$: 0.0 mm, $X_M$: 40.0 mm, $Y_m$: 0.0 mm, $Y_M$: 40.0 mm), and circles having a radius of 15 μm to 23.5 μm were placed in the gaps between circles. Next, on the basis of the generated pattern, a photoresist layer formed on the roll surface was exposed with a laser beam to form exposed portions arranged into a random patter, and developed. As a result, openings of the random pattern were formed in the photoresist layer to obtain an etching mask.

Next, while rotating the roll with the etching mask, an etchant was sprayed onto the roll surface to etch the roll surface and to thereby form columnar holes having a depth of 5 μm. As a result, a large number of holes arranged into a random pattern were formed in the roll surface. A cupric chloride etchant (cupric chloride, hydrochloric acid, and water) was used as the etchant.

Next, using the resulting transfer roll, irregularities on the transfer roll was transferred onto a triacetyl cellulose (TAC) film surface at a transfer roll temperature of 170° C. and a linear load of 200 kg/cm. The following materials were mixed in a disperser for 2 hours to prepare a hard coat coating. The prepared hard coat coating was applied on a shape-transfer-receiving surface of the TAC film, dried, and cured by irradiation with UV rays to form a hard coat layer on the shape transfer-receiving surface of the TAC film. Note that the thickness of the hard coat coating applied was adjusted so that the average irregularity height PV on the hard coat layer surface after drying was 0.25 μm.

As a result, a desired antiglare film was obtained.

Hard Coat Coating

UV curable urethane acryl oligomer: 100 parts by weight

Reaction initiator (trade name: Irgacure 184 produced by Ciba Specialty Chemicals): 5 parts by weight Silica sol (methyl isobutyl ketone (MIBK) dispersion containing dispersed silica having a diameter of 30 nm and having a solid content of 30%): 500 parts by weight Methyl isobutyl ketone MIBK: 85 parts by weight

Example 16

An antiglare film was obtained as in Example 15 except that the conditions for generating the pattern and the thickness of the hard coat coating applied were adjusted as below.

Conditions for Generating the Pattern

A circular pattern was generated under calculation condition setting values of ($R_m$: 23.5 μm, $R_M$: 38.5 μm, $X_m$: 0.0 mm, $X_M$: 40.0 mm, $Y_m$: 0.0 mm, $Y_M$: 40.0 mm). The process of arranging circles between circles conducted in Example 15 was omitted.

Thickness of the Hard Coat Coating Applied

The thickness of the hard coat coating applied was adjusted so that the average irregularity height PV on the hard coat layer surface after drying was 0.50 μm.

Example 17

An antiglare film was obtained as in Example 15 except that the conditions for generating the pattern and the thickness of the hard coat coating applied were adjusted as below.

Conditions for Generating the Pattern

A circular pattern was generated under calculation condition setting values of ($R_m$: 23.5 μm, $R_M$: 38.5 μm, $X_m$: 0.0 mm, $X_M$: 40.0 mm, $Y_m$: 0.0 mm, $Y_M$: 40.0 mm), and circles having a radius of 7.5 μm to 23.5 μm were placed in the gaps between circles.

Thickness of the Hard Coat Coating Applied

The thickness of the hard coat coating applied was adjusted so that the average irregularity height PV on the hard coat layer surface after drying was 0.25 μm.

Example 18

First, a series of steps up to the shape transfer step were conducted as in Example 16 to obtain a TAC film having an irregular surface. Next, a coating solution having a solid content of 25% was prepared and applied on the TAC film irregular surface so that PV was 0.25 μm.

UV-curable acryl oligomer (viscosity: 5,000 cps/25° C.): 100 parts by weight

Reaction initiator Irgacure 184: 5 parts by weight

MIBK: 315 parts by weight

Next, after being dried for 2 minutes at 80° C., the TAC film with the applied coating was sent to an UV curing oven and irradiated with UV light at an output of 160 W and an integrated light intensity of 300 mJ/cm² to prepare a target antiglare film.

The comparison of the viscosity characteristics of the coatings used in the above-described examples are shown in Table 3.

|  | Solid content (%) | Yield value (Pa) |
|---|---|---|
| Coating of Example 1 | 40 | 0 |
| Coating of Example 1 when dried | 62 | 134 |
| Coating of Example 18 | 25 | 0 |
| Coating of Example 18 when dried | 100 | 0 |

Evaluation of Viscosity Characteristics

Measurement was conducted using HAAKE RheoStress RS75.

Figure 43:
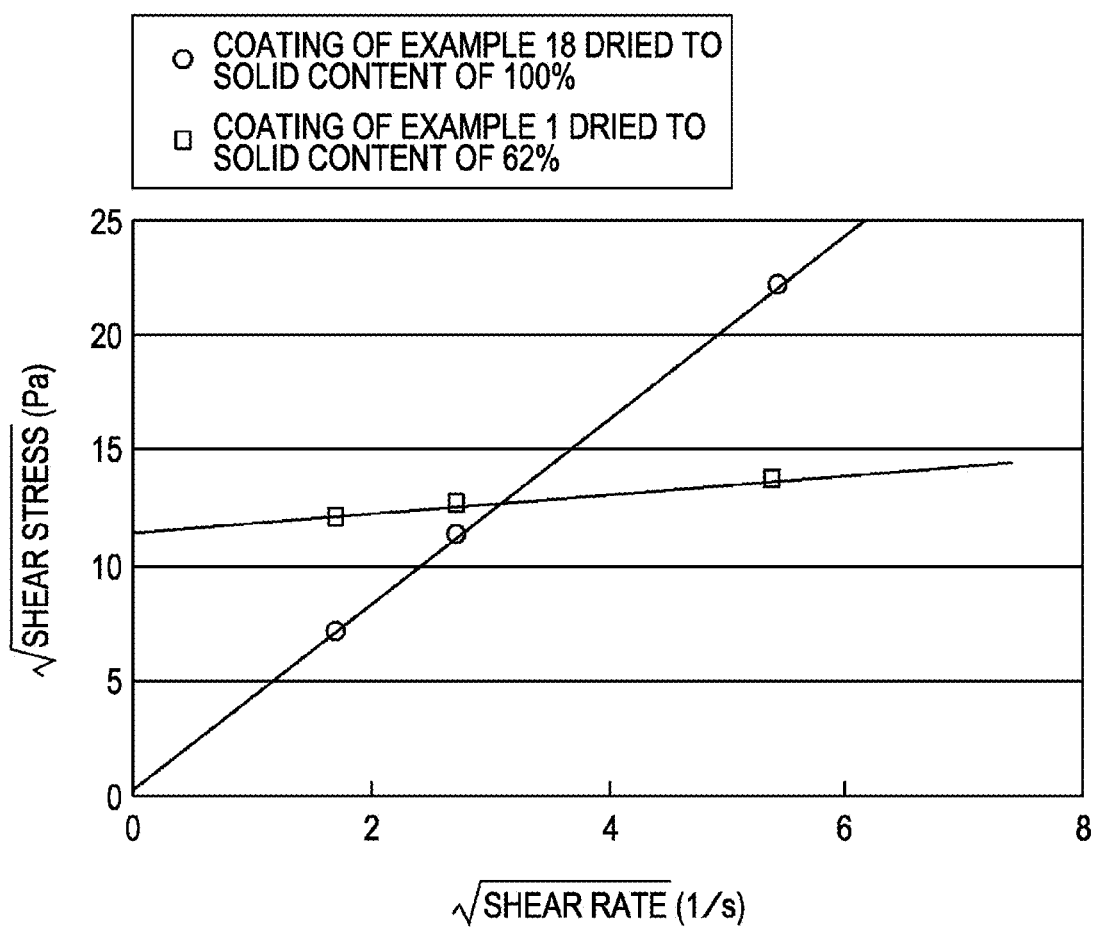
FIG. 43 is a graph for determining the yield value at which structural viscosity is exhibited.

The yield value indicating the structural viscosity was determined from intercepts by plotting the square roots of the shear rate and the square roots of the shear stress on the basis of Casson's equation. An example of the plot is shown in FIG. 43

Evaluation of antiglare property (a different evaluation standard was used)

Bare fluorescent lamps were projected on the optical film and the blurring of the reflected images was evaluated by the following standard.

◉: Contours of fluorescent lamps are completely unidentifiable.

○: Fluorescent lamps appear foggy and contours are vaguely recognizable.

×: Fluorescent lamps appear unblurred and are clearly recognizable and their contours are visible.

Evaluation of Rainbow Pattern

A fluorescent lamp was projected on a film bonded to a black acryl plate and the rainbow pattern around the image was observed and evaluated according to the following standard:

○: Rainbow pattern is not identifiable even when viewed from a very shallow angle (oblique).

Δ: Rainbow pattern is identifiable when viewed from a very shallow angle.

×: Rainbow pattern is identifiable even when viewed from the immediate front.

TABLE 4

| | Substrate irregularity shape | | | Protrusion height (μm) | Filling ratio | PV | Antiglare property | Clouding | Moire | Glares | Rainbow pattern |
|---|---|---|---|---|---|---|---|---|---|---|---|
| | $R_m$ (μm) | $R_M$ (μm) | $R_m/R_M$ | | | | | | | | |
| Example 15 | 23.5 (15) | 38.5 (23.5) | 0.61 | 5 | 83.2 | 0.52 | ◉ | 0.41 | Not observed | Not observed | ○ |
| Example 16 | 23.5 | 38.5 | 0.61 | 5 | 82.2 | 0.50 | ○ | 0.38 | Not observed | Not observed | Δ |
| Example 17 | 23.5 (7.5) | 38.5 (23.5) | 0.61 | 5 | 88.2 | 0.53 | ◉ | 0.55 | Not observed | Not observed | ○ |
| Example 18 | 17.5 | 25 | 0.7 | 5 | 79.9 | 0.25 | × | 0.65 | Not observed | Not observed | × |

PV: Average height of protrusions (structures)

Table 4 indicates the following.

When Examples 15, 16, and 17 are compared with each other, it is found that the filling ratio of the recesses in the irregular surface of the master, in other words, the density of the structures on the irregular surface of the antiglare film, is higher and a higher antiglare property can be obtained in Example 16 in which small circles are further arranged in gaps between the circles than in Examples 15 and 17 in which small circles are not provided between the circles.

Compared to Example 16, in Examples 15 and 17 in which structures having smaller bottoms are provided, the variation in height of the structures formed on the antiglare film is large and thus the rainbow pattern of the reflected light, i.e., dispersion, is suppressed.

In the description of Examples 19 and 20 below, measurement of the physical property value and the evaluation of characteristics are done as follows.

Hard Coat Layer Thickness

The thickness (average thickness) of the hard coat layer was determined as follows using a thickness meter (electric micrometer produced by TESA K. K.). First, a cylindrical contact probe having a diameter of 6 mm was used as a contact probe. The cylindrical probe was brought into contact with the hard coat layer at a load sufficiently low not to crush the hard coat layer and the thickness of the antiglare film was measured at feely selected 5 points. Then the thicknesses of the antiglare film measured were simply averaged to determine the average DA of the antiglare film total thickness. Next, the thickness of an uncoated portion of the same antiglare film was measured at freely selected 5 points. Then the thicknesses of the substrate (transfer substrate) measured were simply averaged to determine the average thickness DB of the substrate. Next, the average thickness DB was subtracted from the average DA of the antiglare film total thickness and the obtained value was assumed to be the thickness of the hard coat layer.

Surface Shape

The surfaces of the transfer substrate and the hard coat layer were evaluated and observed as follows. The surface roughness was evaluated with a stylus-type surface roughness meter (Surfcorder ET4000A produced by Kosaka Laboratory Ltd.). The scan rate was 0.1 mm/sec and the evaluation length was 4 mm.

The surface shape observation was evaluated by a non-contact surface/layer cross-sectional shape measurement system VertScan 2.0 produced by Ryoka Systems Inc. Measurement was conducted with VS-Measure (Version 1.0.2). A 520 nm wavelength filter and a ×50 objective lens (or ×20 objective lens) were used and the observation region was 190 μm×140 μm (or 520 μm×390 μm). A 3D image was displayed in VS-Viewer (Version 4.2.2).

Total Light Transmittance Tt

The total light transmittance Tt of the antiglare film was evaluated with HM-150 produced by Murakami Color Research Laboratory in compliance with JIS K7361 while the antiglare film was left as was.

Total Haze

The total haze of the antiglare film was evaluated with HM-150 produced by Murakami Color Research Laboratory in compliance with JIS K7136 while the antiglare film was left as was.

Internal Haze

The internal haze of the antiglare film was evaluated with HM-150 produced by Murakami Color Research Laboratory in compliance with JIS K7136 by using a test piece prepared by bonding a TAC film (produced by Fujifilm Corporation, film thickness: 80 μm) on the hard coating surface with an optically transparent adhesive Clouding A specific method for measuring the cloudiness is described below. First, an antiglare film was bonded onto a black acryl plate using an adhesive applied on the back of the antiglare film. Next, an integrating-sphere spectrophotometer (trade name: SP64 produced by X-Rite) was used to conduct measurement with a d/8° optical system in which a sample surface was irradiated with diffused light and reflected light was detected with a detector installed at a position oblique with respect to the sample normal direction by 8°. As for the measurement values, the SPEX mode which removes the specular reflection components and detects only the diffuse reflection components was employed and the detection viewing angle was 2°.

Gloss

The glossiness of the antiglare film was measured as follows. The antiglare film was bonded to a black acryl plate (Acrylite L502 produced by Mitsubishi Rayon Co., Ltd.) using an adhesive and the glossiness was measured with a micro-TRI-gloss produced by Gardner. Table 5 shows 20° glossiness.

Evaluation of Antiglare Property

Evaluation of the antiglare property was conducted as follows: An antiglare film was bonded onto a black acryl plate with an adhesive sheet and a viewer's face was projected onto the film from about 30 cm distant from the film to evaluate the blurring of a pupil according to the following standard.

◎: Pupil is blurred and its contour is not identifiable.
○: Contour of pupil is vaguely identifiable.
×: Pupil is clearly identifiable.

Evaluation of Blackness

Evaluation of blackness was done by projecting a bare fluorescent light onto an antiglare film bonded on a black acryl plate with ah adhesive sheet and evaluating the spread of the diffused light according to the following standard:

◎: Range of spread of the diffused light is narrow and black regions immediately appear once the spread range is exceeded.
○: Although the spread range of the diffused light is narrow, diffused light is vaguely recognizable in positions exceeding the spread range.
×: Spread range of diffused light is wide and the film appears whitish.

Glares

An antiglare-equipped polarizer was detached from the panel surface of a liquid crystal television BRAVIA KDL-40F1 produced by Sony Corporation and a polarizer having a TAC surface not subjected to an antiglare process was bonded. The antiglare films of Examples 19 and 20 were bonded thereto using an optically transparent adhesive. Next, the obtained liquid crystal television was started and operated to display a green color to evaluate glaring under the following standard:

◎: Glare is not observed in any angles.
○: Glare is not observed from the front but slight glare is observed when diagonally observed.
×: Glare is observed from the front.

Example 19

A transfer roll master having an irregular shape in its surface was fabricated as below by a photolithographic technique. First, a surface of an iron core (100 mm in diameter, 300 mm in face length) of the transfer roll master was plated with copper. A photoresist was applied on a roll surface plated with copper so as to form a photoresist layer.

A diameter random pattern was generated under (Rm: 23.5 μm, RM: 38.5 μm, Xm: 0.0 mm, XM: 40.0 mm, $Y_m$: 0.0 mm, $Y_M$: 40.0 mm), and circles having a radius of 15 μm to 23.5 μm were placed in the gaps between the generated circles. Then the photoresist layer was exposed with a laser beam on the basis of this exposure pattern and developed. As a result, an etching mask having a plurality of openings arranged into a random pattern was obtained.

While the transfer roll master with the etching mask thereon was rotated, an etchant was sprayed onto the roll surface to perform an etching process (first etching process)

on the roll surface. As a result, columnar holes (recesses) having a depth D1 of 5.5 μm were formed.

Next, after the photoresist layer was removed from the surface of the transfer roll master, the entire roll surface was evenly etched again (second etching process) to a etch depth D2 of 5 μm (D2=D1×0.91). As a result, the columnar holes turned into smoothly curved holes. Then a 5 μm hard chromium plating was formed on the roll surface to obtain a desired transfer roll master.

Figure 44A:
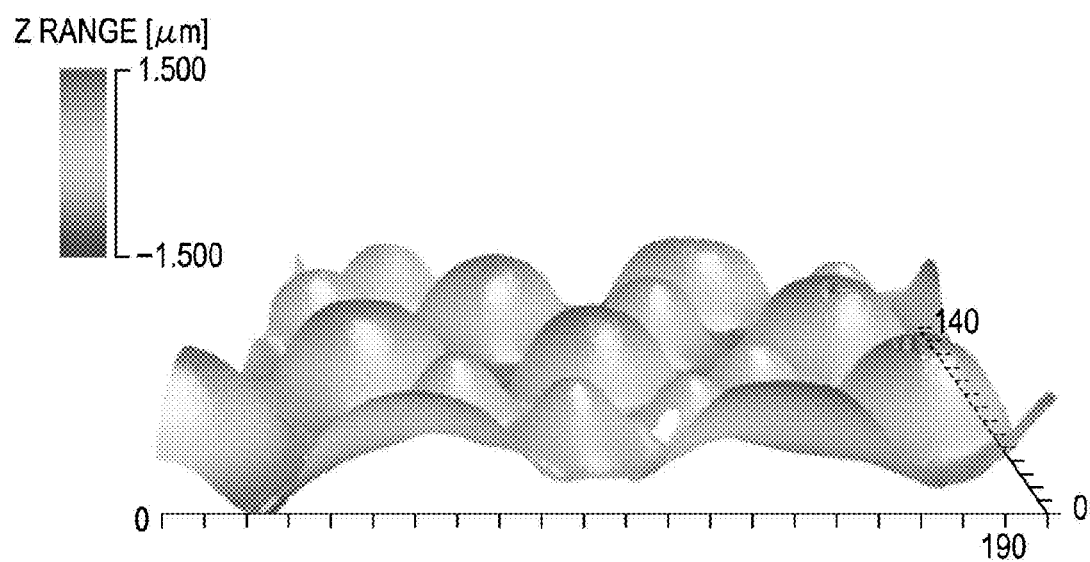
FIG. 44A is a diagram showing a surface shape of a substrate of an antiglare film of Example 19 and FIG. 44B is a diagram showing a surface shape of a substrate of an antiglare film of Example 20

Next, the thus prepared transfer roll master was used to transfer the shape (transfer roll temperature: 170° C., linear load: 200 kg/cm, transfer rate: 8 m/min) so as to transfer irregularities onto the surface of the TAC film (produced by Fujifilm Corporation, film thickness: 80 μm). Then the irregular shape in the TAC film surface was observed. The results are shown in FIG. 44A. Next, the surface roughness of the irregular shape in the substrate surface was evaluated. As a result, Ra (arithmetic mean roughness)=0.623 μm, Rz (ten point mean roughness)=2.163 μm, and RSm (average length of roughness curve element)=78 μm.

Next, an UV curable resin composition having the following blend was applied onto the irregular surface of the TAC film by using a coil bar and then dried at 80° C. for 1.5 minutes. As a result of drying, the viscosity adjustor exhibited the structural viscosity, the flowability decreased, and the surface of the UV durable resin composition resembled the irregular shape in the TAC film surface. Next, the UV curable resin was irradiated with 350 mJ/cm² UV rays in a nitrogen atmosphere to form a hard coat layer on the TAC film surface. Thus, an antiglare film was obtained.

Hexafunctional urethane acrylate 14.39 parts by mass (produced by Sartomer Company, trade name: CN9006)
 Tetrafunctional acryl monomer: pentaerythritol tetraacrylate 7.19 parts by mass (produced by Shin-Nakamura Chemical Co., Ltd., trade name: A-TMMT)
 Inorganic viscosity adjustor: silica filler 16 parts by mass (Silica filler of OSCAL series 25 nm in diameter produced by JGC C&C was treated with an acryl-terminated silane coupling agent (e.g., KBM-5103 produced by Shin-Etsu Chemical Co., Ltd.)
 Polymerization initiator 2 parts by mass
 (produced by Ciba Specialty Chemicals, trade name: Irgacure 184)
 Leveling agent: 3-methoxy-3-methyl-1-butanol solution containing 30 mass % of effective component (acryl fluoride polymer) 0.07 parts by mass (Kyoeisha Chemical Co., Ltd., trade name: KL-600)
 Antifoulant: acrylate fluoride 1 part by mass
 (produced by DIC Corporation, trade name: RS-751-K)
 Organic viscosity adjustor: modified carboxyl-containing polymer 0.03 parts by mass
 (produced by Kyoeisha Chemical Co., Ltd., trade name: G-700)
 Solvent: isopropyl alcohol (IPA) 37.33 parts by mass
 Solvent: 1,3-dioxolane 21.99 parts by mass Example 20

Figure 44B:
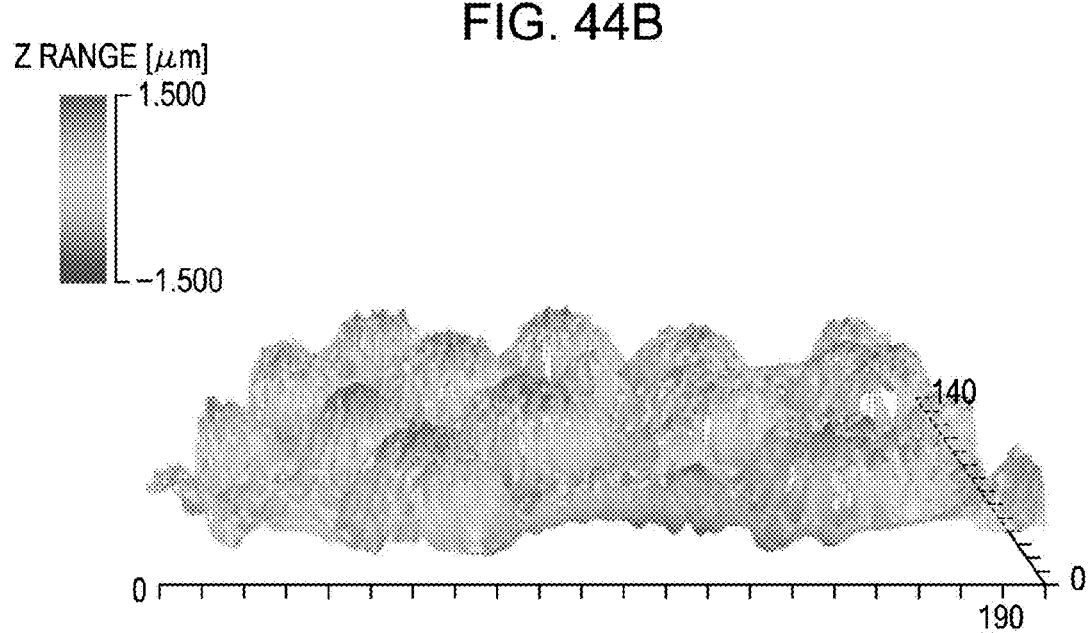

An antiglare film was obtained as in Example 19 except that a surfactant was added to the etchant. As in Example 19, the irregular shape in the TAC film surface of Example 20 was observed in the step of making the antiglare film. The results are shown in FIG. 44B. The surface roughness of the irregular shape in the substrate surface was also evaluated. As a result, Ra (arithmetic mean roughness)=0.503 μm, Rz (ten point mean roughness)=1.973 μm, and RSm (average length of roughness curve element)=74 μm.

Table 5 shows the evaluation results of the antiglare film of Example 19 and Example 20.

| | Fine structure on transfer substrate surface | Thickness of hard coat (μm) | Surface roughness data | | | Tt (%) | Total haze (%) | Internal haze (%) | Clouding | 20° glossiness | Antiglare property | Blackness | Glares |
|---|---|---|---|---|---|---|---|---|---|---|---|---|---|
| | | | Ra (μm) | Rz (μm) | RSm (μm) | | | | | | | | |
| Example 19 | Not observed | 11 | 0.079 | 0.3 | 99 | 92.8 | 0.5 | 0.4 | 0.33 | 58.4 | ○ | ◎ | ○ |
| Example 20 | Observed | 8.8 | 0.084 | 0.311 | 87 | 92.5 | 1.6 | 1.6 | 0.34 | 59.5 | ○ | ◎ | ◎ |

The Evaluation Results Indicate the Following.

According to the antiglare film of Example 19 in which the surfactant was not added to the etchant, fine structures were not formed in the substrate surface and the surface was smooth. In contrast, according to the antiglare film of Example 20 in which the surfactant was added to the etchant, fine structures were formed in the substrate surface and the surface was rough.

According to the antiglare film of Example 20, the total haze and the internal haze are each about 1% higher than that of the antiglare film of Example 19. This is because fine structures are formed on the substrate surface.

The antiglare film of Example 20 has less glare than the antiglare film of Example 19. This is because the fine structures provided the internal haze. In other words, this is because a light scattering effect was imparted to the substrate surface by the fine structures.

Although Example 19 and Example 20 differ from each other in terms of the surface shape of the TAC film as described above, the surface shapes of the hard coat layer are substantially the same. Thus, the evaluation results in terms of cloudiness, glossiness, antiglare properties, and blackness are substantially the same between Examples 19 and 20.

Although the embodiments and examples of the present invention have been specifically described herein, the present invention is not limited to the embodiments and examples above and various modifications and alterations are possible on the basis of the technical idea of the present invention.

For example, the numbers, shapes, materials, structures, etc., described in the embodiments and examples above are merely exemplary, and any other numbers, shapes, materials, structures, etc., may be employed as occasion demands.

The first to tenth embodiments above can be freely combined as long as the essence of the present invention is not impaired.

Although the embodiments described above involve implementation of the present invention to optical films installed to display surfaces of liquid crystal displays and method for making the optical films, the present invention is not limited to these. For example, the present invention is applicable to optical films used in display surfaces of various display apparatuses such as cathode ray tube (CRT) displays, plasma display panels (PDPs), electro luminescence (EL) displays, surface-conduction electron-emitter displays (SED), etc. The present invention is not limited by the size of the display apparatuses. The present invention is applicable to all display apparatuses small and large.

In the embodiments described above, examples of forming the hard coat layer 12 on the substrate are described. Alternatively, the substrate 11 may be used as a diffuser sheet or diffuser plate without forming the hard coat layer 12. When the substrate is used as such, the irregular shapes of the above-described embodiments may be formed on both surfaces of the substrate 11. Accordingly, the diffusing effect can be imparted to both surfaces of the substrate 11.

Alternatively, in the embodiments described above, fine particles may be included in the substrate 11. Moreover, an irregular shape may be formed in the back surface of the substrate 11. Examples of the method for forming this irregular shape include embossing and texturing. Alternatively, a resin layer containing fine particles may be formed on the back surface of the substrate so that fine particles protrude from the surface of the resin layer. Alternatively, the substrate 11 may contain fine particles some of the fine particles may be arranged to protrude from the substrate back surface. Alternatively, fine particles may be incorporated inside the substrate 11 so that an irregular shape is created at the back surface of the substrate 11. By employing such a configuration, a diffusing effect can be imparted to the interior and/or back surface of the substrate 11. When such a configuration is employed, formation of the hard coat layer 12 may be omitted so that the irregular shape in the surface of the substrate 11 may be exposed. In this manner, the substrate 11 can be used as a diffuser sheet or a diffuser plate.

In the seventh embodiment described above, an example of re-etching (second etching process) the recesses formed by etching (first etching process) is described. However, the present invention is not particularly limited to this example. For example, recesses formed by laser processing maybe re-etched (second etching process). In other words, in the method for producing the optical film of the first embodiment, a step of conducting an etching process may be provided after a step of forming recesses by laser processing.

When the embossing roll is formed by chemical etching in the embodiments described above, a random pattern may be etched to form columnar holes, the resist may be entirely stripped, and then the entire roll surface may be etched to form holes with smooth surface shapes It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. An optical element comprising:
a substrate including a plurality of structures on a surface thereof, the structures being protrusions; and
a hard coat layer formed on the substrate,
wherein an irregular shape is formed by the structures on the surface of the substrate,
an irregular shape resembling the irregular shape of the substrate is formed on a surface of the hard coat layer,
the irregular shape of the surface of the hard coat layer is smoother than the irregular shape of the surface of the substrate,
a size of bottoms of the structures changes at random within a range of a minimum distance $R_m$ or more and a maximum distance $R_M$ or less where the minimum distance $R_m$ is a minimum value of a shortest distance from a center of gravity of the bottom of the structure to a rim of the bottom and the maximum distance $R_M$ is a maximum value of a longest distance from a center of gravity of the bottom of the structure to the rim of the bottom,
of the plurality of structures, neighboring structures have bottoms in contact or substantially in contact with one another, and
the minimum distance $R_m$ and the maximum distance $R_M$ satisfy a relationship $R_m/R_M \leq 0.9$.

2. The optical element according to claim 1, wherein the maximum distance $R_M$ is within a range of $R_m < R_M \leq 75$ μm.

3. The optical element according to claim 1, wherein the maximum distance $R_M$ and the minimum distance $R_m$ satisfy a relationship $10\ \mu m \leq R_m < R_M \leq 75$ μm.

4. The optical element according to claim 1, wherein the structures include first structures and second structures,
a size of bottoms of the first structures changes at random within a range of $10\ \mu m \leq R_{1m} < R_{1M} \leq 75$ μm where a minimum distance $R_{1m}$ is a minimum value of a shortest distance from a center of gravity of the bottom of the first structure to the rim of the bottom and the maximum distance $R_{1M}$ is a maximum value of a longest distance from a center of gravity of the bottom of the first structure to the rim of the bottom, and
a size of bottoms of the second structures changes at random within a range of $R_{2m} < R_{2M} \leq R_{1m}$ where a minimum distance $R_{2m}$ is a minimum value of a shortest distance from a center of gravity of the bottom of the second structure to the rim of the bottom and the maximum distance $R_{2M}$ is a maximum value of a longest distance from a center of gravity of the bottom of the second structure to the rim of the bottom.

5. The optical element according to claim 1, wherein the structures include:
first structures; and
second structures disposed in gaps between the first structures,
a size of bottoms of the first structures changes at random within a range of $R_{1m} < R_{1M} \leq 75$ μm where a minimum distance $R_{1m}$ is a minimum value of a shortest distance from a center of gravity of the bottom of the first structure to the rim of the bottom and the maximum distance $R_{1M}$ is a maximum value of a longest distance from a center of gravity of the bottom of the first structure to the rim of the bottom, and
a size of bottoms of the second structures changes at random within a range of $R_{2m} < R_{2M} \leq R_{1m}$ where a minimum distance $R_{2m}$ is a minimum value of a shortest distance from a center of gravity of the bottom of the second structure to the rim of the bottom and the maximum distance $R_{2M}$ is a maximum value of a longest distance from a center of gravity of the bottom of the second structure to the rim of the bottom.

6. The optical element according to claim 1, wherein the hard coat layer contains an inorganic or organic viscosity adjustor.

7. The optical element according to claim 1, wherein an average irregularity height PV of the surface of the hard coat layer is within a range of $0.2\ \mu m \leq PV \leq 1.6$ μm.

8. The optical element according to claim 1, wherein a ten-point mean roughness Rz of the surface of the hard coat layer is in a range of $0.1\ \mu m \leq Rz \leq 1.6$ μm.

9. The optical element according to claim 1, wherein the optical element has a cloudiness of 0.7% or less.

10. The optical element according to claim 1, wherein a shape of the bottoms of the structures is at least one selected from a circular shape, an elliptical shape, and a polygonal shape.

11. The optical element according to claim 1, wherein the structures each have a side surface that spreads toward the bottom from the top, and
of the plurality of structures, neighboring structures have bottoms in contact or substantially in contact with one another.

12. A display apparatus comprising:
an optical element including a substrate including a plurality of structures on a surface thereof, the structures being protrusions; and
a hard coat layer formed on the substrate,
wherein an irregular shape is formed by the structures on the surface of the substrate,
an irregular shape resembling the irregular shape of the substrate is formed on a surface of the hard coat layer,
the irregular shape of the surface of the hard coat layer is smoother than the irregular shape of the surface of the substrate,
a size of bottoms of the structures changes at random within a range of a minimum distance $R_m$ or more and a maximum distance $R_M$ or less where the minimum distance $R_m$ is a minimum value of a shortest distance from a center of gravity of the bottom of the structure to a rim of the bottom and the maximum distance $R_M$ is a maximum value of a longest distance from a center of gravity of the bottom of the structure to the rim of the bottom,
of the plurality of structures, neighboring structures have bottoms in contact or substantially in contact with one another, and
the minimum distance $R_m$ and the maximum distance $R_M$ satisfy a relationship $R_m/R_M \leq 0.9$.

13. A method for making an optical element, comprising the steps of:
forming a master having an irregular shape on a surface thereof by forming in the surface a plurality of structures for transfer that are recesses;
forming a substrate having an irregular shape on a surface thereof by transferring the irregular shape of the master onto the surface of the substrate; and
forming a hard coat layer on the irregular shape of the substrate,
wherein a size of bottoms of the structures for transfer changes at random within a range of a minimum distance $R_m$ or more and a maximum distance $R_M$ or less where the minimum distance $R_m$ is a minimum value of a shortest distance from a center of gravity of the bottom of the structure for transfer to a rim of the bottom and the maximum distance $R_M$ is a maximum value of a longest distance from a center of gravity of the bottom of the structure for transfer to the rim of the bottom,
of the plurality of the structures for transfer, neighboring structures for transfer have bottoms in contact or substantially in contact with one another,
the minimum distance $R_m$ and the maximum distance $R_M$ satisfy a relationship $R_m/R_M \leq 0.9$,
an irregular shape resembling the irregular shape of the substrate is formed on a surface of the hard coat layer, and
the irregular shape of the surface of the hard coat layer is smoother than the irregular shape of the surface of the substrate.

14. The method according to claim 13, wherein in the step of forming the master, the structures for transfer are formed by laser processing or etching.

15. The method according to claim 13, wherein the master on which the structures for transfer are formed has a roll shape.

16. A master comprising:
a plurality of structures for transfer that are recesses;
wherein an irregular shape is formed on a surface of the master by the structures for transfer,
a size of bottoms of the structures for transfer changes at random within a range of a minimum distance $R_m$ or more and a maximum distance $R_M$ or less where the minimum distance $R_m$ is a minimum value of a shortest distance from a center of gravity of the bottom of the structure for transfer to a rim of the bottom and the maximum distance $R_M$ is a maximum value of a longest distance from a center of gravity of the bottom of the structure for transfer to the rim of the bottom,
of the plurality of the structures for transfer, neighboring structures for transfer have bottoms in contact or substantially in contact with one another, and
the minimum distance $R_m$ and the maximum distance $R_M$ satisfy a relationship $R_m/R_M \leq 0.9$.

17. A method for making a master, comprising the steps of:
forming a plurality of recesses in a surface of a master by laser processing or etching; and
etching an entire surface of the master in which the plurality of recesses are formed so as to form structures for transfer,
wherein a size of bottoms of the structures for transfer changes at random within a range of a minimum distance $R_m$ or more and a maximum distance $R_M$ or less where the minimum distance $R_m$ is a minimum value of a shortest distance from a center of gravity of the bottom of the structure for transfer to a rim of the bottom and the maximum distance $R_M$ is a maximum value of a longest distance from a center of gravity of the bottom of the structure for transfer to the rim of the bottom,
of the plurality of the structures for transfer, neighboring structures for transfer have bottoms in contact or substantially in contact with one another, and
the minimum distance $R_m$ and the maximum distance $R_M$ satisfy a relationship $R_m/R_M \leq 0.9$.

18. The method according to claim 17, wherein a continuous wavy surface is formed in the surface of the master by etching the entire surface of the master in which the plurality of recesses are formed.

19. The method according to claim 17, wherein the structures for transfer formed on the surface of the master by etching the entire surface of the master having the plurality of recesses are dome-shaped.

* * * * *